(12) United States Patent
Alonso Ruiz

(10) Patent No.: US 10,942,639 B2
(45) Date of Patent: Mar. 9, 2021

(54) ACCELERATED SCROLLING

(71) Applicant: Apple Inc., Cupertino, CA (US)

(72) Inventor: Marcos Alonso Ruiz, San Francisco, CA (US)

(73) Assignee: Apple Inc., Cupertino, CA (US)

(*) Notice: Subject to any disclaimer, the term of this patent is extended or adjusted under 35 U.S.C. 154(b) by 586 days.

(21) Appl. No.: 15/272,388

(22) Filed: Sep. 21, 2016

(65) Prior Publication Data

US 2017/0357398 A1 Dec. 14, 2017

Related U.S. Application Data

(60) Provisional application No. 62/348,970, filed on Jun. 12, 2016.

(51) Int. Cl.
*G06F 3/0485* (2013.01)
*G06F 3/0488* (2013.01)
(Continued)

(52) U.S. Cl.
CPC ............ *G06F 3/0485* (2013.01); *G06F 3/048* (2013.01); *G06F 3/0482* (2013.01);
(Continued)

(58) Field of Classification Search
CPC ...... G06F 3/048; G06F 3/0482; G06F 3/0484; G06F 3/0485; G06F 3/04855; G06F 3/0488; G06F 3/04886
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 101828166 A 9/2010
CN 102707939 A 10/2012
(Continued)

OTHER PUBLICATIONS

Danish Search Report dated Feb. 21, 2017, for Application No. PA 2016 70574, two pages.
(Continued)

*Primary Examiner* — Cesar B Paula
*Assistant Examiner* — Sajeda Muhebbullah
(74) *Attorney, Agent, or Firm* — Kubota & Basol LLP

(57) ABSTRACT

While in a normal scrolling mode, an electronic device optionally displays a representation of a portion of a set of items that includes a plurality of items, wherein a respective item of the plurality of items has focus. The electronic device optionally receives one or more inputs including a contact and a movement of the contact detected on a touch-sensitive surface. In response, if the inputs satisfy fast scrolling criteria, the electronic device transitions to a fast scrolling mode, which includes: displaying an index user interface element that includes a plurality of index objects, wherein: a respective index object, which corresponds to the respective item in the plurality of items that had the focus when the input was received, has the focus in the user interface; and moving the focus from the respective index object to a different index object in accordance with the movement of the contact.

46 Claims, 62 Drawing Sheets

(51) Int. Cl.
  *G06F 3/048* (2013.01)
  *G06F 3/0484* (2013.01)
  *G06F 3/0481* (2013.01)
  *G06F 3/0482* (2013.01)

(52) U.S. Cl.
  CPC .......... *G06F 3/0484* (2013.01); *G06F 3/0488* (2013.01); *G06F 3/04817* (2013.01); *G06F 3/04845* (2013.01); *G06F 3/04855* (2013.01); *G06F 3/04883* (2013.01); *G06F 3/04886* (2013.01)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,590,595 B1* | 7/2003 | Wagner | G06F 3/04855 715/772 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2002/0089545 A1* | 7/2002 | Levi Montalcini | G06F 3/0485 715/784 |
| 2004/0150630 A1* | 8/2004 | Hinckley | G06F 3/0418 345/173 |
| 2005/0264538 A1 | 12/2005 | Yeh | |
| 2006/0119585 A1 | 6/2006 | Skinner | |
| 2006/0197753 A1 | 9/2006 | Hotelling | |
| 2006/0242599 A1 | 10/2006 | Choo et al. | |
| 2007/0146337 A1 | 6/2007 | Ording et al. | |
| 2007/0236475 A1 | 10/2007 | Wherry | |
| 2008/0062144 A1 | 3/2008 | Shahoian et al. | |
| 2008/0126933 A1* | 5/2008 | Gupta | G06F 3/0485 715/712 |
| 2008/0178116 A1* | 7/2008 | Kim | G06F 3/04847 715/786 |
| 2009/0064031 A1* | 3/2009 | Bull | G06F 3/0485 715/784 |
| 2009/0064055 A1 | 3/2009 | Chaudhri et al. | |
| 2009/0109183 A1 | 4/2009 | Carvajal et al. | |
| 2011/0022985 A1 | 1/2011 | Ording et al. | |
| 2011/0122159 A1* | 5/2011 | Bergsten | G06F 3/0482 345/684 |
| 2012/0139935 A1* | 6/2012 | Miyasaka | G06F 3/0485 345/589 |
| 2012/0221974 A1* | 8/2012 | Trotta | G06F 3/0485 715/823 |
| 2013/0246973 A1 | 9/2013 | Tomiyasu et al. | |
| 2014/0013243 A1* | 1/2014 | Flynn, III | G06F 3/0488 715/753 |
| 2015/0007016 A1 | 1/2015 | Lee et al. | |
| 2015/0185877 A1 | 7/2015 | Watanabe et al. | |
| 2015/0312617 A1 | 10/2015 | Chen et al. | |
| 2017/0038957 A1* | 2/2017 | Feng | G06F 3/04883 |

FOREIGN PATENT DOCUMENTS

| | | |
|---|---|---|
| CN | 102790826 A | 11/2012 |
| CN | 103631497 A | 3/2014 |
| EP | 2 738 659 A2 | 6/2014 |
| EP | 2 739 038 A1 | 6/2014 |
| JP | 2000-163031 A | 6/2000 |
| JP | 2002-342033 A | 11/2002 |
| WO | WO-98/37506 A2 | 8/1998 |

OTHER PUBLICATIONS

Danish Search Report dated Oct. 21, 2016, for Application No. PA 2016 70574, seven pages.
International Search Report dated Jul. 7, 2017, for PCT Application No. PCT/US17/28172, filed Apr. 18, 2017, 3 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Extended European Search Report received for European Patent Application No. 178137253, dated Dec. 5, 2019, 9 pages.
Search Report received for Chinese Patent Application No. 201780033576.X, dated Jan. 19, 2021, 4 pages (2 page of English Translation and 2 pages of Official Copy).

* cited by examiner

ACCELERATED SCROLLING

CROSS-REFERENCE TO RELATED APPLICATIONS

This application claims benefit of U.S. Provisional Patent Application No. 62/348,970, filed Jun. 12, 2016, which is hereby incorporated by reference it its entirety.

FIELD OF THE DISCLOSURE

This relates generally to electronic devices that facilitate accelerated scrolling through collections of items, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device displays collections of items (e.g., lists of content items available on the device) in a user interface, and user interaction with such a device entails scrolling through those collections of items. Enhancing these interactions improves the user's experience with the device and decreases user interaction time, which is particularly important where input devices are battery-operated.

SUMMARY OF THE DISCLOSURE

The embodiments described in this disclosure are directed to one or more electronic devices that facilitate accelerated scrolling through collections of items (e.g., lists) displayed in a user interface, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
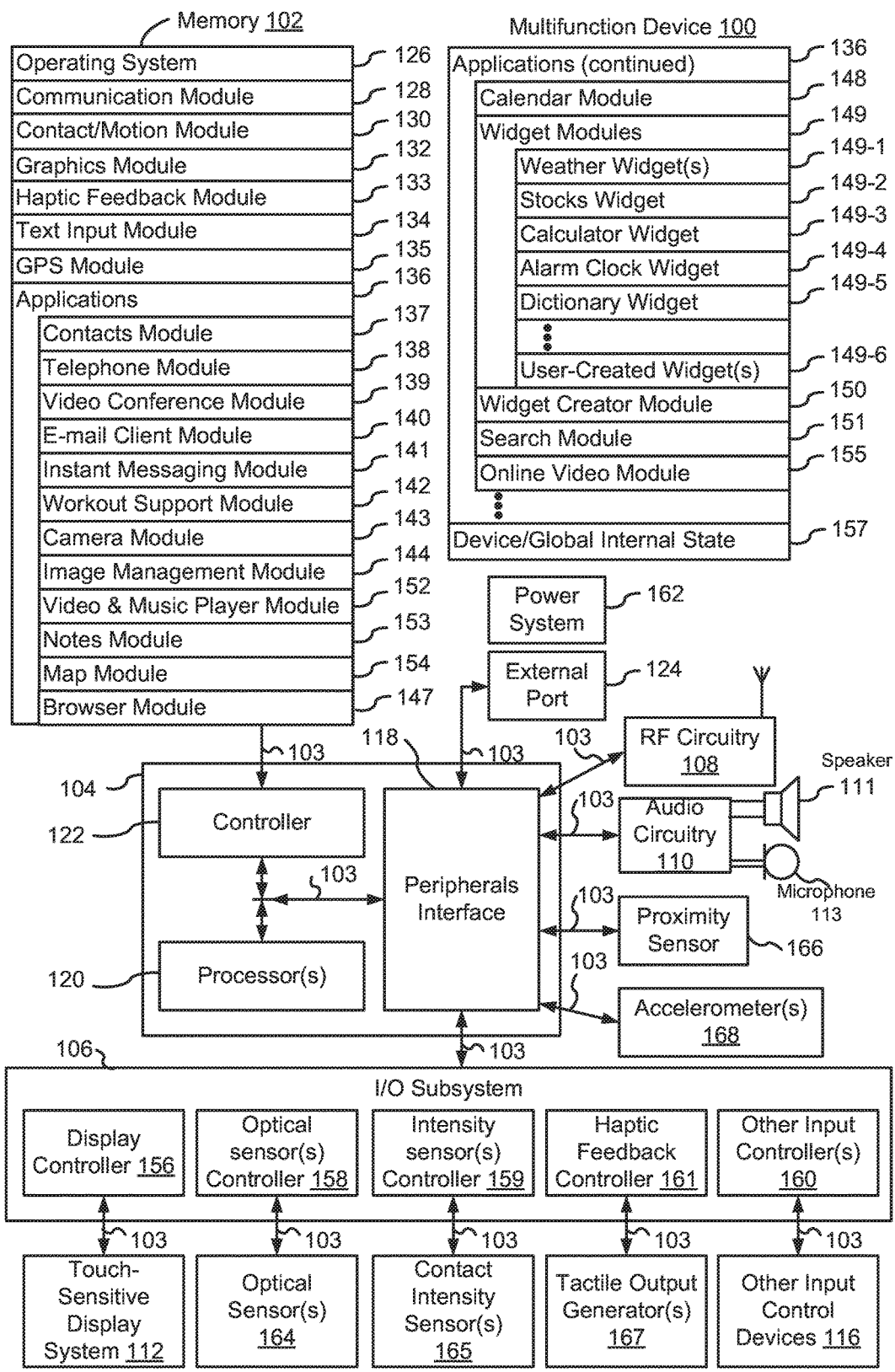
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/ to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
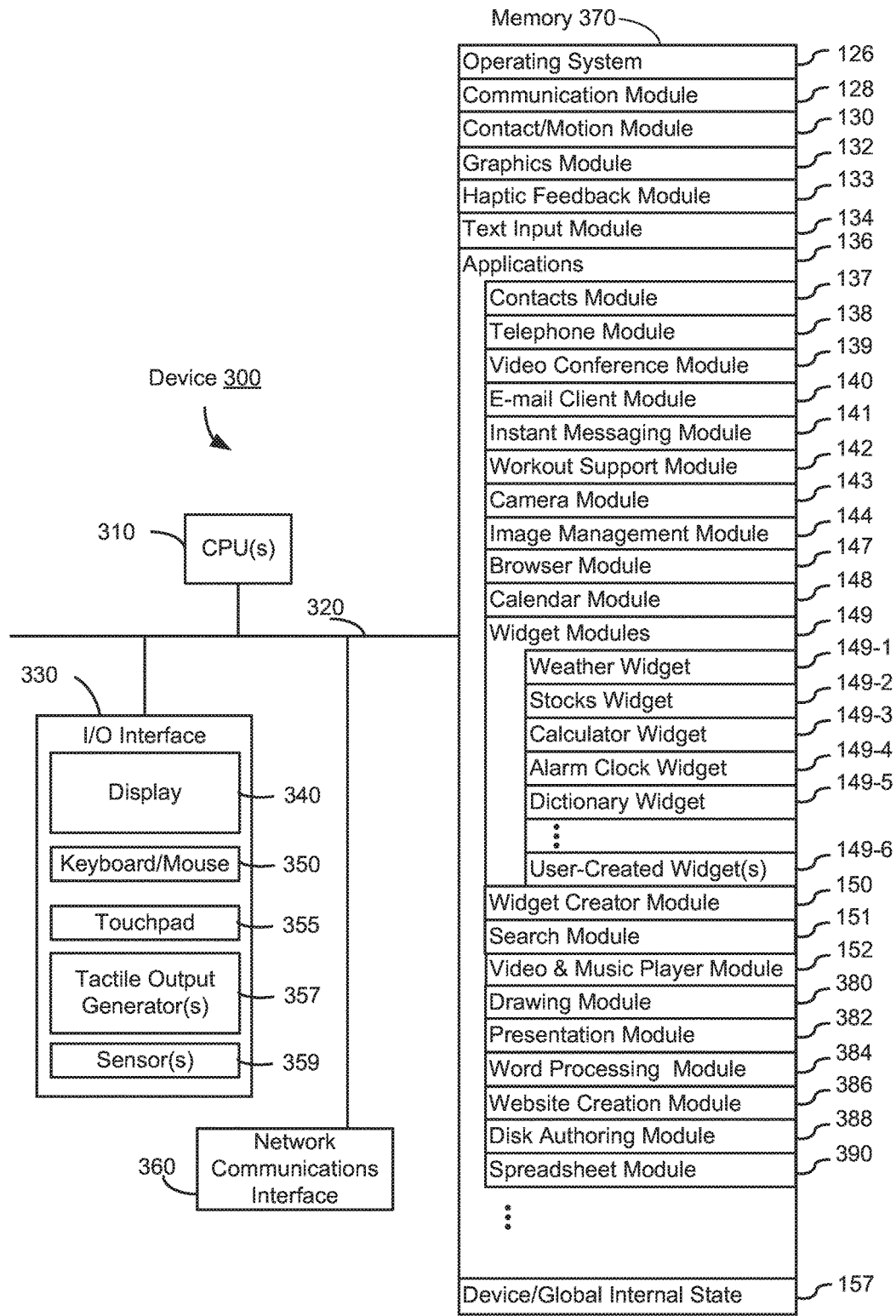
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
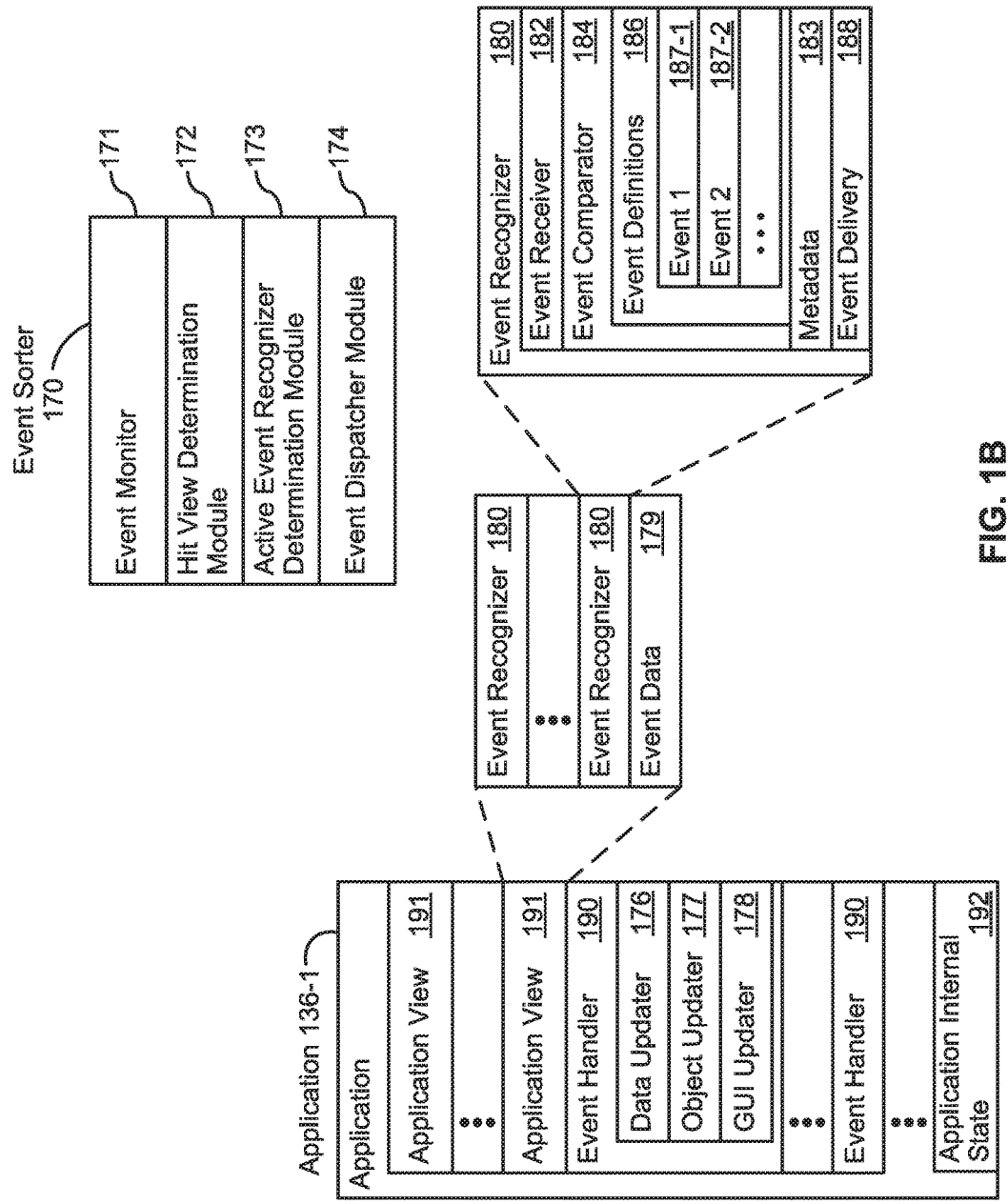
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
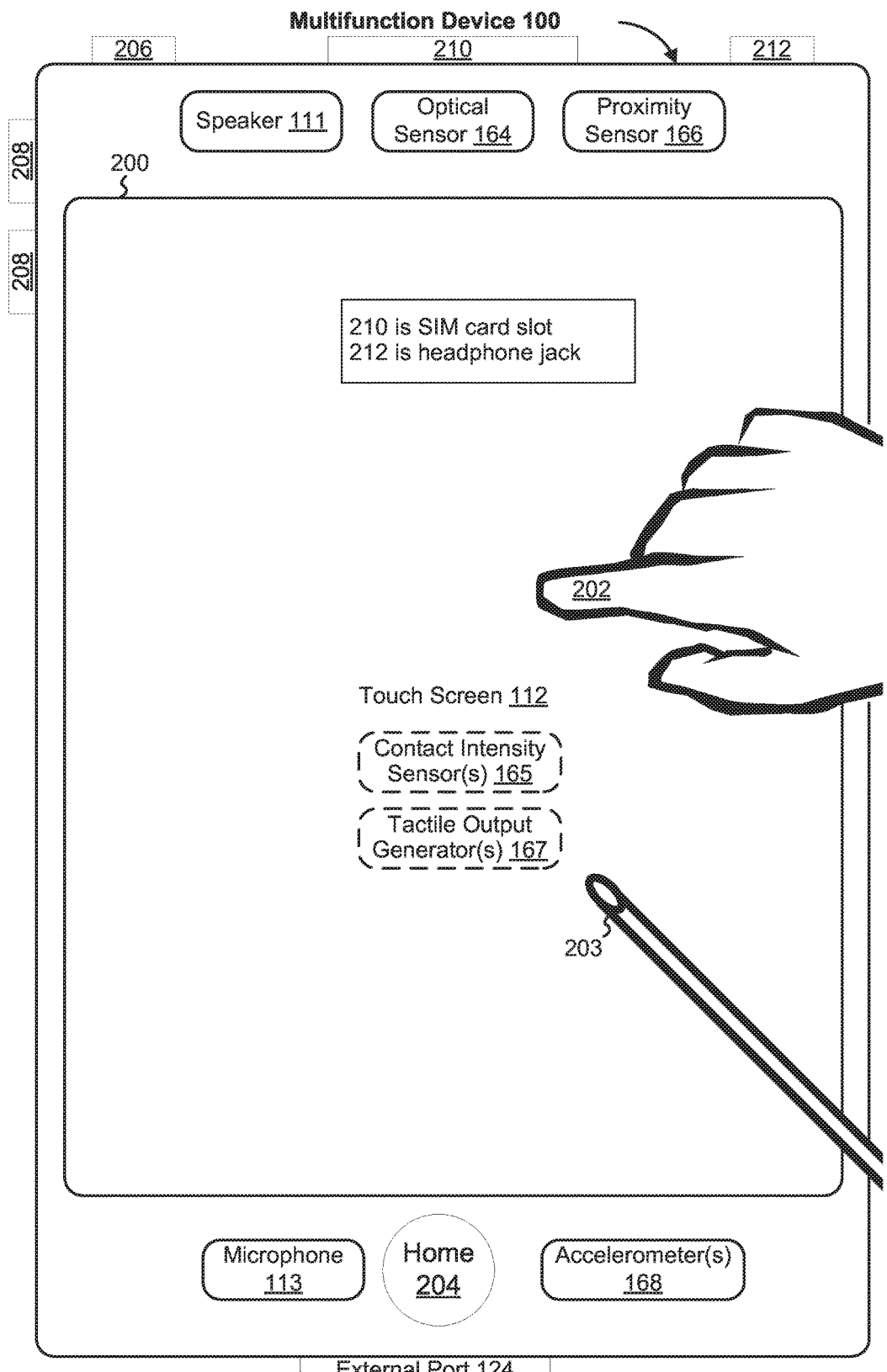
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
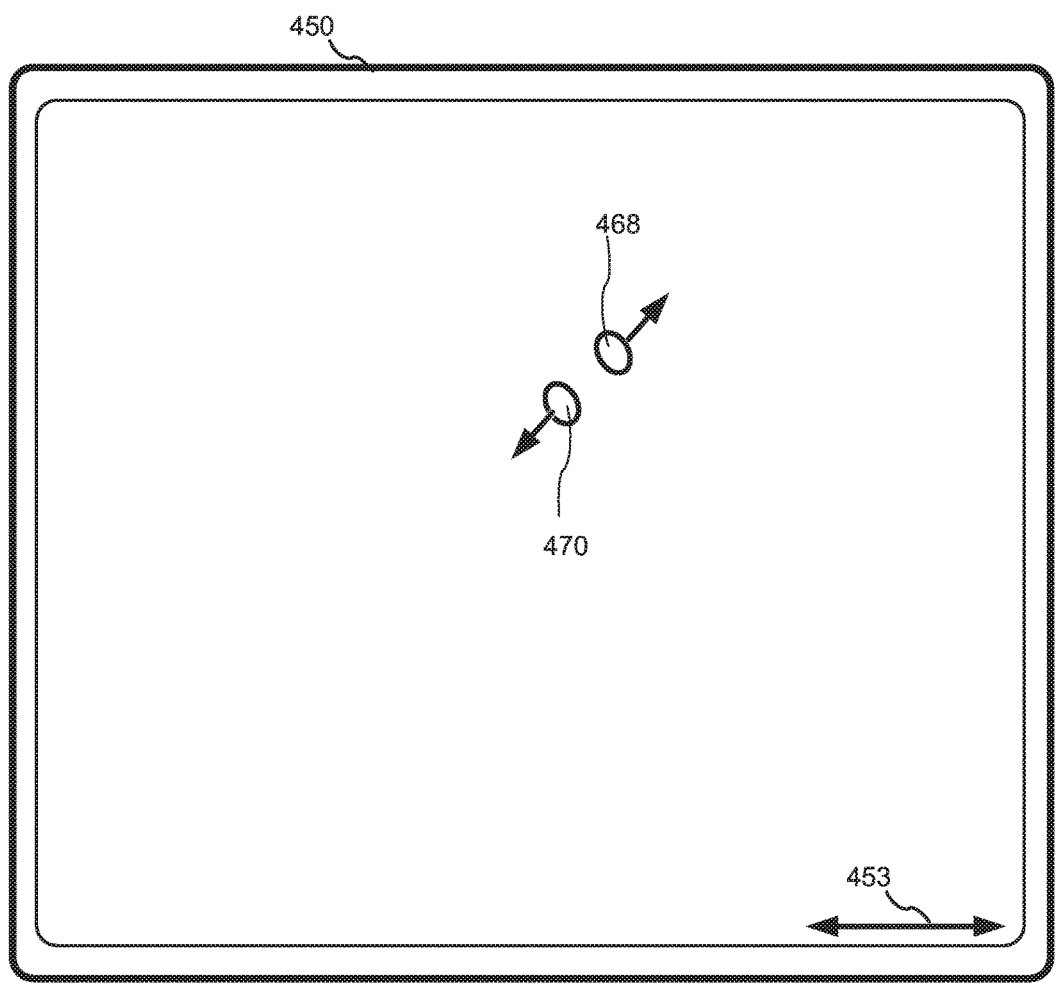
FIG. 4 illustrates an exemplary user interface for a multifunction device with a touch-sensitive surface that is separate from the display in accordance with some embodiments of the disclosure.
Figure 4:
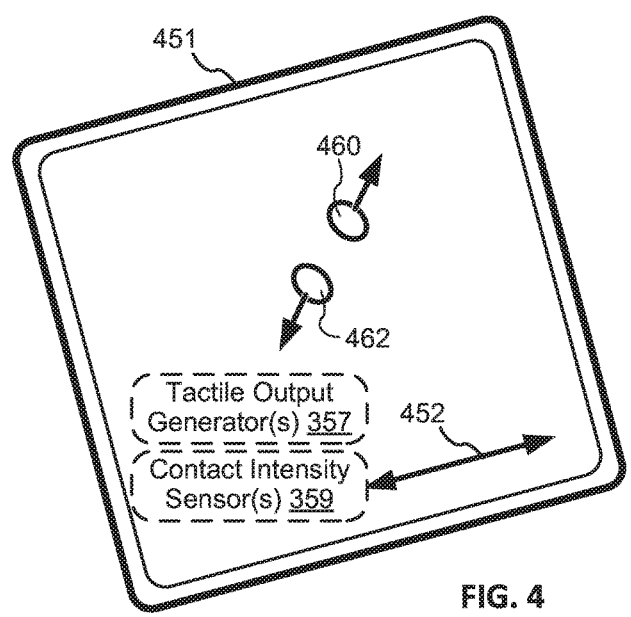

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
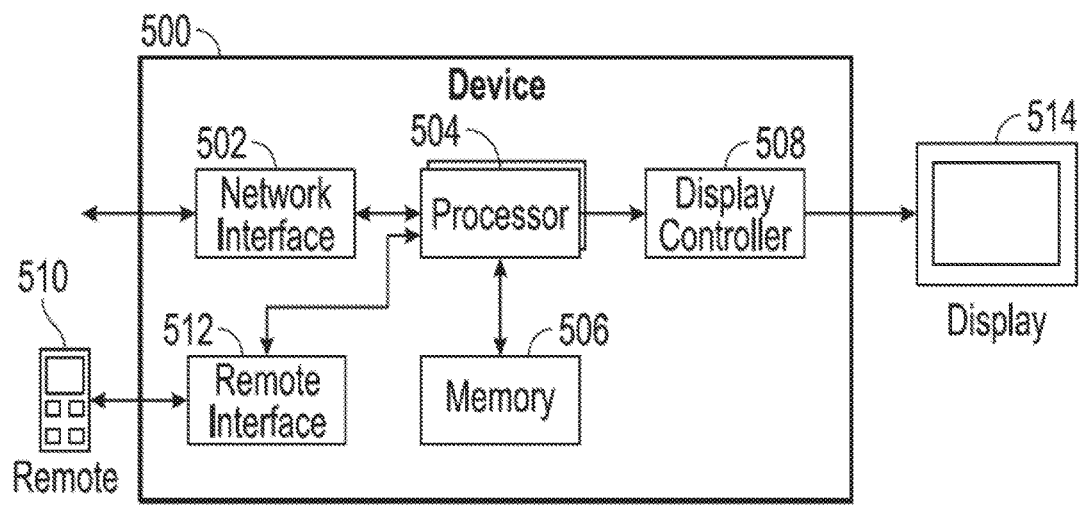
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
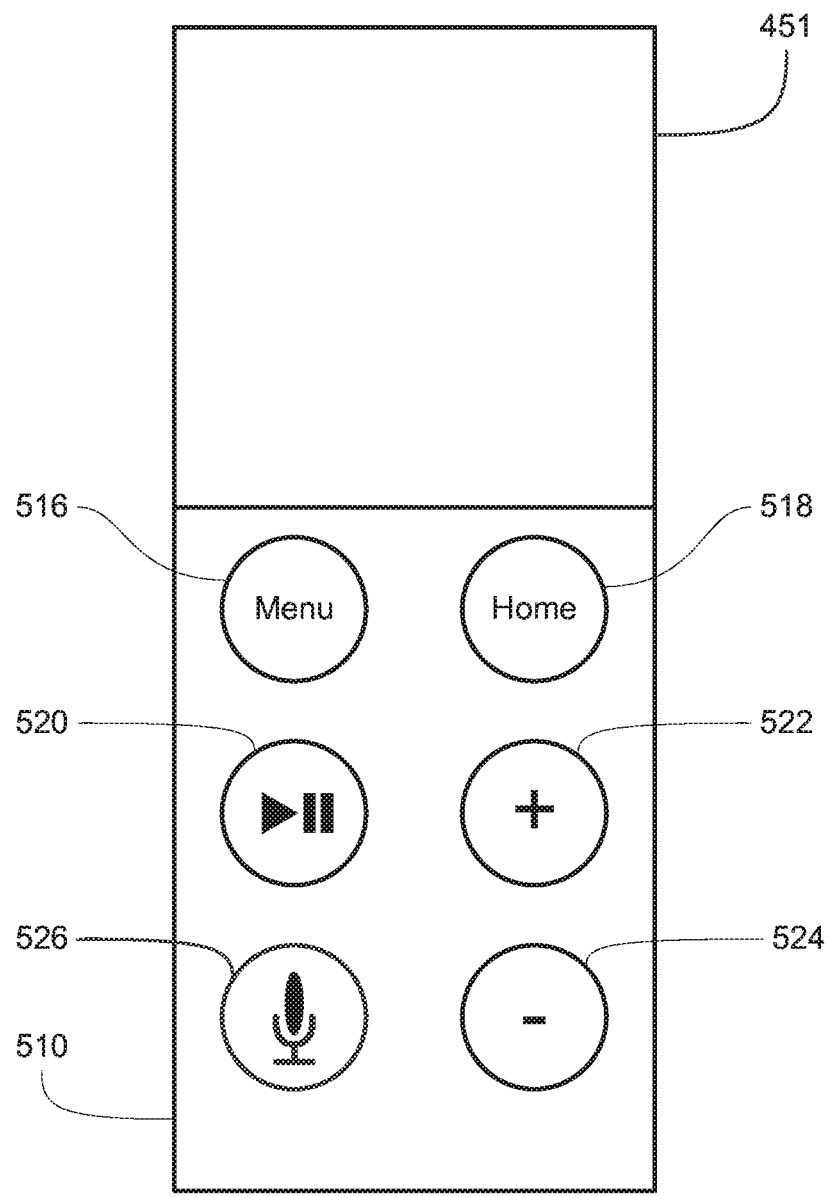

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

User Interfaces and Associated Processes

Accelerated Scrolling

Users interact with electronic devices in many different manners, including interacting with content (e.g., music, movies, etc.) that may be available (e.g., stored or otherwise accessible) on the electronic devices. In some circumstances, the users desire to quickly scroll through collections of items on the electronic devices (e.g., lists of content available on the electronic devices). The embodiments described below provide ways in which electronic devices allow users to quickly scroll through collections of items displayed in a user interface, thereby enhancing users' interactions with the electronic devices. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
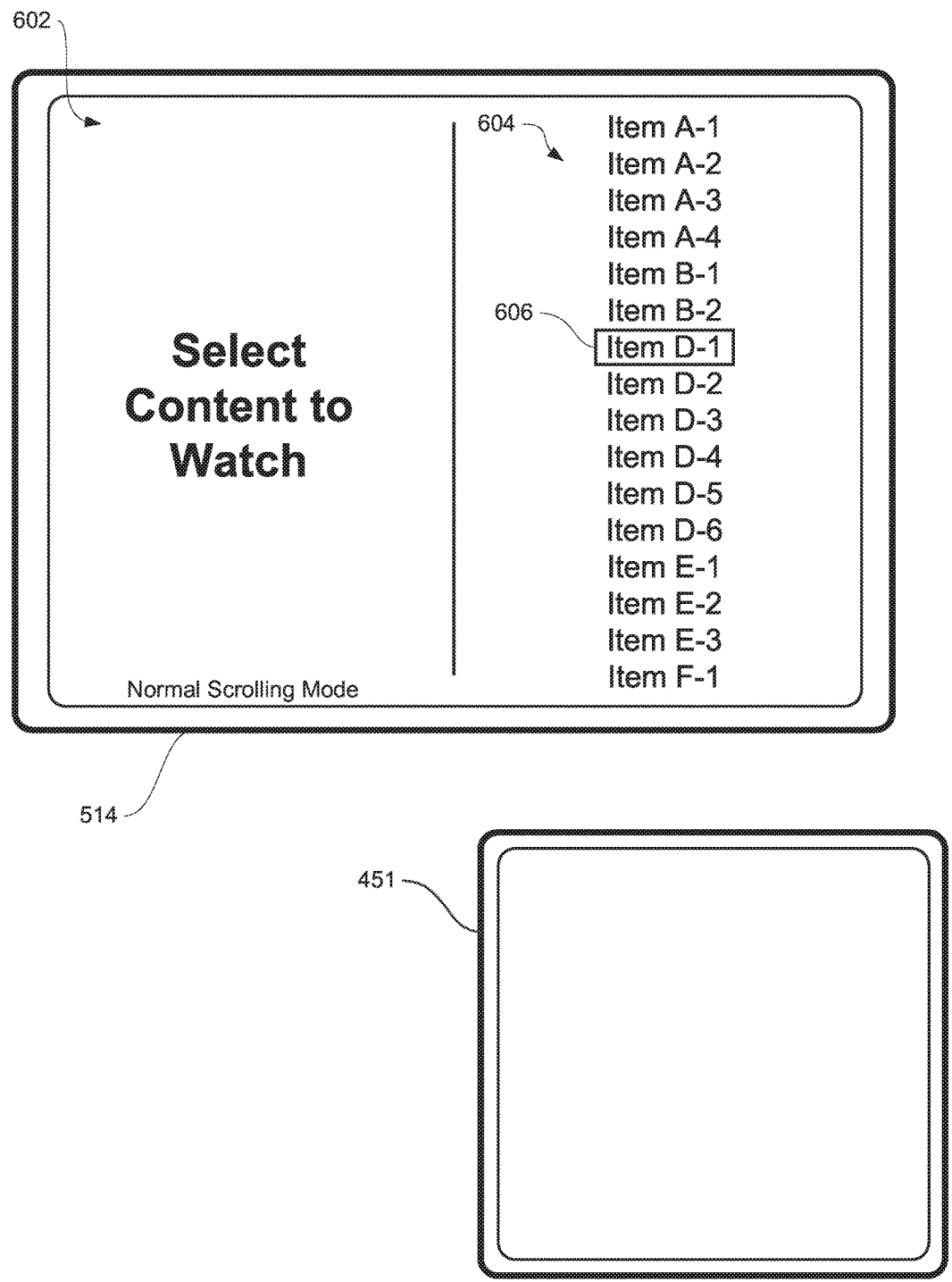
FIGS. 6A-6NN illustrate exemplary ways in which an electronic device provides for accelerated scrolling through collections of items in accordance with some embodiments of the disclosure.
Figure 6B:
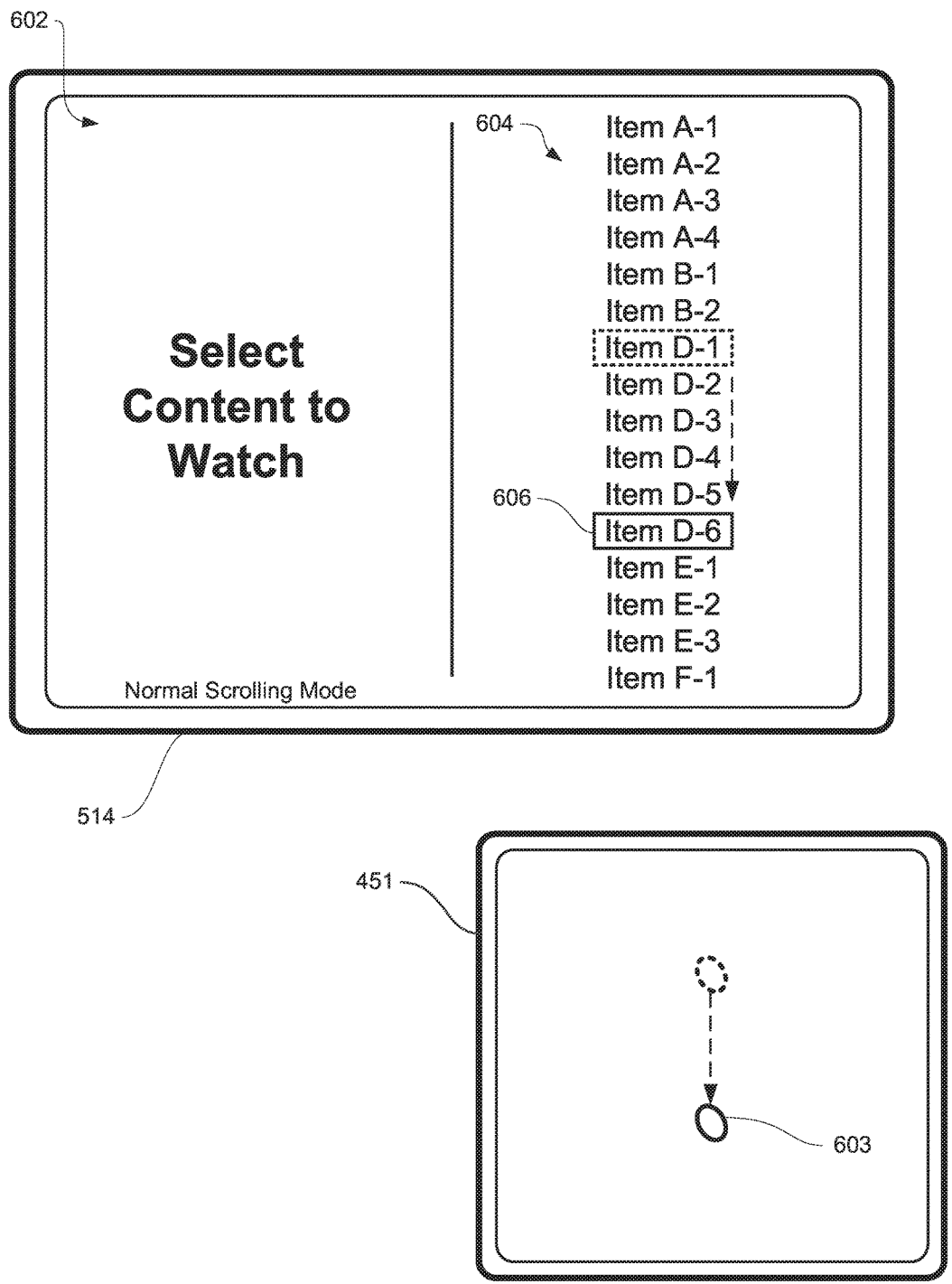
Figure 6C:
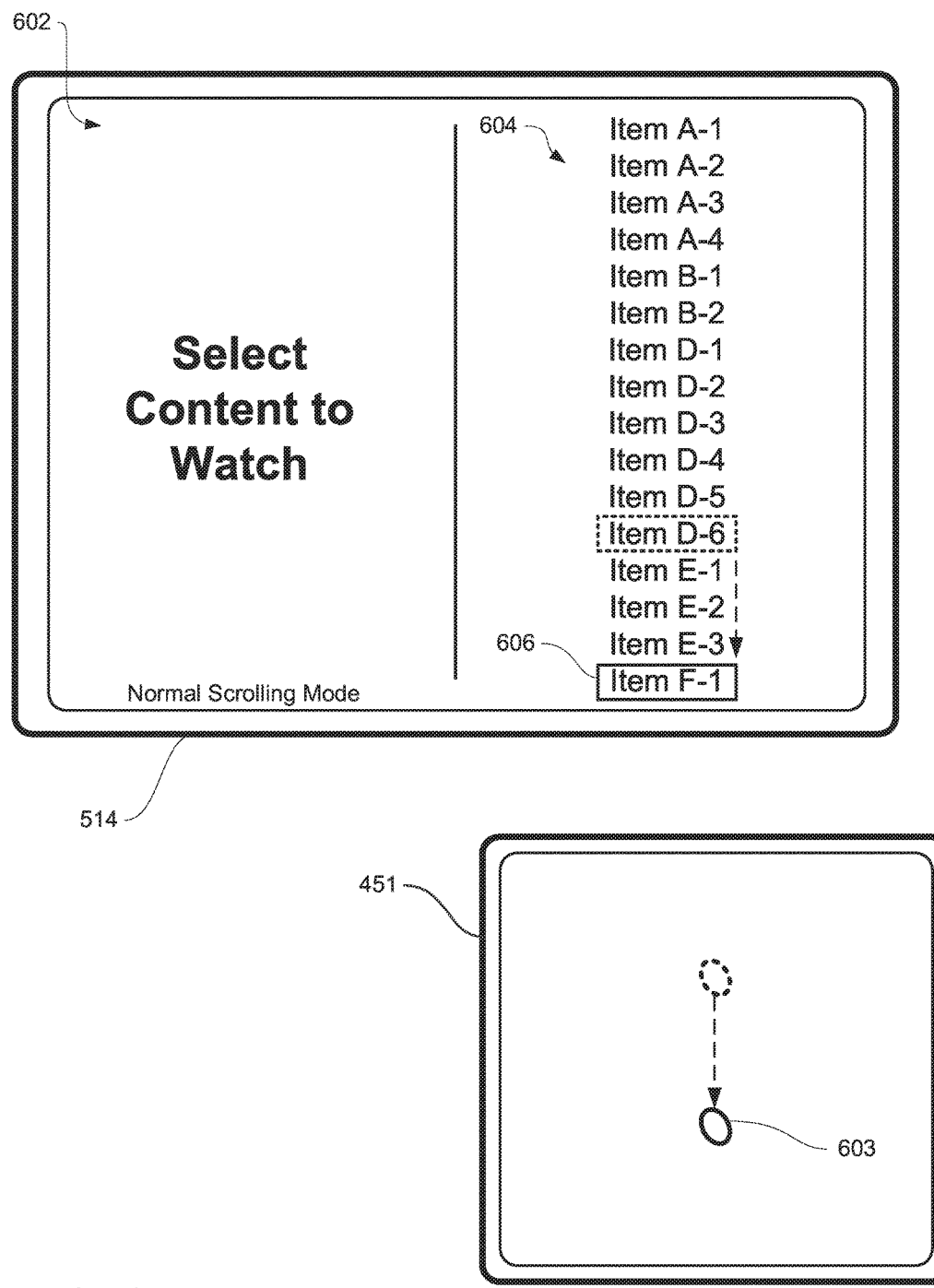
Figure 6D:
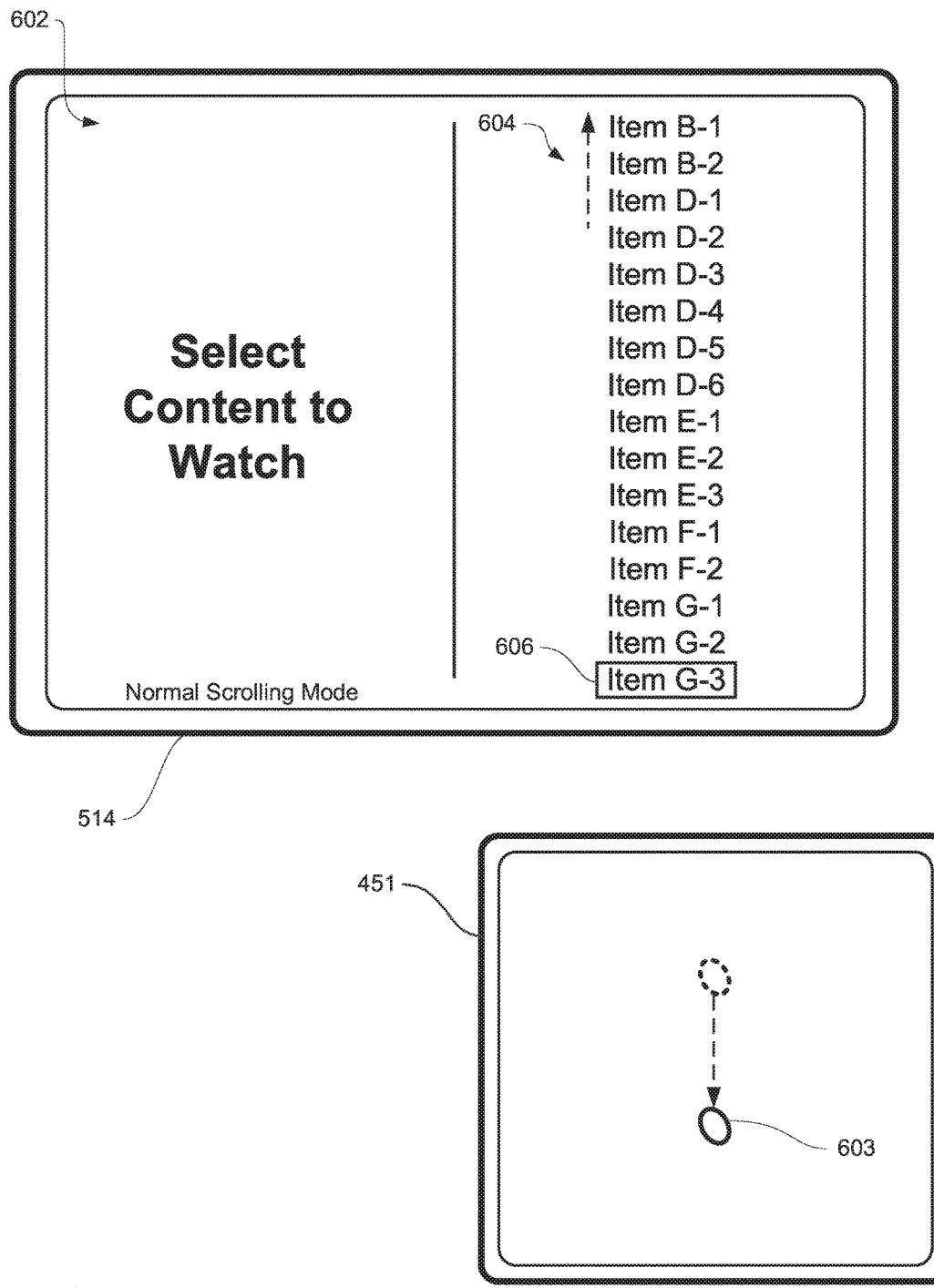
Figure 6E:
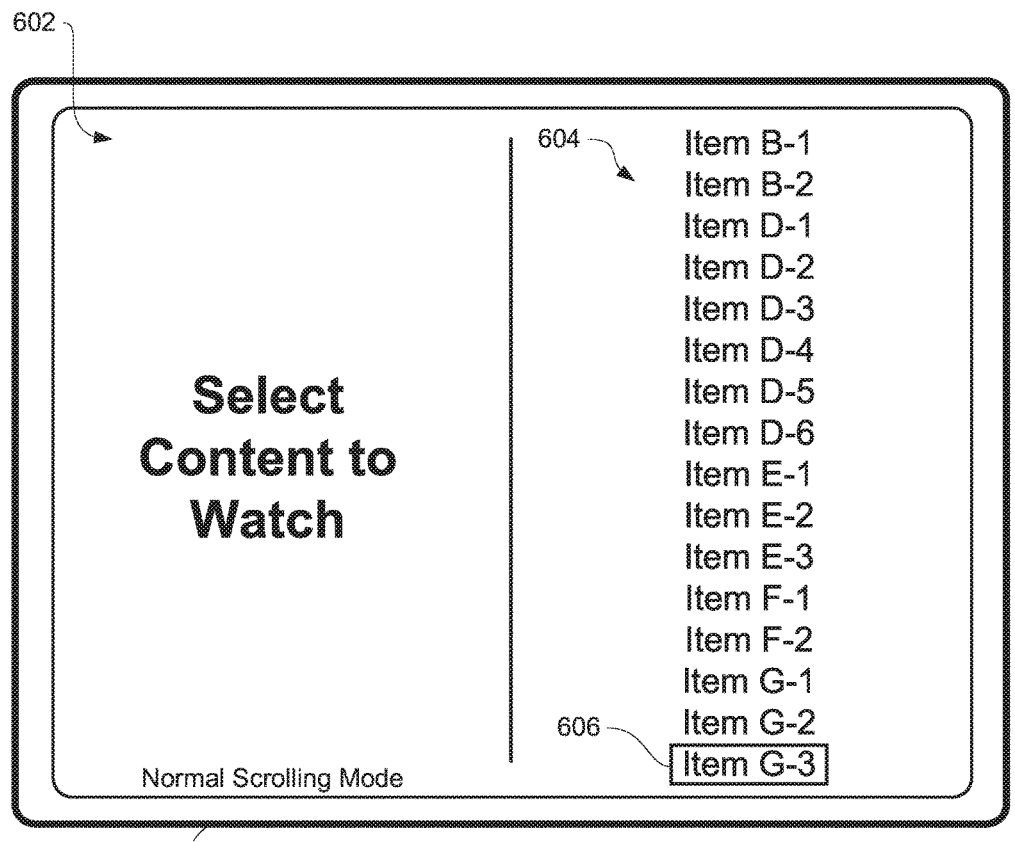
Figure 6E:
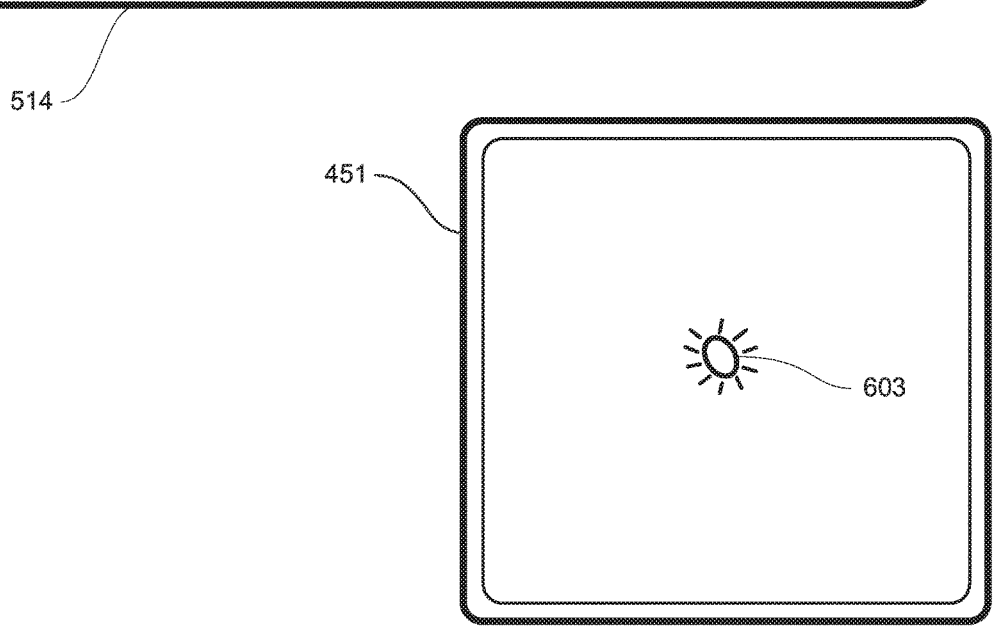
Figure 6F:
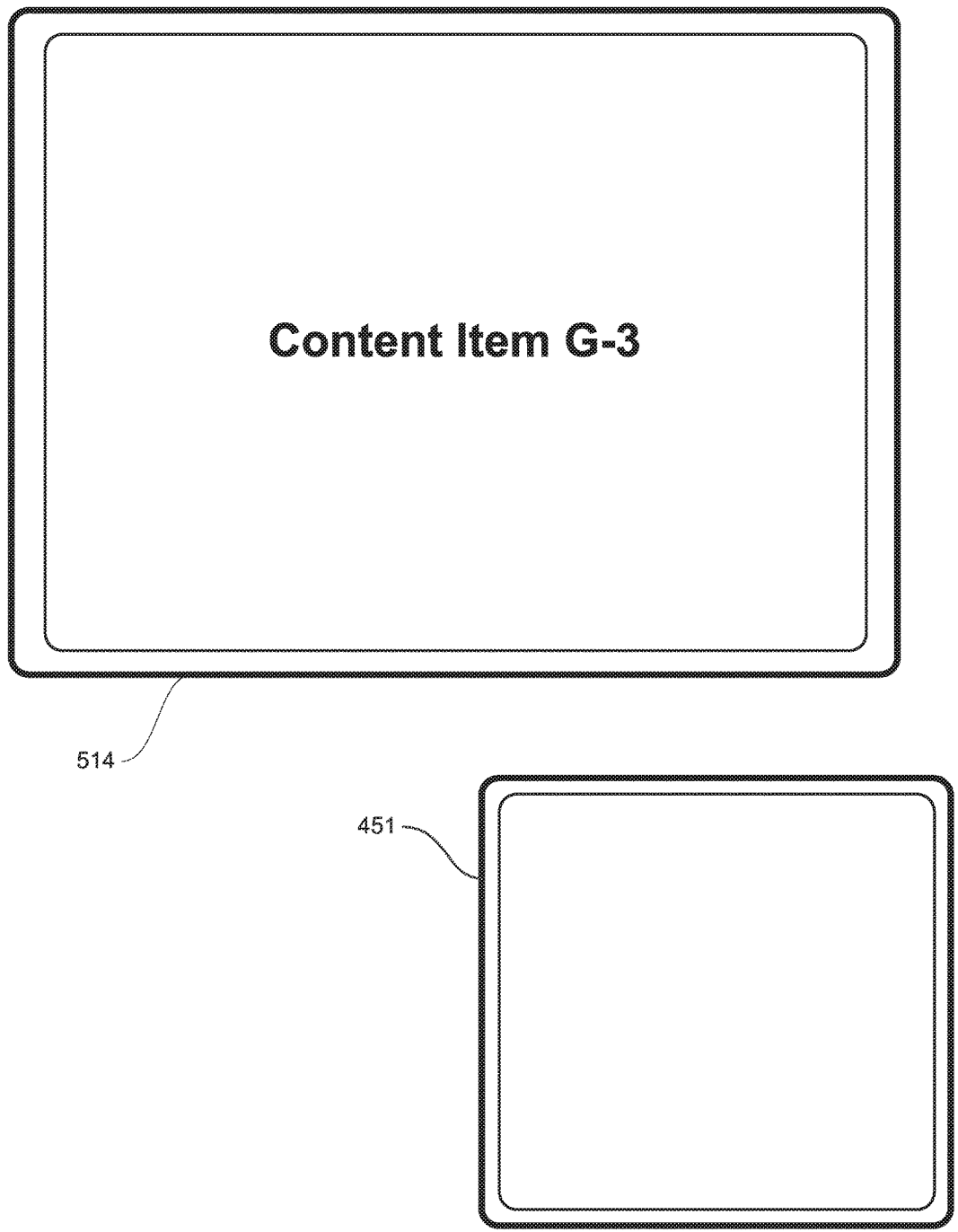
Figure 6G:
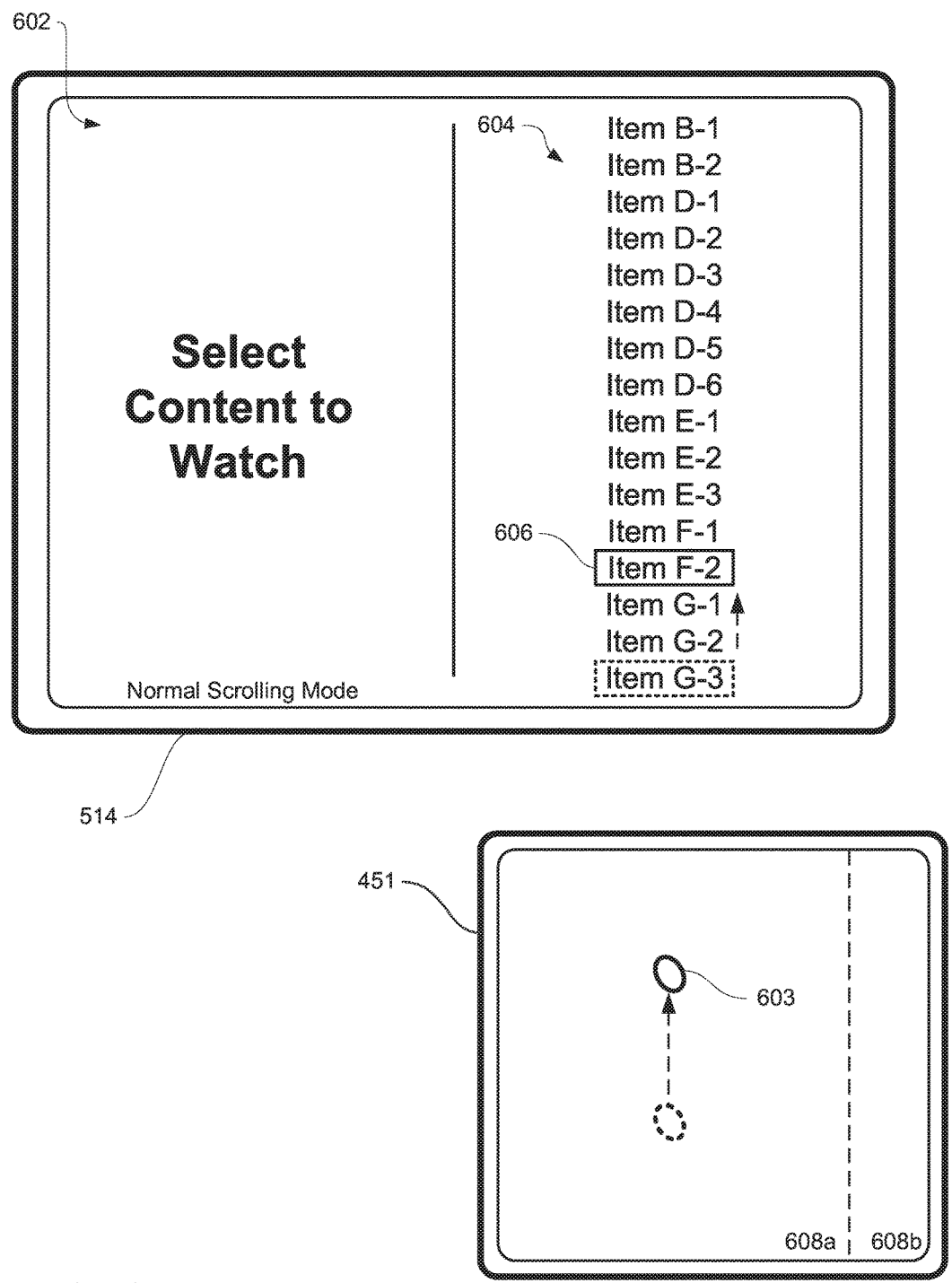
Figure 6H:
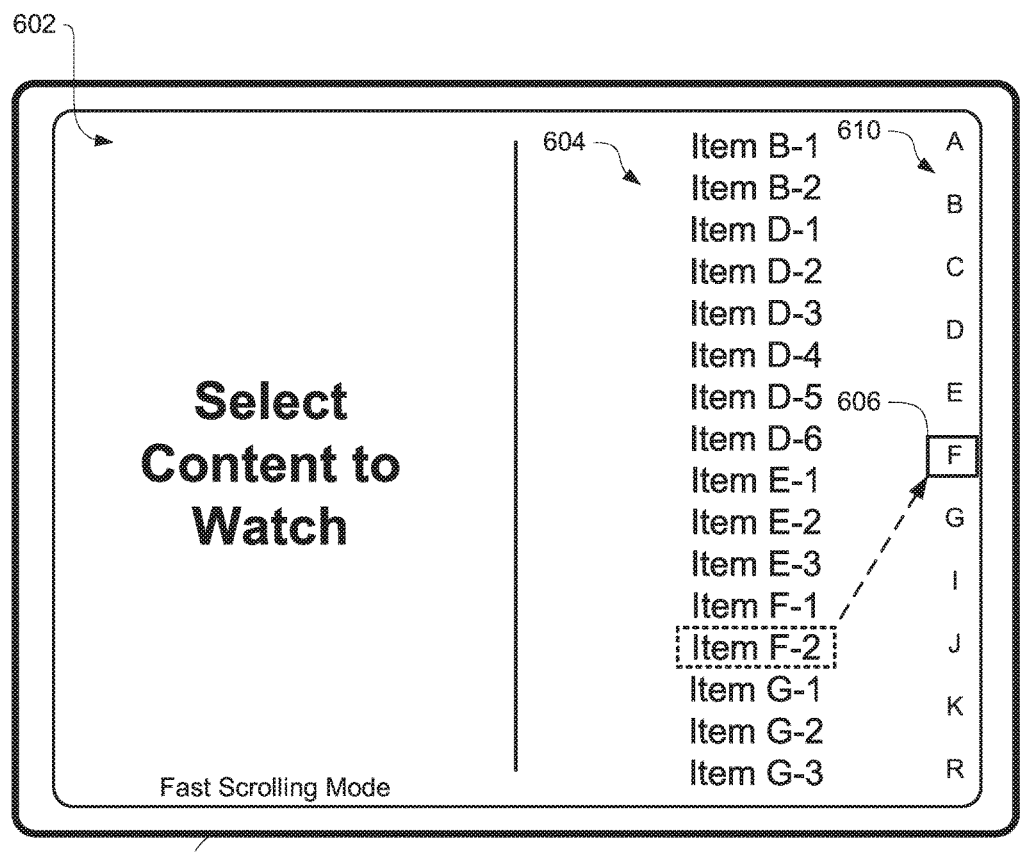
Figure 6H:
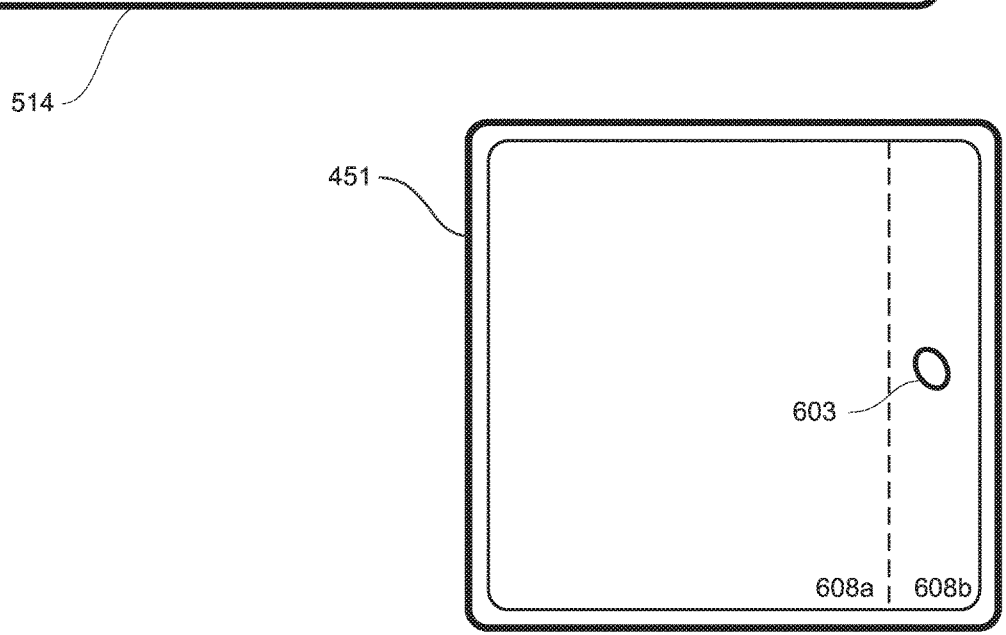
Figure 6I:
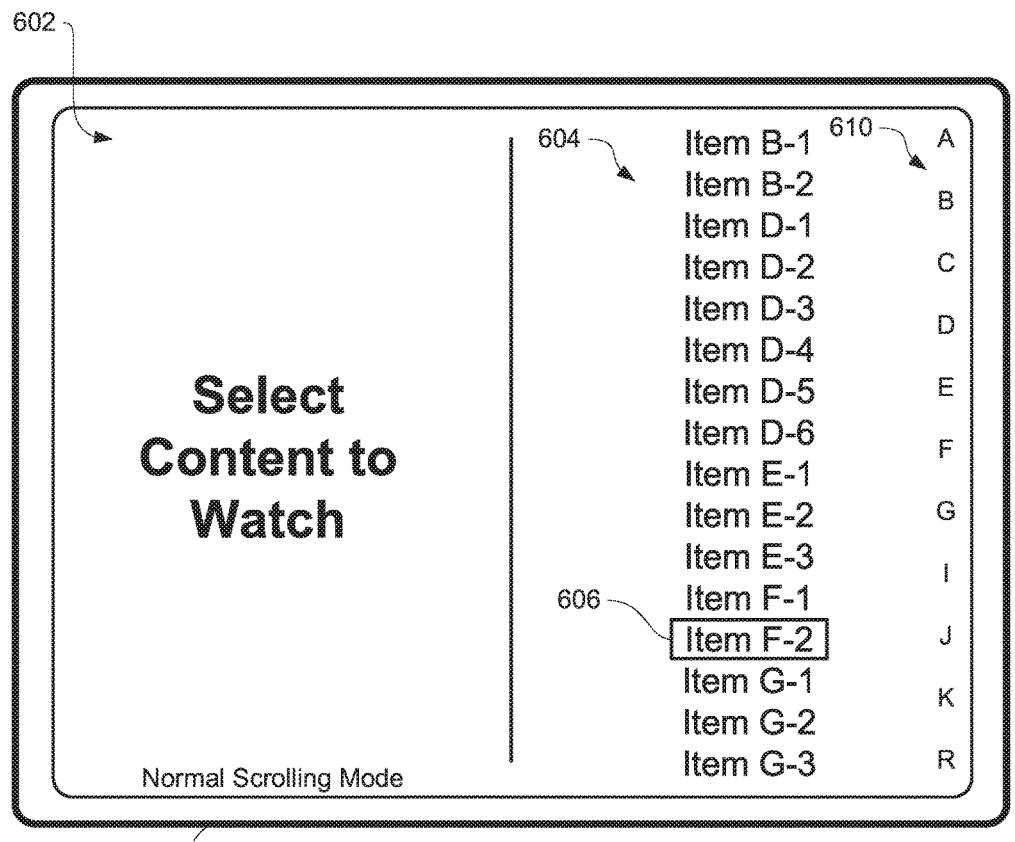
Figure 6I:
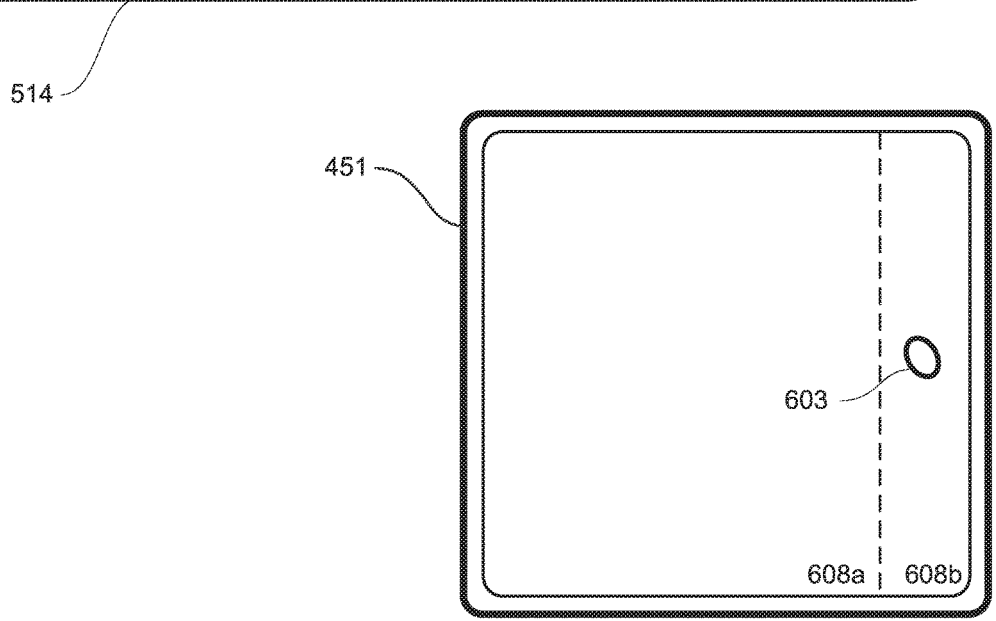
Figure 6J:
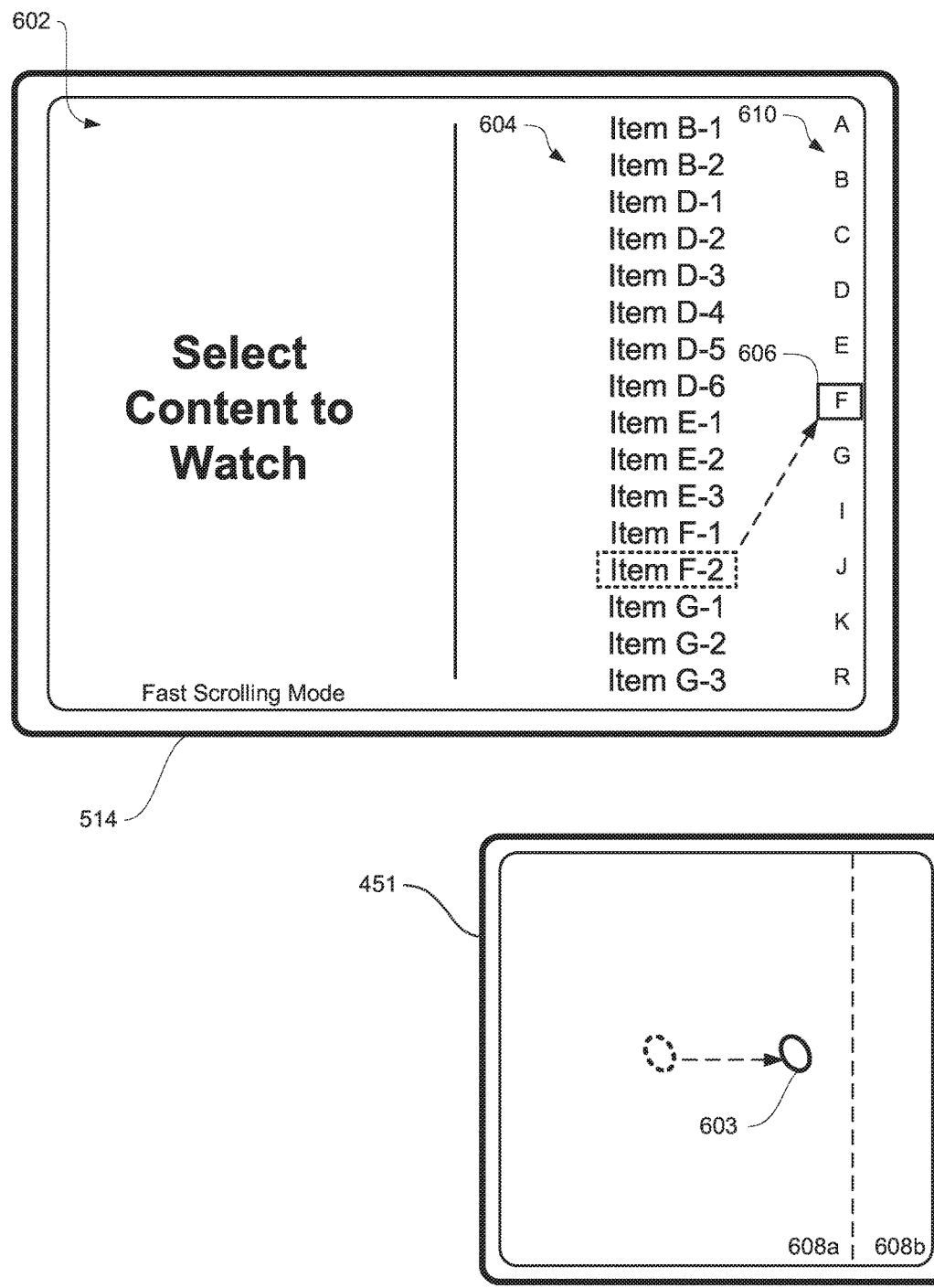
Figure 6K:
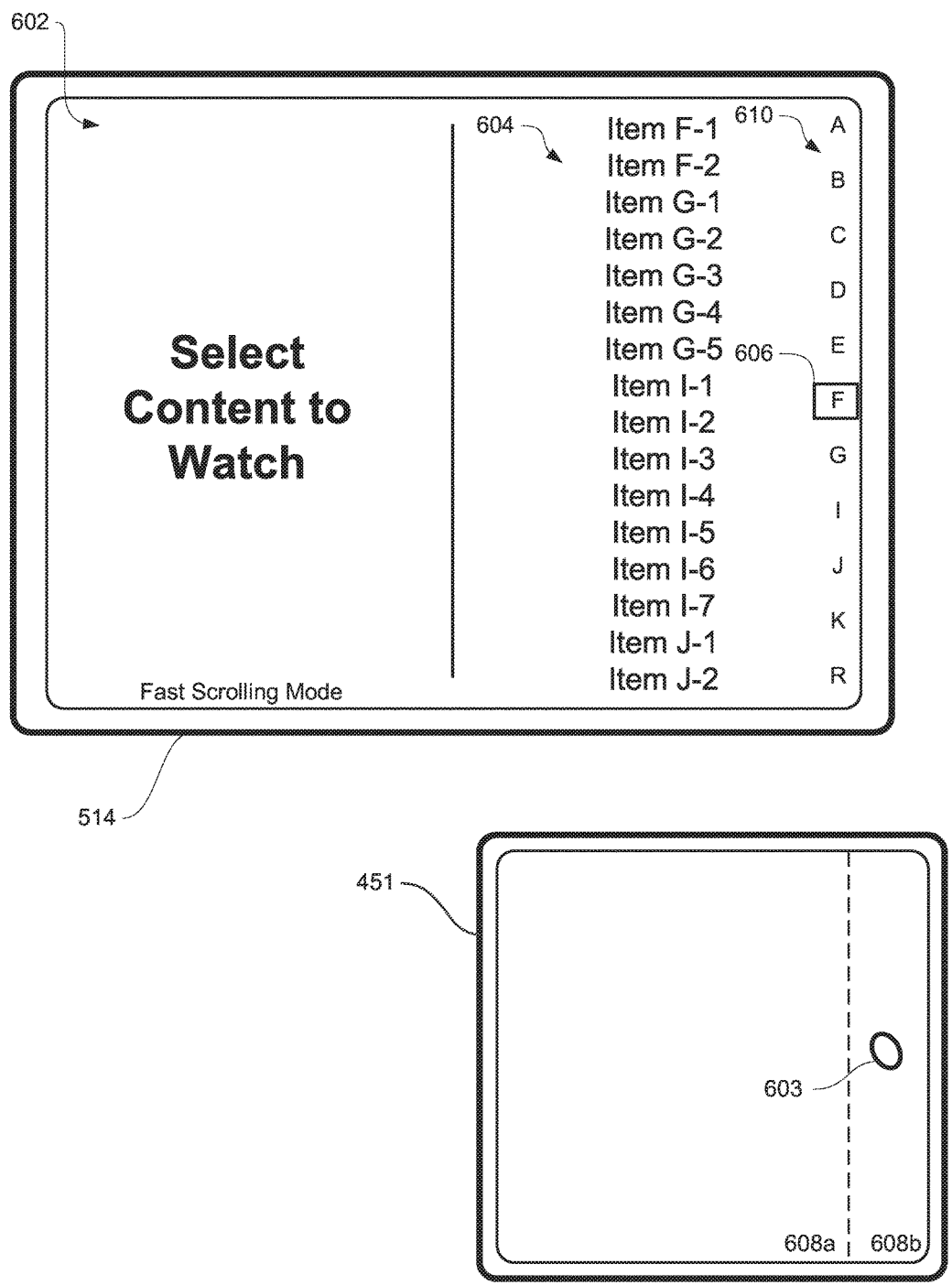
Figure 6L:
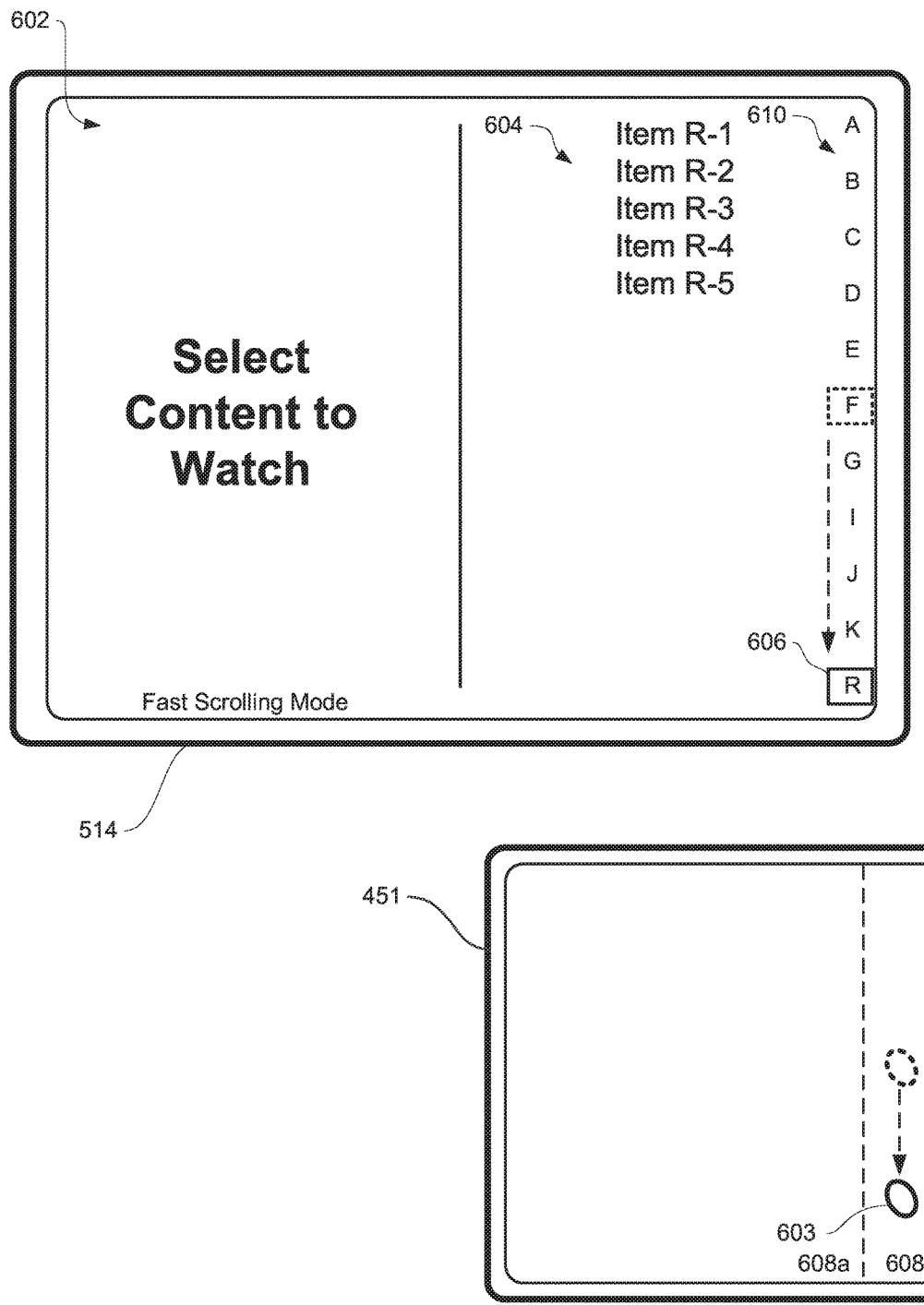
Figure 6M:
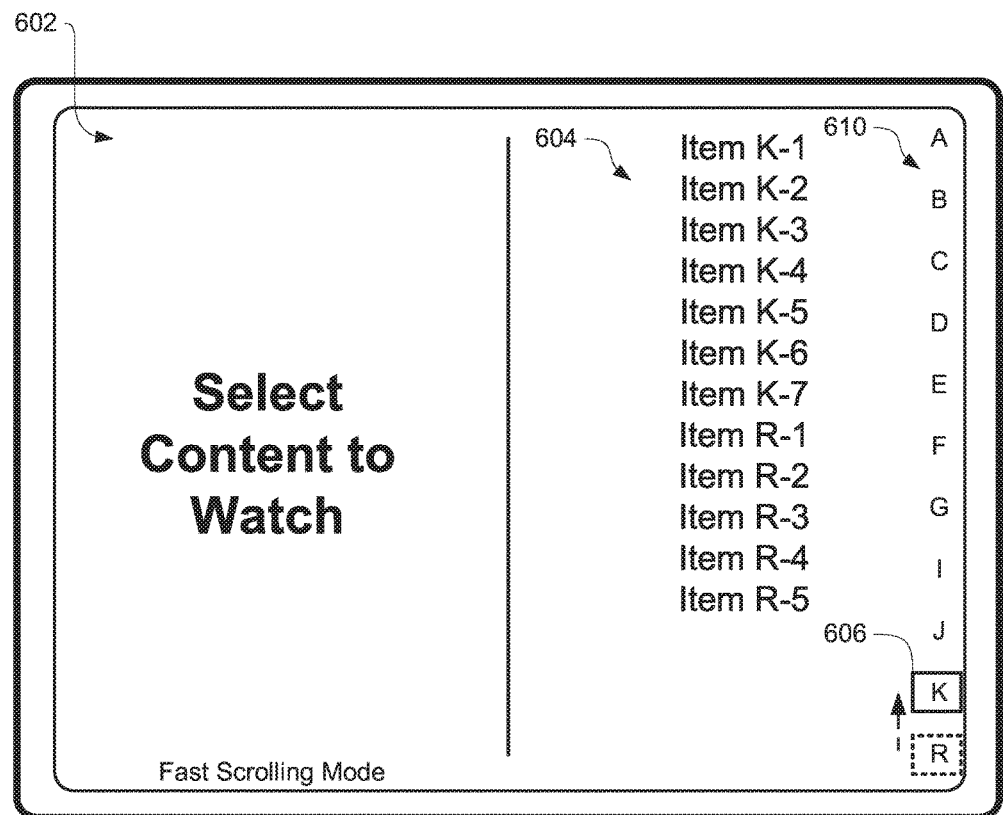
Figure 6M:
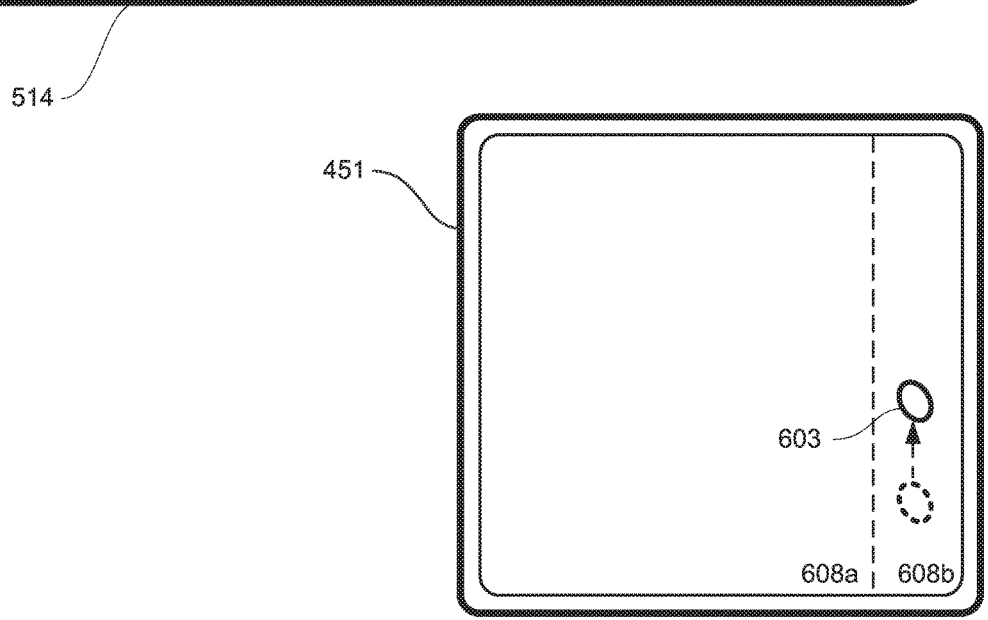
Figure 6N:
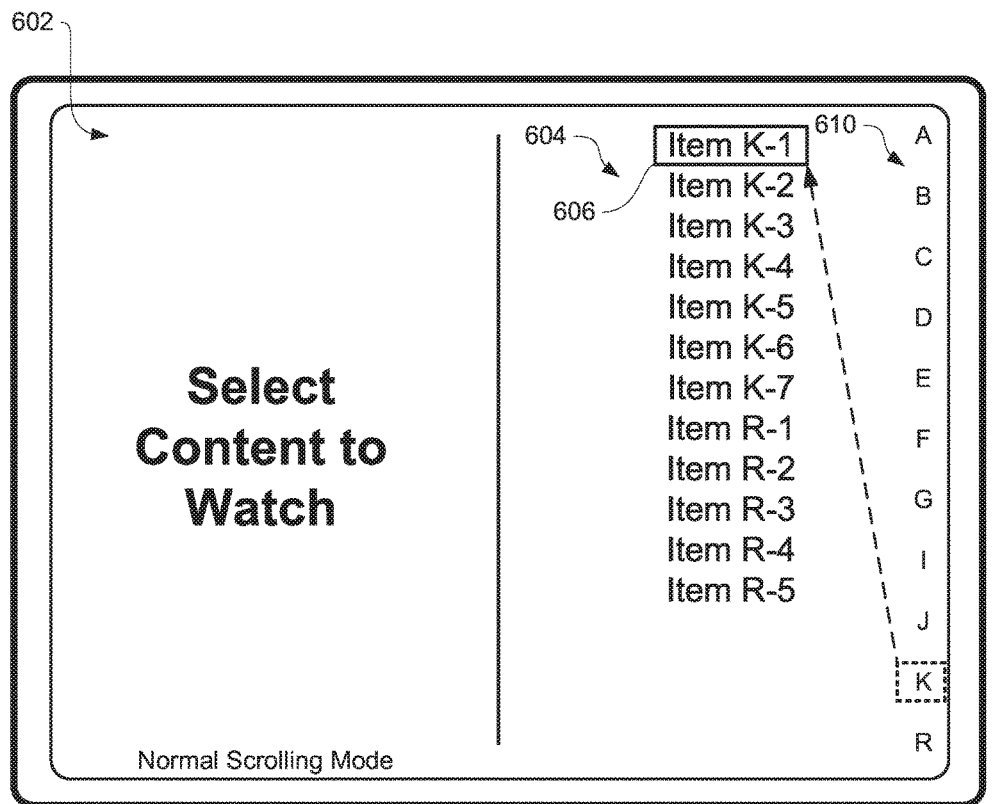
Figure 6N:
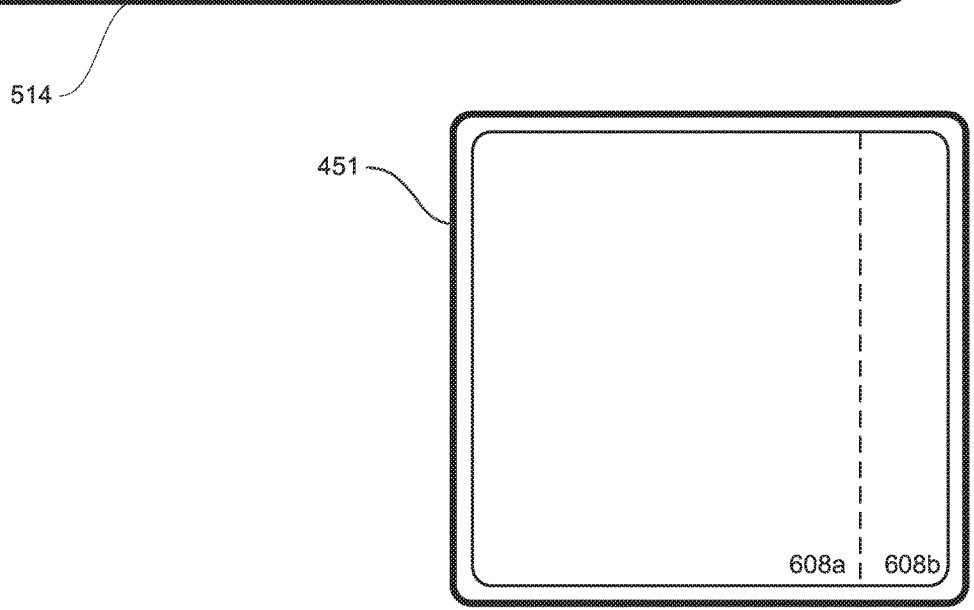

FIGS. 6A-6NN illustrate exemplary ways for facilitating quickly scrolling through lists of items in accordance with some embodiments of the disclosure. The embodiments in these figures are used to illustrate the processes described below, including the processes described with reference to FIGS. 7A-7N.

FIG. 6A illustrates exemplary display 514. Display 514 optionally displays one or more user interfaces that include various content. In the example illustrated in FIG. 6A, display 514 displays a content navigation user interface 602 for exploring content available on an electronic device (e.g., electronic device 500 of FIG. 5A) of which display 514 is a part, or to which display 514 is connected. The user interface 602 is optionally displaying a list 604 of content items available to watch on the electronic device. Selection of a content item in list 604 optionally causes that content item to be displayed on display 514. In some embodiments, only a portion of list 604 is visible in user interface 602 at any one moment in time, because the list is optionally longer than can be displayed in the user interface (e.g., items A-1 through F-1 are optionally only a portion of list 604). A specific item in list 604 has the focus, indicated by cursor or current selection indicator 606—in FIG. 6A, item D-1 has the focus. Current selection indicator 606 optionally merely indicates which item in user interface 602 has the focus, and may or may not be displayed in the user interface (e.g., an item with focus in the user interface is optionally displayed as highlighted or otherwise visually distinguished from items in the user interface without the focus, without displaying a box or other distinct user interface element, such as current selection indicator 606, in the user interface). For ease of description, movement of current selection indicator 606 will be referenced in the examples that follow to indicate the movement of the focus in user interface 602 from one item to another. Also illustrated in FIG. 6A is touch-sensitive surface 451. Touch-sensitive surface 451 is optionally a touch-sensitive surface on a second electronic device that is configured to control the electronic device, such as a remote control (e.g., remote 510 in FIGS. 5A-5B) or a multifunction device (e.g., device 511 in FIG. 5A). A user of the electronic device is optionally able to scroll through list 604 using touch-sensitive surface 451.

FIG. 6B illustrates a downward swipe of contact 603 detected on touch-sensitive surface 451. List 604 is optionally scrolled through in accordance with the downward swipe. Specifically, current selection indicator 606 optionally moves from item D-1 to item D-6 in list. FIG. 6C illustrates another downward swipe of contact 603 detected on touch-sensitive surface 451, after the downward swipe detected in FIG. 6B. In response to the further downward swipe, current selection indicator 606 continues to move downward in list 604 to item F-1. Item F-1 is optionally the last item of list 604 that is visible in user interface 602.

FIG. 6D illustrates yet another downward swipe of contact 603 detected on touch-sensitive surface 451, after the downward swipe detected in FIG. 6C. Because current selection indicator 606 optionally cannot move further downward in user interface 602 once the current selection indicator has reached the bottom edge of the user interface, list 604 optionally moves upward in the user interface so that current selection indicator 606 continues to move down the list, thus causing previously undisplayed portions of the list—items F-2 to G-3—to now be displayed, and previously displayed portions of the list—items A-1 to A-4—to now be undisplayed. In FIG. 6D, list 604 has moved up in user interface 602 such that current selection indicator 606 is on item G-3. In FIG. 6E, a selection input is detected on touch-sensitive surface 451 while current selection indicator 606 is on item G-3 in list 604. For example, a click of touch-sensitive surface 451 is detected, as illustrated by contact 603 in FIG. 6E. As a result of the click, content item G-3—corresponding to item G-3 in list 604—is optionally displayed on display 514, as illustrated in FIG. 6F.

In some circumstances, it is desirable to be able to scroll through list 604 at a faster pace than regularly scrolling through each item in the list, one by one, using swipe inputs on touch-sensitive surface 451. This is especially true in circumstances where list 604 includes large numbers of items (e.g., 50, 100 or 200, or more). The remaining examples of the disclosure provide ways in which accelerated scrolling through list 604 is optionally achieved.

FIG. 6G illustrates list 604 in user interface 602, as previously described. Touch-sensitive surface 451 optionally includes two or more predefined regions, one of which (e.g., region 608a) corresponds to normal scrolling operation, and another one of which (e.g., region 608b) corresponds to fast scrolling operation. Region 608b is optionally at a right edge of touch-sensitive surface 451, and region 608a is optionally the remainder of touch-sensitive surface 451, as illustrated in FIG. 6G, though other configurations of regions 608a and 608b are possible. Inputs detected in region 608a optionally cause normal scrolling of list 604 (e.g., as described with reference to FIGS. 6B-6D), while inputs detected in region 608b optionally cause fast scrolling of list 604, as will be described later. In FIG. 6G, an upward swipe of contact 603 has been detected in region 608a of touch-sensitive surface 451. In response to the upward swipe, current selection indicator 606 has moved from item G-3 to item F-2 in list 604. Additional or alternative scrolling through list 604 is performable in response to inputs detected in region 608a (e.g., as described with reference to FIGS. 6B-6D).

FIG. 6H illustrates contact 603 detected in region 608b of touch-sensitive surface 451. As previously mentioned, touch inputs in region 608b of touch-sensitive surface 451 optionally cause the electronic device to transition to a fast scrolling mode. For example, as shown in FIG. 6H, contact 603 in region 608b causes index 610 to be displayed in user interface 602. Index 610 optionally includes a plurality of index objects that correspond to a plurality of items in list 604. For example, in FIG. 6H, index 610 includes index objects A, B, C, D, E, F, G, I, J, K and R. Index object A optionally corresponds to items A-1 to A-4 in list 604 (illustrated in FIG. 6C, for example), index object B optionally corresponds to items B-1 to B-2 in list 604, and so on. If list 604 does not include any items of a particular type (e.g., items that start with H), then index 610 optionally does not include an index object that corresponds to that type (e.g., index 610 optionally does not include an "H" index object). Further, in some embodiments, an index object in index 610 optionally corresponds to only one item in list 604 (e.g., list 604 may include only one item that starts with "T", and index 610 optionally includes a "T" index object that corresponds to that list item).

In addition to causing display of index 610 in user interface 602, contact 603 detected in region 608b optionally causes (e.g., automatically, without further input on touch-sensitive surface 451) current selection indicator 606 to move from list 604 (e.g., from item F-2 in list 604) to the "F" index object (e.g., the index object in index 610 that corresponds to the item in the list that had current selection indicator 606 when contact 603 was detected in region 608b), as shown in FIG. 6H. As such, the electronic device transitions from the normal scrolling mode to the fast scrolling mode in response to contact 603 detected in region 608b of touch-sensitive surface 451. As will be described later, scrolling current selection indicator 606 through index 610 optionally provides a way for a user to quickly scroll through the items in list 604.

In some embodiments, contact 603 detected in region 608b does not automatically cause current selection indicator 606 to move to index 610, and does not automatically cause the electronic device to transition to the fast scrolling mode. For example, in FIG. 6I, contact 603 is detected in region 608b of touch-sensitive surface 451. In response to the detection of contact 603 in region 608b, index 610 is displayed in user interface 602. However, current selection indicator 606 has remained at item F-2 in list 604 (and the electronic device has remained in the normal scrolling mode), rather than moving automatically to an index object in index 610 (e.g., as in FIG. 6H). Instead, an additional directional input is optionally required to move current selection indicator 606 to index 610 to initiate the fast scrolling mode. For example, in FIG. 6J, after index 610 is displayed in response to contact 603 detected in region 608b of touch-sensitive surface 451, a rightward swipe of contact 603 is detected in region 608a of touch-sensitive surface 451. This rightward swipe of contact 603 causes current selection indicator 606 to move from item F-2 in list 604 to the "F" index object in index 610, and causes the electronic device to transition to the fast scrolling mode.

In some embodiments, the portion of list 604 that is displayed in user interface 602 is updated in accordance with which index object in index 610 has the focus (e.g., has current selection indicator 606) so that one or more of the items in list 604 that correspond to the index object with focus are visible in user interface 602. For example, in FIG. 6K, the "F" index object in index 610 has current selection indicator 606. As a result, the portion of list 604 that is displayed in user interface 602 is updated such that the first list item that corresponds to the "F" index object (e.g., item F-1) is displayed at the top of user interface 602. As current selection indicator 606 is moved from index object to index object in index 610, the portion of list 604 that is displayed in user interface 602 is optionally updated to achieve the above result, as will be described below.

FIG. 6L illustrates scrolling through index 610 in accordance with input detected in region 608b of touch-sensitive surface 451. Specifically, a downward swipe of contact 603 has been detected in region 608b. In response, current selection indicator 606 has moved from the "F" index object to the "R" index object in accordance with the downward swipe. Additionally, the portion of list 604 included in user interface 602 has been updated such that item R-1 (the first item in list 604 that corresponds to the "R" index object) is displayed at the top of user interface 602.

FIG. 6M illustrates further scrolling through index 610 in accordance with input detected in region 608b of touch-sensitive surface 451. Specifically, an upward swipe of contact 603 has been detected in region 608b after the downward swipe of contact 603 detected in FIG. 6L. The upward swipe of FIG. 6M is optionally detected after the downward swipe of FIG. 6L, without liftoff of contact 603 between the downward swipe and the upward swipe. In response to the upward swipe of contact 603, current selection indicator 606 has moved from the "R" index object to the "K" index object in index 610. Additionally, the portion of list 604 included in user interface 602 has been updated such that item K-1 (the first item in list 604 that corresponds to the "K" index object) is displayed at the top of user interface 602.

Figure 6O:
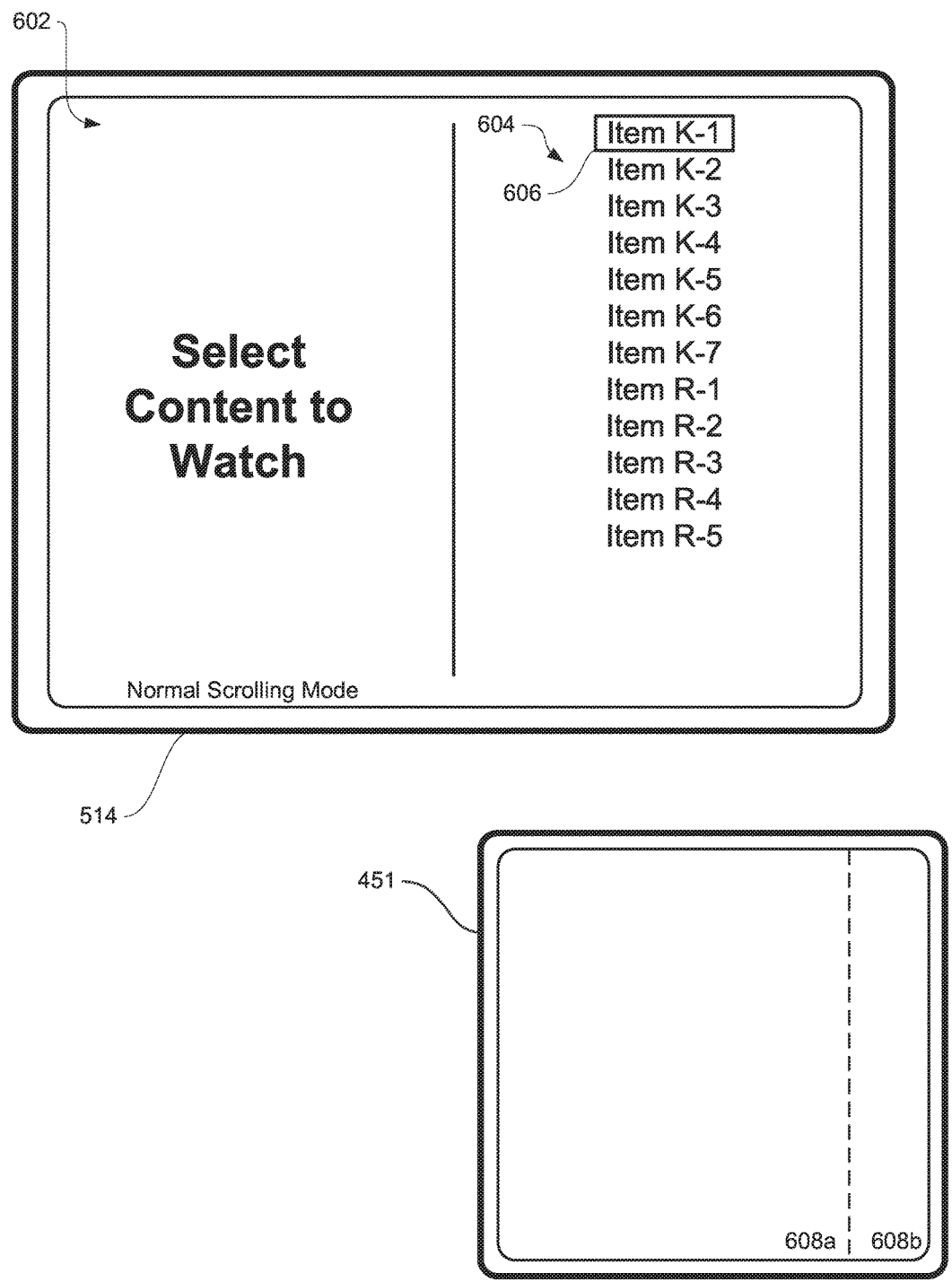

In some embodiments, the electronic device exits from the fast scrolling mode in response to not detecting a contact in region 608b of touch-sensitive surface 451 (in some embodiments, in response to not detecting a contact in region 608b of touch-sensitive surface 451 for longer than a predetermined time, such as 0.5, 1 or 2 seconds). For example, in FIG. 6N, no contact is detected in region 608b. In response, the electronic device transitions away from the fast scrolling mode, and into the normal scrolling mode. Additionally, current selection indicator 606 optionally moves from index 610 to list 604. Specifically, current selection indicator 606 optionally moves to an item in list 604 (e.g., the first item in the list) that corresponds to the index object that had current selection indicator 606 when the electronic device transitioned from the fast scrolling mode to the normal scrolling mode. In the example of FIG. 6N, current selection indicator 606 moves from the "K" index object (e.g., the index object that had current selection indicator 606 when the transition back to the normal scrolling mode was initiated) to item K-1 in list 604 (e.g., the first item in list 604 that corresponds to the "K" index object). Further, in some embodiments, when the electronic device transitions back to the normal scrolling mode, the electronic device ceases to display index 610 in user interface 602, as illustrated in FIG. 6O. From here, normal scrolling and/or selection of items in list 604 is optionally performed, as described with reference to FIGS. A-F. Thus, as has been described above, and as will be described below, a user of the electronic device is able to scroll through index objects in index 610, and when the desired index object has current selection indicator 606, the user is able to transition back to the normal scrolling mode to select the desired item in list 604. Such operation enhances the user's ability to scroll through list 604 quickly.

Figure 6P:
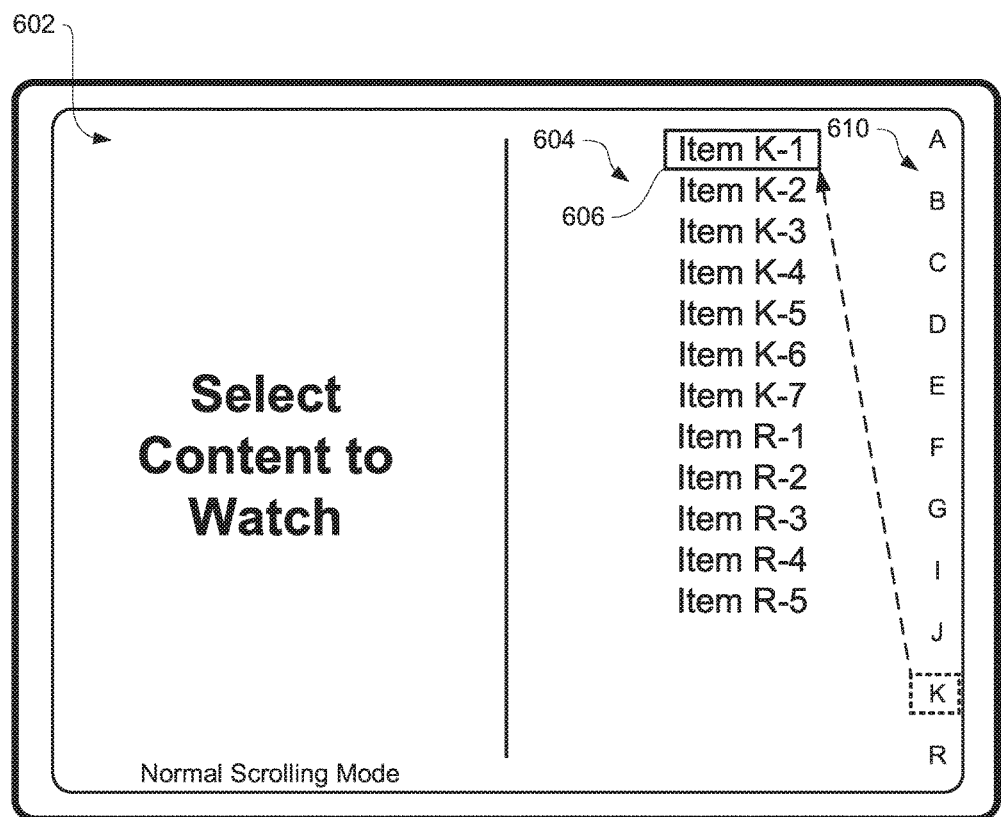
Figure 6P:
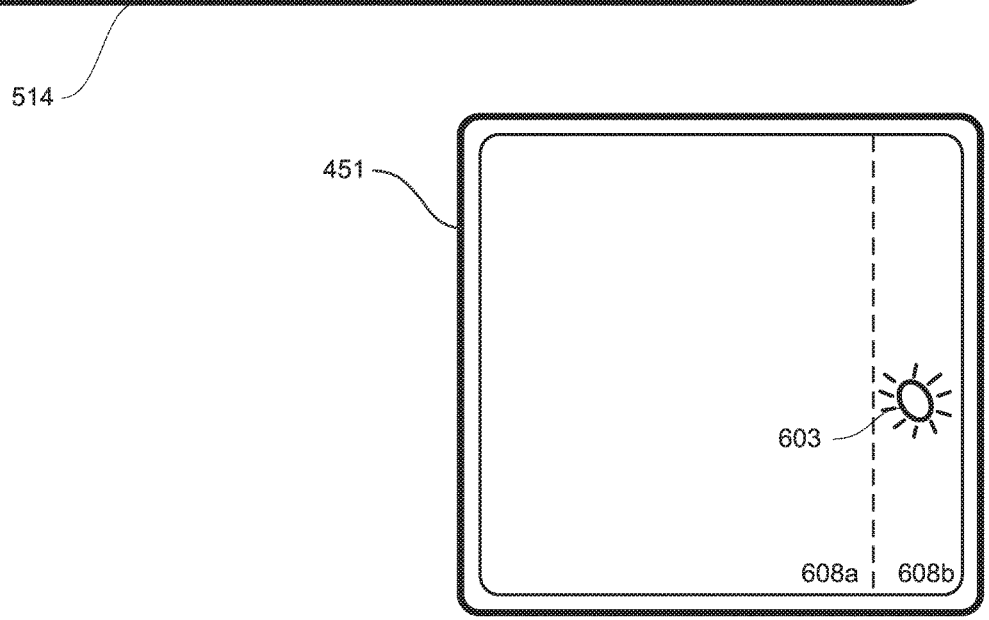
Figure 6Q:
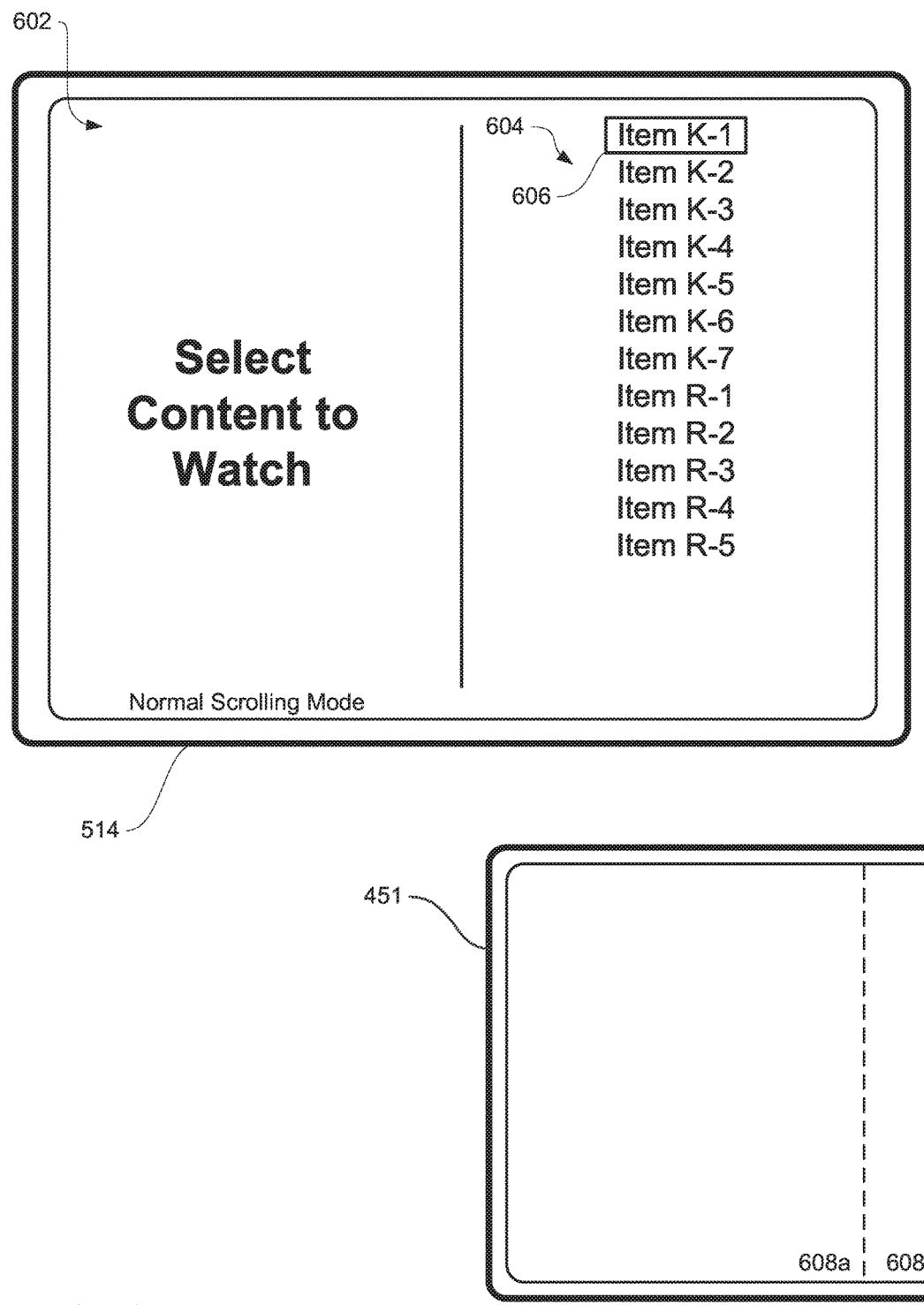

In some embodiments, the electronic device transitions back to the normal scrolling mode in response to a selection of an index object in index 610, as illustrated in FIG. 6P. Specifically, a selection input (e.g., a click or a tap) has been detected in region 608b of touch-sensitive surface 451, as illustrated by contact 603 in FIG. 6P, while the "K" index object has current selection indicator 606. In response, the electronic device has transitioned to the normal scrolling mode, and current selection indicator 606 has moved to item K-1 in list 604 (e.g., as described with reference to FIG. 6N). Further, in some embodiments, when the electronic device transitions back to the normal scrolling mode, the electronic device ceases to display index 610 in user interface 602, as illustrated in FIG. 6Q. From here, normal scrolling and/or selection of items in list 604 is optionally performed, as described with reference to FIGS. A-F.

Figure 6R:
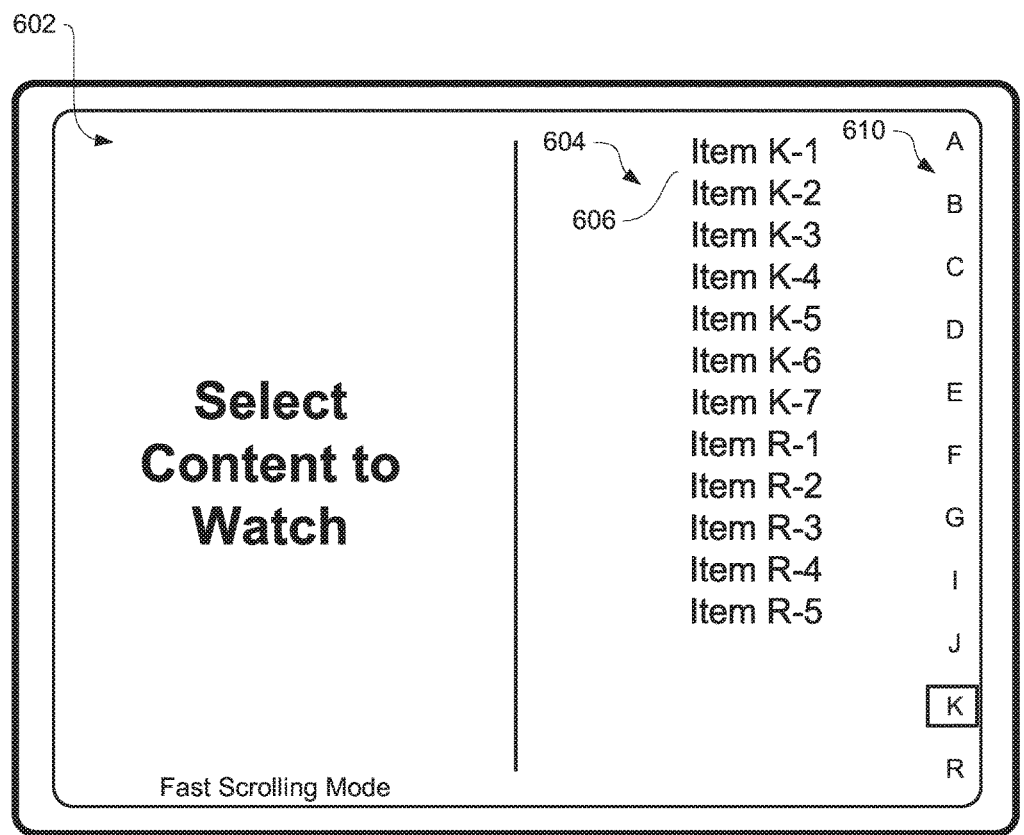
Figure 6R:
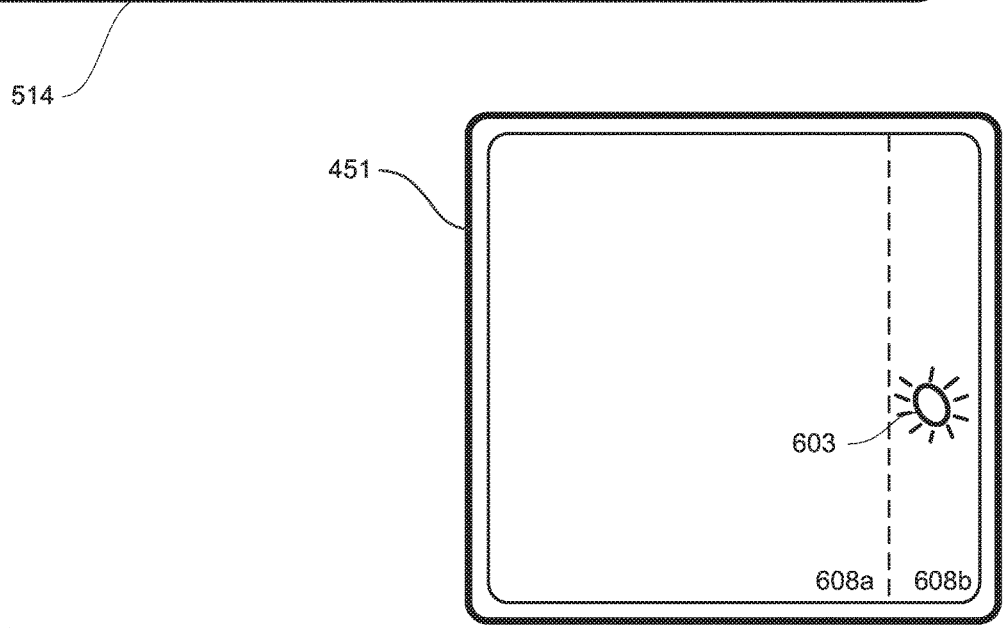

In some embodiments, index objects are not selectable—for example, selection of an index object optionally does not cause any action to be performed at the electronic device (in contrast to selection of an item in list 604, as described with reference to FIGS. 6E-6F, for example), as illustrated in FIG. 6R. Specifically, in FIG. 6R, the electronic device is in the fast scrolling mode, and the "K" index object in index 610 has current selection indicator 606. While the "K" index object has current selection indicator 606, a selection input (e.g., a click or a tap) has been detected in region 608b of touch-sensitive surface 451, as illustrated by contact 603 in FIG. 6R. In response, no action has been performed by the electronic device. Current selection indicator 606 is still over the "K" index object in index 610, and the electronic device is still in the fast scrolling mode, as shown in FIG. 6R. Rather, in the embodiment of FIG. 6R, the electronic device optionally transitions from the fast scrolling mode to the normal scrolling mode when no contact is detected on touch-sensitive surface 451 (e.g., as described with reference to FIGS. 6N-6O).

Figure 6S:
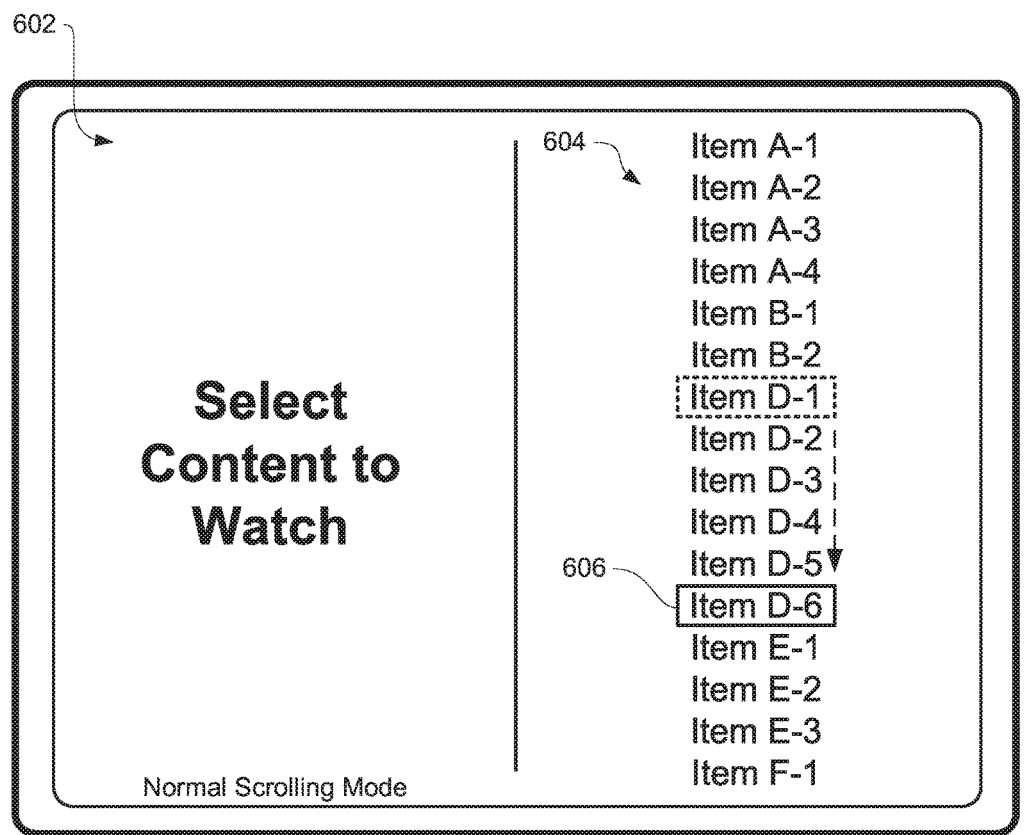
Figure 6S:
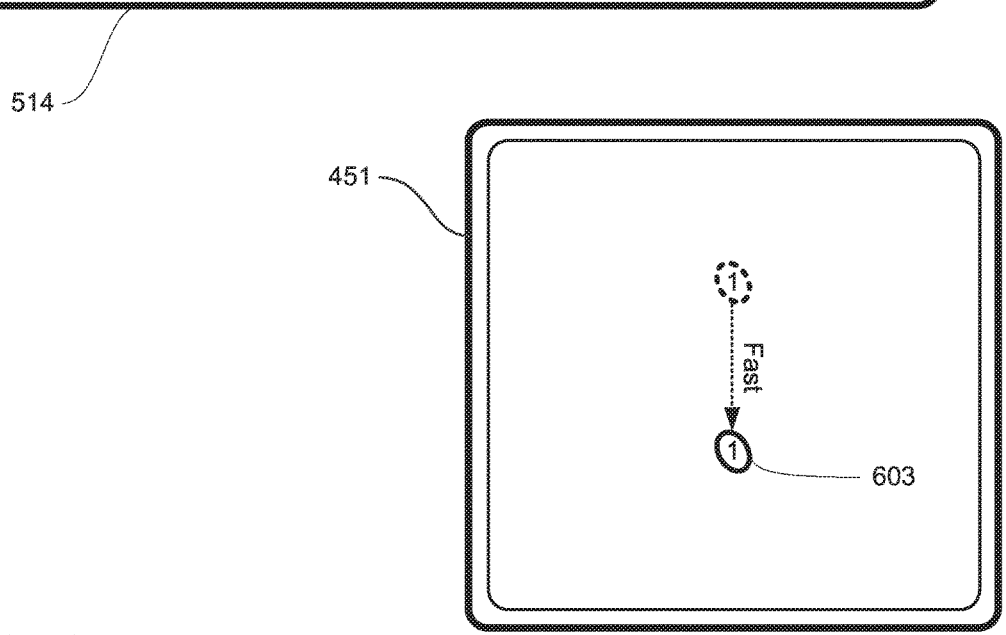
Figure 6T:
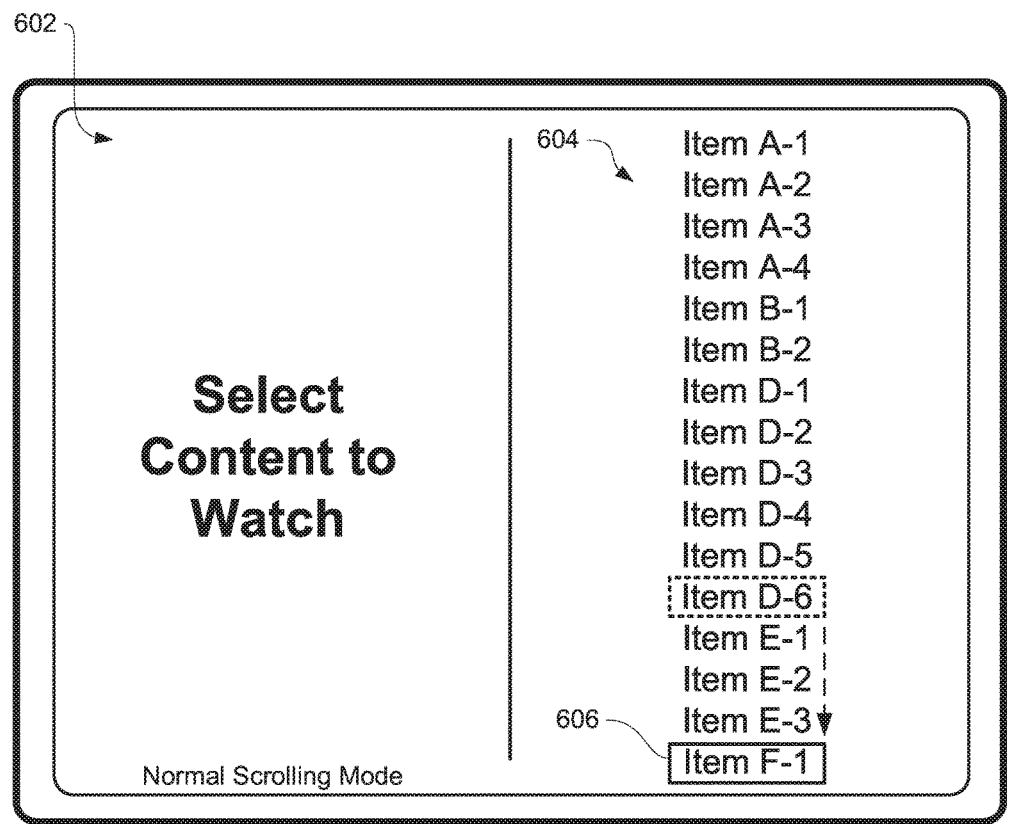
Figure 6T:
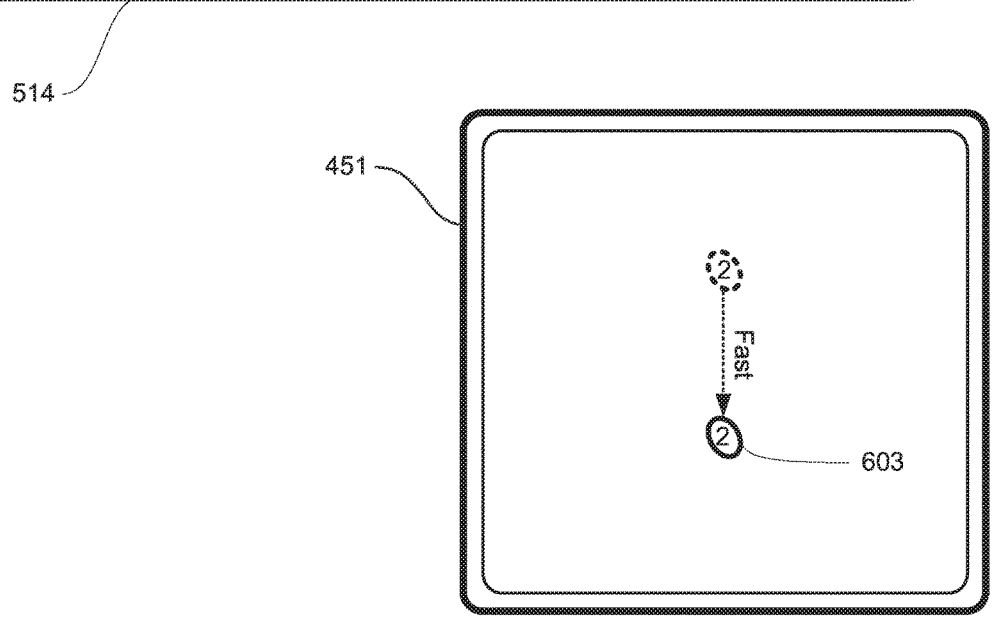
Figure 6U:
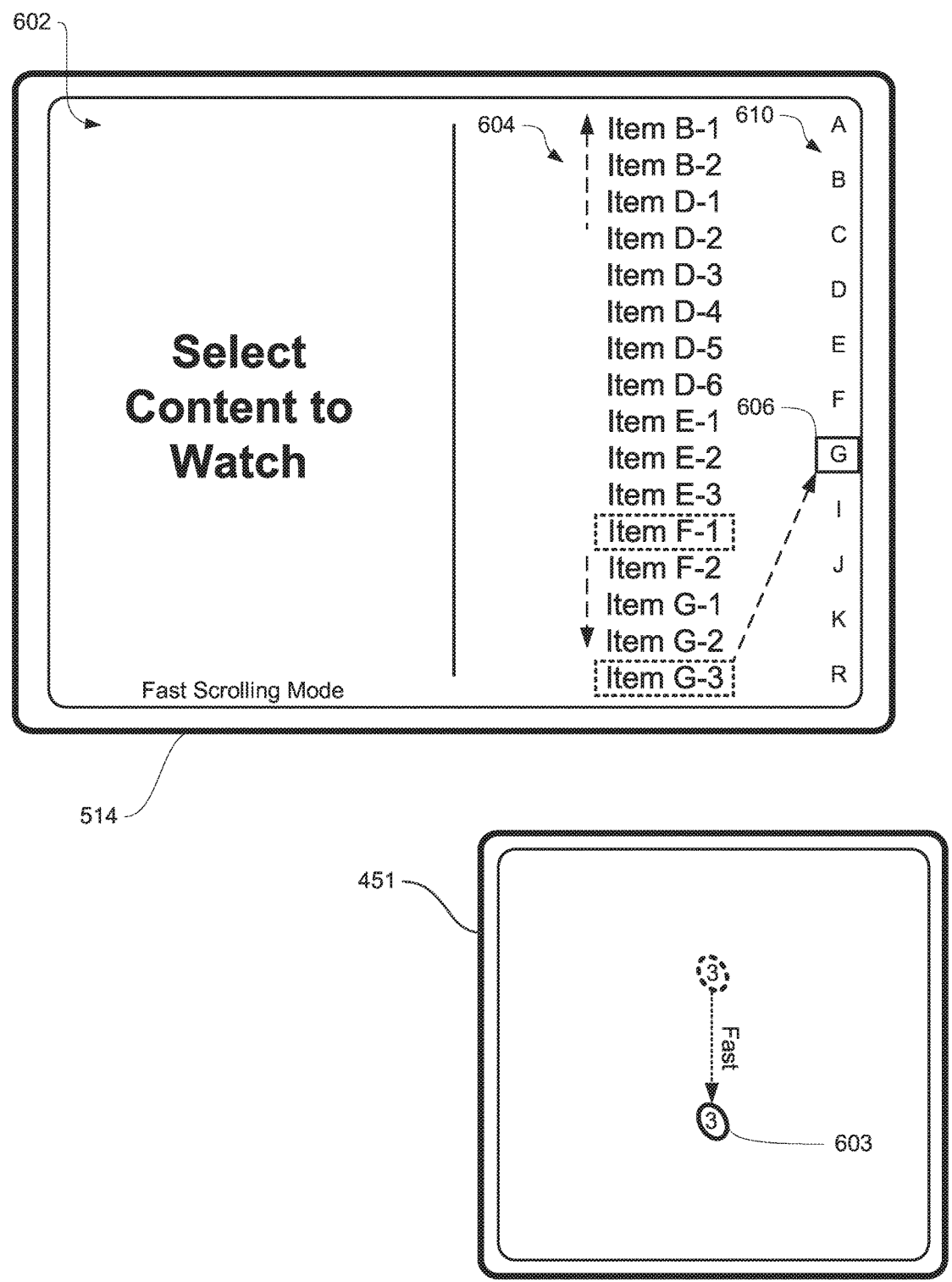

In some embodiments, the electronic device transitions to the fast scrolling mode in response to multiple quick swipes detected in quick succession on touch-sensitive surface 451 (e.g., two, three or five distinct swipes having speeds greater than a speed threshold within a time threshold, such as 0.3, 0.5 or 1 seconds, of one another). FIGS. 6S-6U illustrate the electronic device transitioning to the fast scrolling mode in response to detecting three quick swipes in quick succession of one another. FIG. 6S illustrates a first quick (e.g., faster than a threshold speed) downward swipe of contact 603 detected on touch-sensitive surface 451. The electronic device is in the normal scrolling mode when (and after) this first quick swipe is detected. In some embodiments, because the electronic device is not yet in the fast scrolling mode, the first quick swipe causes current selection indicator 606 to move from item D-1 to item D-6 in list 604 in accordance with the first quick swipe (e.g., as described with reference to FIGS. 6B-6D).

In FIG. 6T, a second quick (e.g., faster than the threshold speed) downward swipe of contact 603 is detected on touch-sensitive surface 451. The electronic device is still in the normal scrolling mode when (and after) this second quick swipe is detected. The second quick swipe is optionally detected within a time threshold (e.g., 0.3, 0.5 or 1 seconds) of the end of the first quick swipe of FIG. 6S. Further, the second quick swipe is optionally distinct from the first quick swipe (e.g., touchdown, movement and liftoff of contact 603 optionally defines a distinct swipe input). In some embodiments, because the electronic device is not yet in the fast scrolling mode, the second quick swipe causes current selection indicator 606 to move from item D-6 to item F-1 in list 604 in accordance with the second quick swipe (e.g., as described with reference to FIGS. 6B-6D).

In FIG. 6U, a third quick (e.g., faster than the threshold speed) downward swipe of contact 603 is detected on touch-sensitive surface 451. The third quick swipe is optionally detected within a time threshold (e.g., 0.3, 0.5 or 1 seconds) of the end of the second quick swipe of FIG. 6T. Further, the third quick swipe is optionally distinct from the second quick swipe (e.g., touchdown, movement and liftoff of contact 603 optionally defines a distinct swipe input). As the third quick swipe is being detected, current selection indicator 606 optionally moves from item F-1 to item G-3 in list 604. Additionally, once the completion of the third quick swipe is detected, the electronic device optionally transitions to the fast scrolling mode (e.g., because three quick swipes have been detected in quick succession of one another). As part of the transition of the electronic device to the fast scrolling mode, index 610 is displayed in user interface 602, and current selection indicator 606 is moved (e.g., automatically, without further input on touch-sensitive surface 451) from item G-3 in list 604 to the "G" index object in index 610 (e.g., similar to as described with reference to FIG. 6H). As such, the electronic device transitions from the normal scrolling mode to the fast scrolling mode in response to the third quick swipe detected on touch-sensitive surface 451.

Figure 6V:
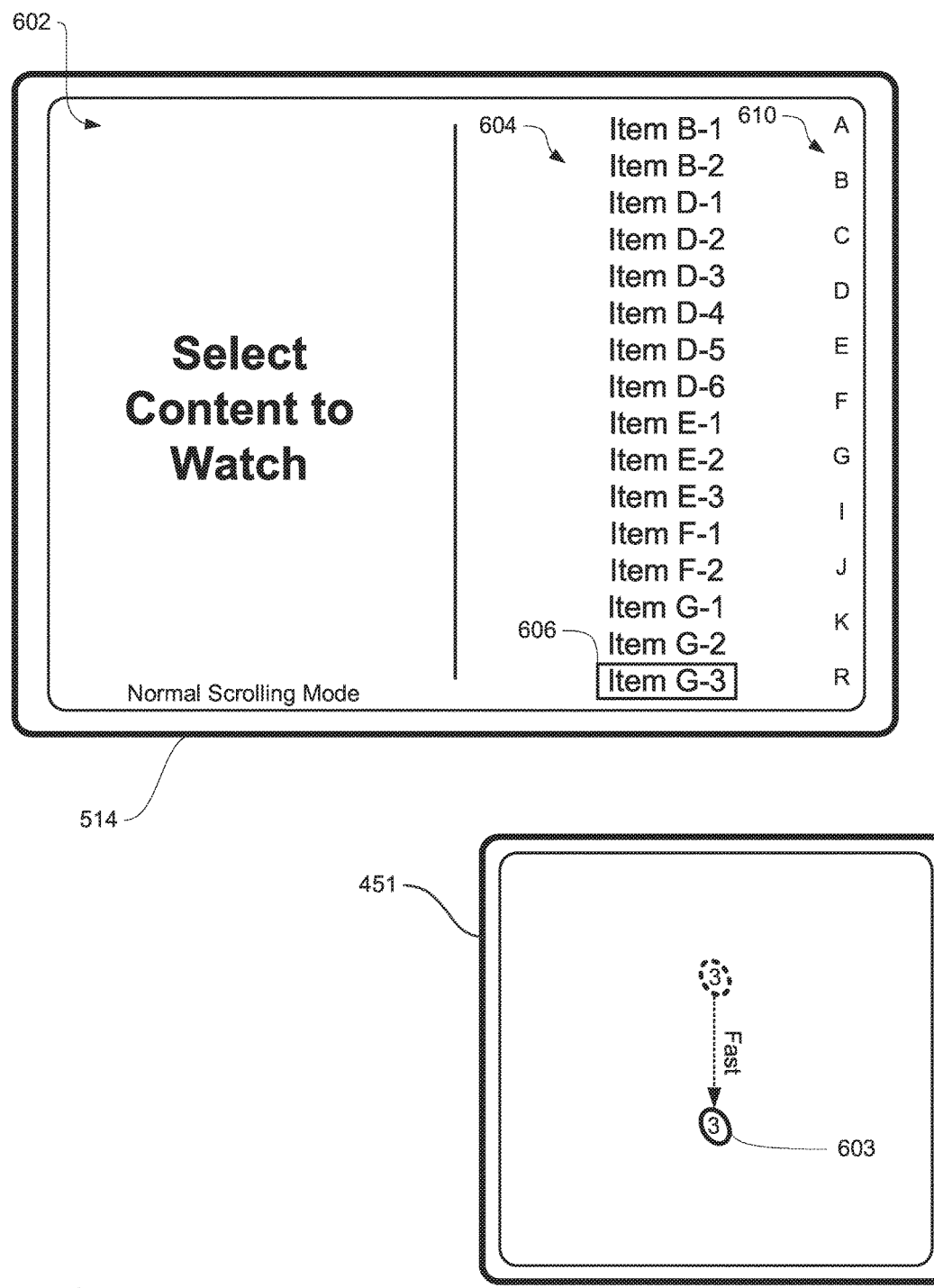
Figure 6W:
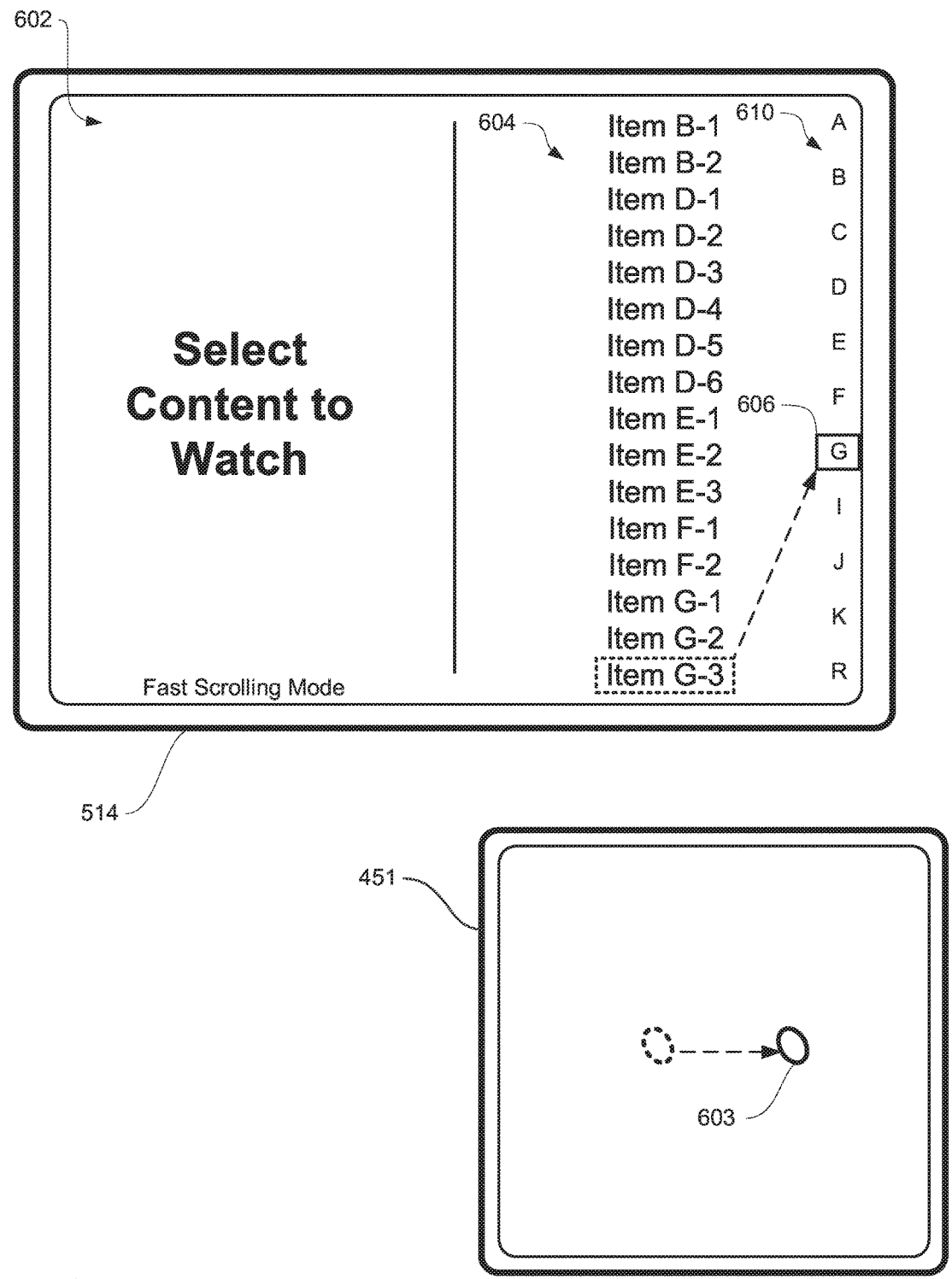

In some embodiments, detection of the third quick swipe (e.g., in FIG. 6U) does not automatically cause current selection indicator 606 to move to index 610, and does not automatically cause the electronic device to transition to the fast scrolling mode. For example, in FIG. 6V, a third quick swipe of contact 603 is detected on touch-sensitive surface 451 (e.g., similar to as described with reference to FIG. 6U). In response to the detection of the third quick swipe, index 610 is displayed in user interface 602. However, current selection indicator 606 has remained at item G-3 in list 604 (and the electronic device has remained in the normal scrolling mode), rather than moving automatically to an index object in index 610 (e.g., as in FIG. 6U). Instead, an additional directional input is optionally required to move current selection indicator 606 to index 610 to initiate the fast scrolling mode. For example, in FIG. 6W, after index 610 is displayed in response to the detection of the third swipe on touch-sensitive surface 451, a rightward swipe of contact 603 is detected on touch-sensitive surface 451. This rightward swipe of contact 603 causes current selection indicator 606 to move from item G-3 in list 604 to the "G" index object in index 610, and causes the electronic device to transition to the fast scrolling mode.

Figure 6X:
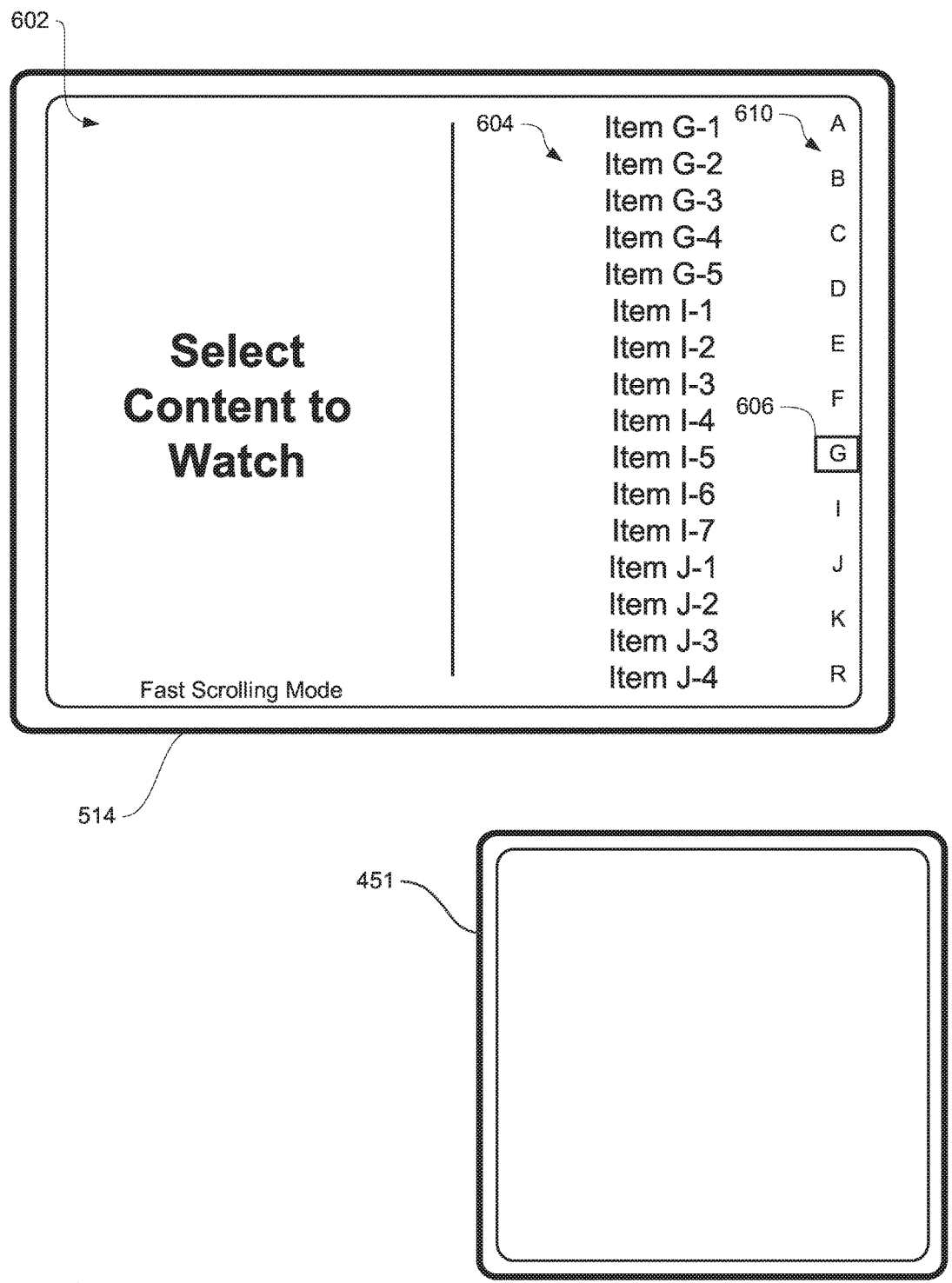

Similar to as described before, in some embodiments, the portion of list 604 that is displayed in user interface 602 is updated in accordance with which index object in index 610 has the focus (e.g., has current selection indicator 606) so that one or more of the items in list 604 that correspond to the index object with focus are visible in user interface 602. For example, in FIG. 6X, the "G" index object in index 610 has current selection indicator 606. As a result, the portion of list 604 that is displayed in user interface 602 is updated such that the first list item that corresponds to the "G" index object (e.g., item G-1) is displayed at the top of user interface 602. As current selection indicator 606 is moved from index object to index object in index 610, the portion of list 604 that is displayed in user interface 602 is optionally updated to achieve the above result.

Figure 6Y:
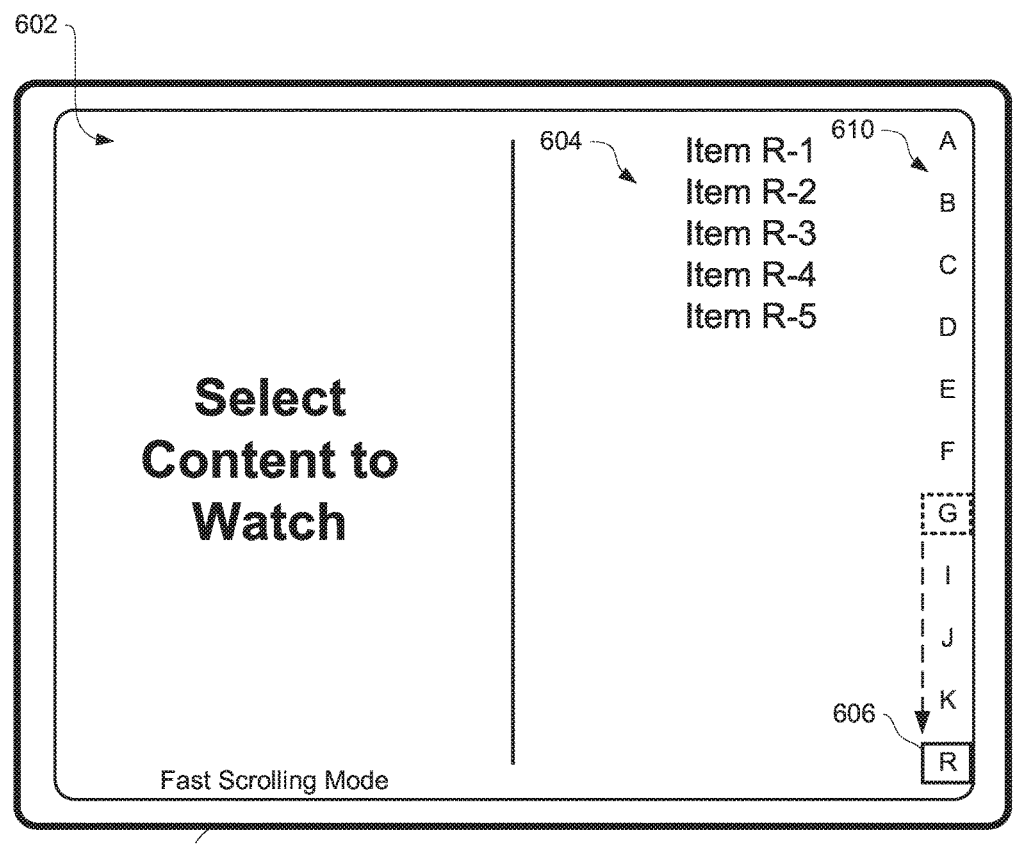
Figure 6Y:
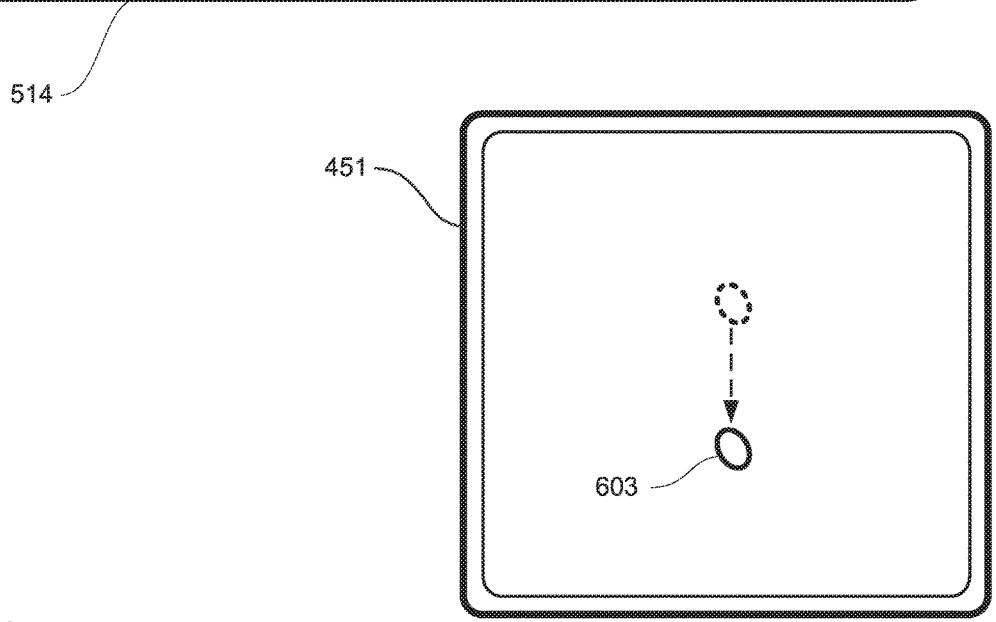

FIG. 6Y illustrates scrolling through index 610 in accordance with input detected on touch-sensitive surface 451. Specifically, a downward swipe of contact 603 has been detected on touch-sensitive surface 451 while the electronic device is in the fast scrolling mode, as described with reference to FIGS. 6U-6W. In response, current selection indicator 606 has moved from the "G" index object to the "R" index object in accordance with the downward swipe. Additionally, the portion of list 604 included in user interface 602 has been updated such that item R-1 (the first item in list 604 that corresponds to the "R" index object) is displayed at the top of user interface 602. It should be noted that once the electronic device is in the fast scrolling mode (e.g., as in FIG. 6Y), index 610 is scrollable using standard navigational inputs (e.g., any kind of swipe input, such as slow up/down swipe inputs) detected on touch-sensitive surface 451 (e.g., independent of whether the standard navigational inputs satisfy criteria for initiating the fast scrolling mode on the electronic device, such as being detected in a specific region of touch-sensitive surface 451—as described with reference to FIGS. 6G-6R—or comprising multiple quick swipes in quick succession—as described with reference to FIGS. 6S-6W).

Figure 6Z:
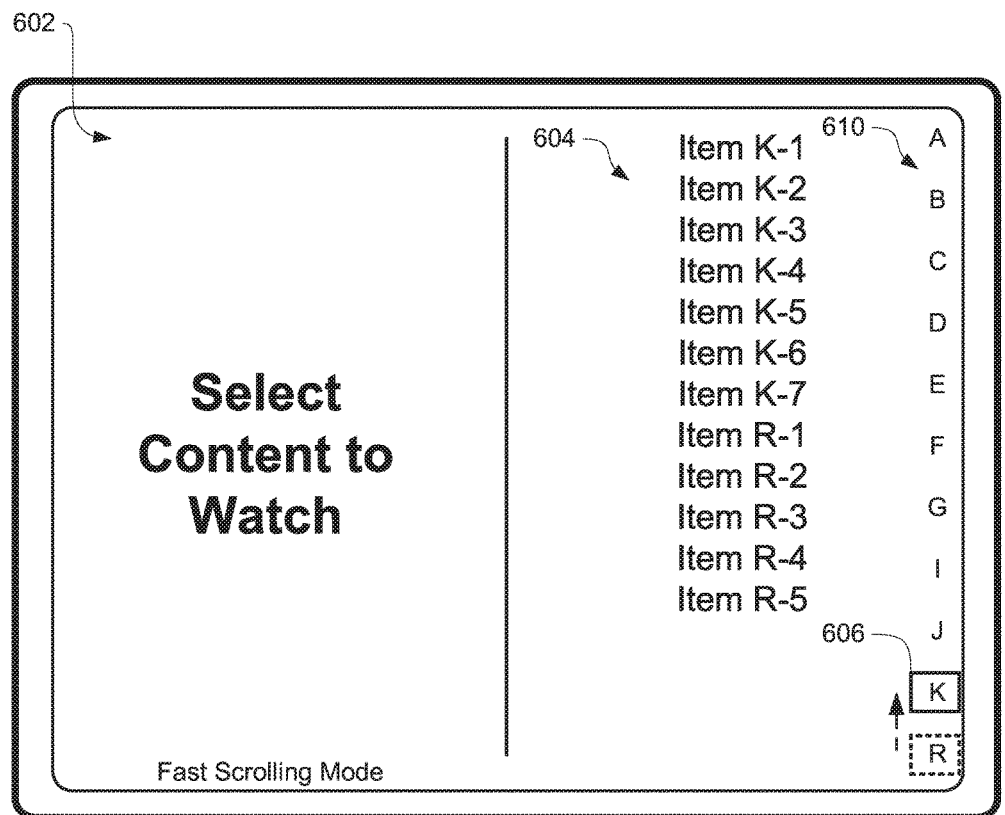
Figure 6Z:
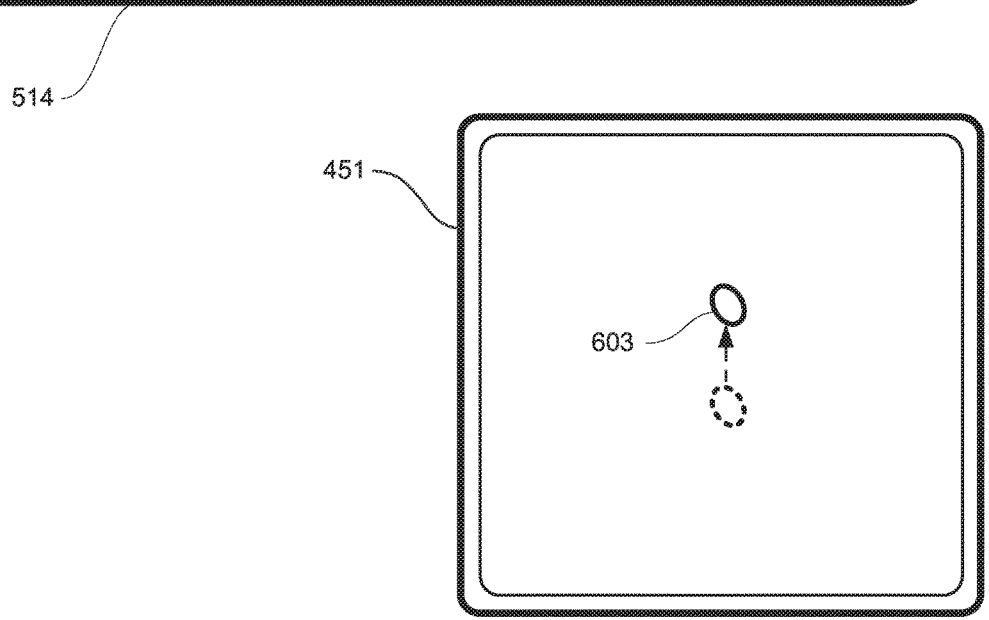
Figure 6A:
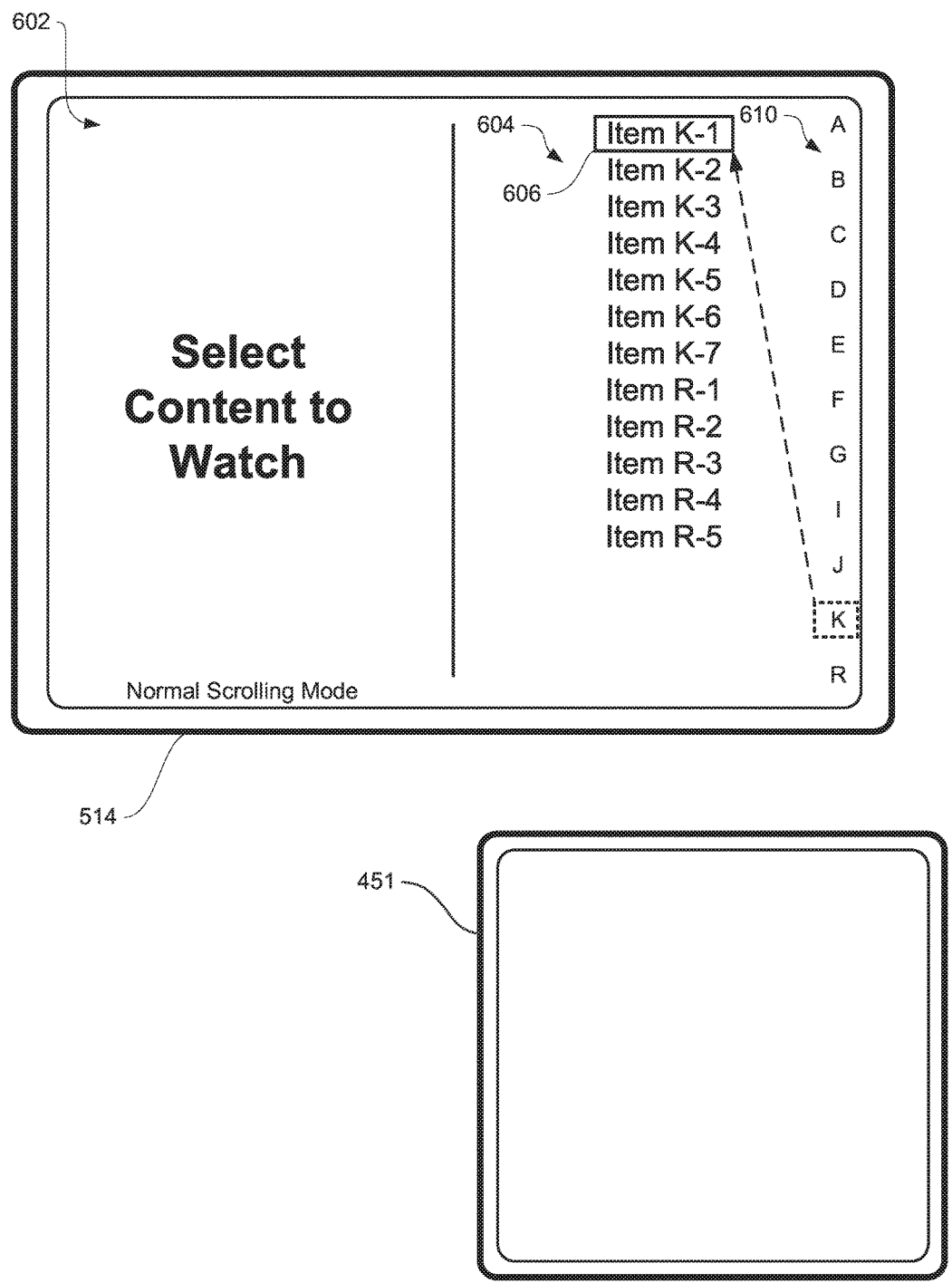
Figure 6B:
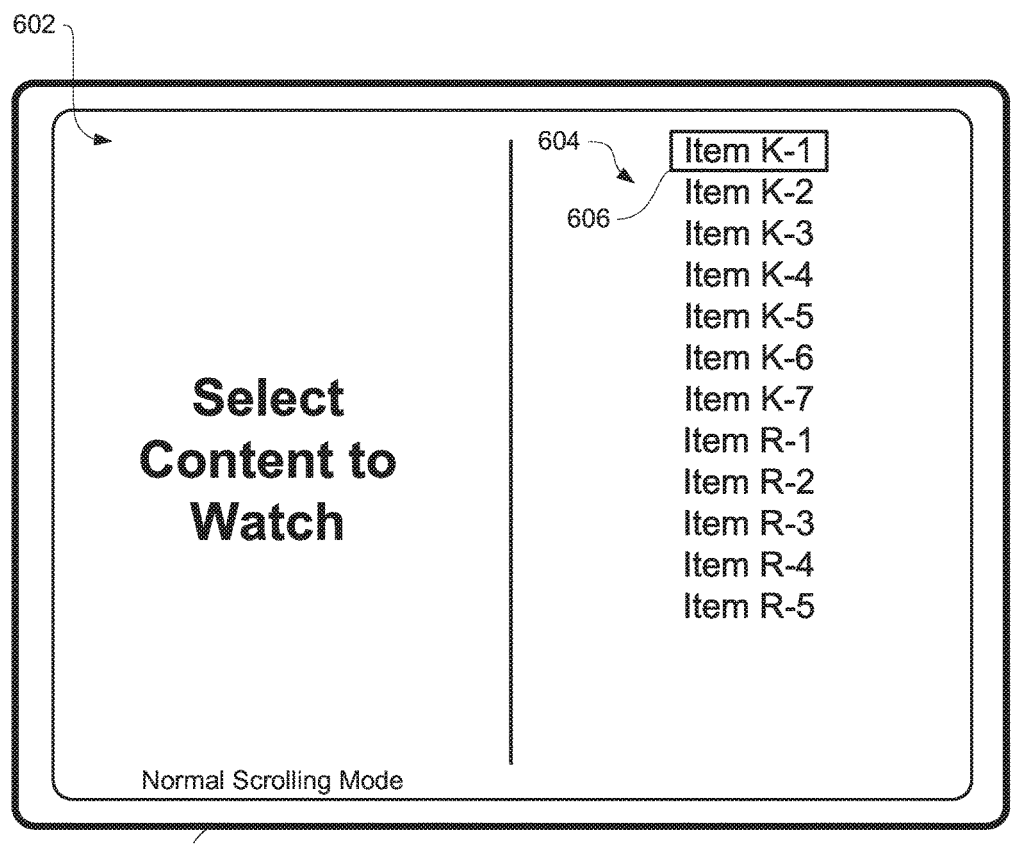
Figure 6B:
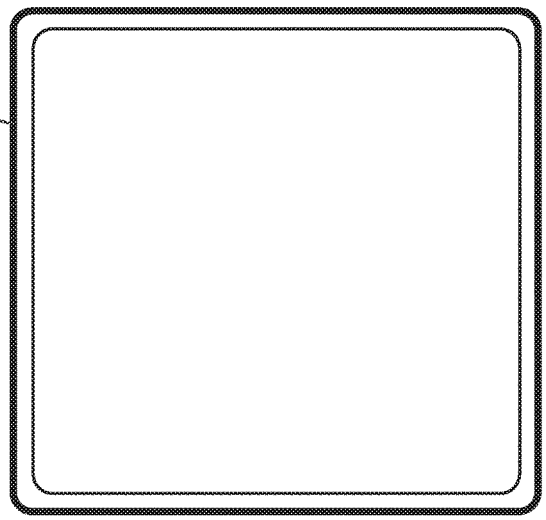
Figure 6C:
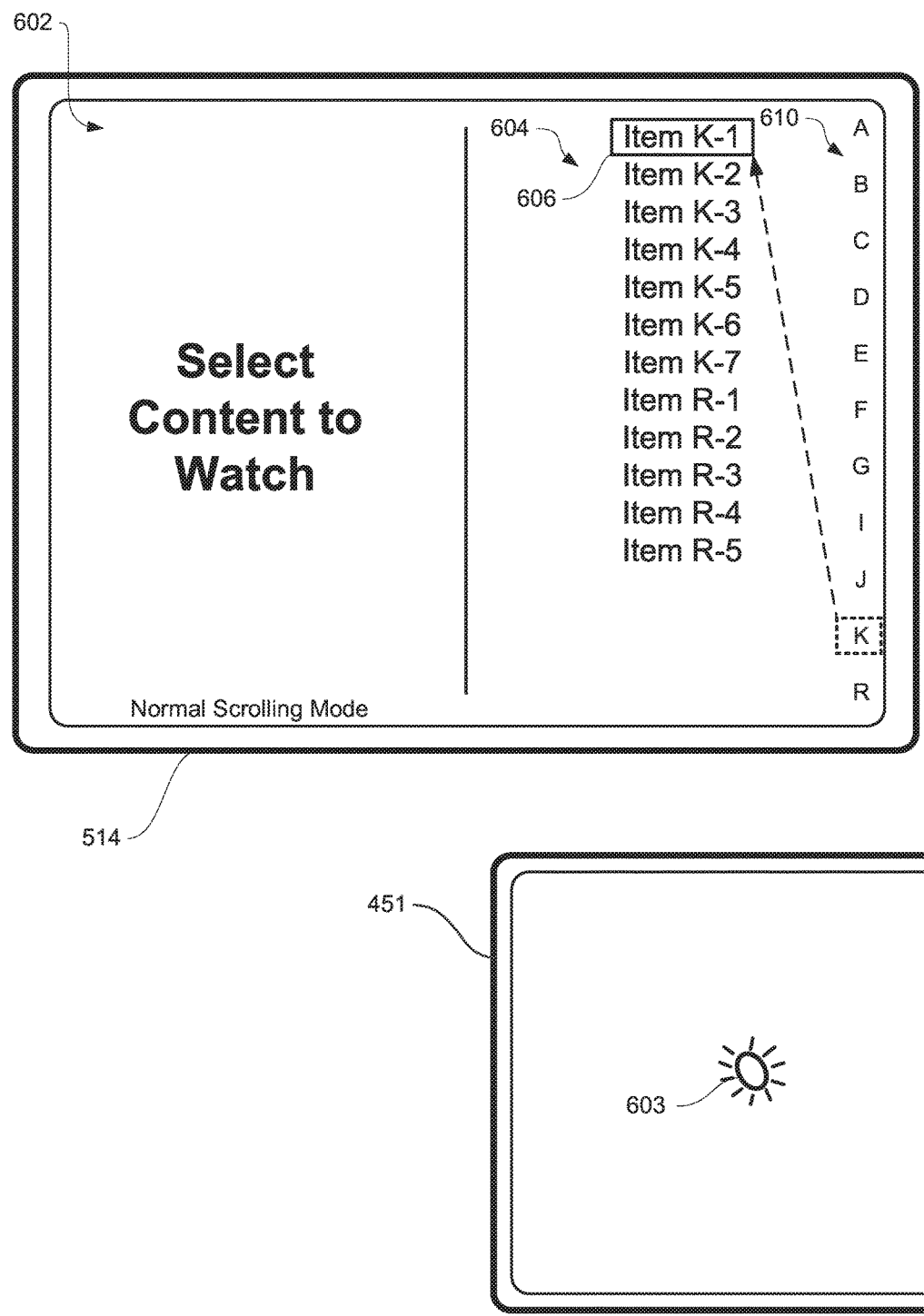
Figure 6D:
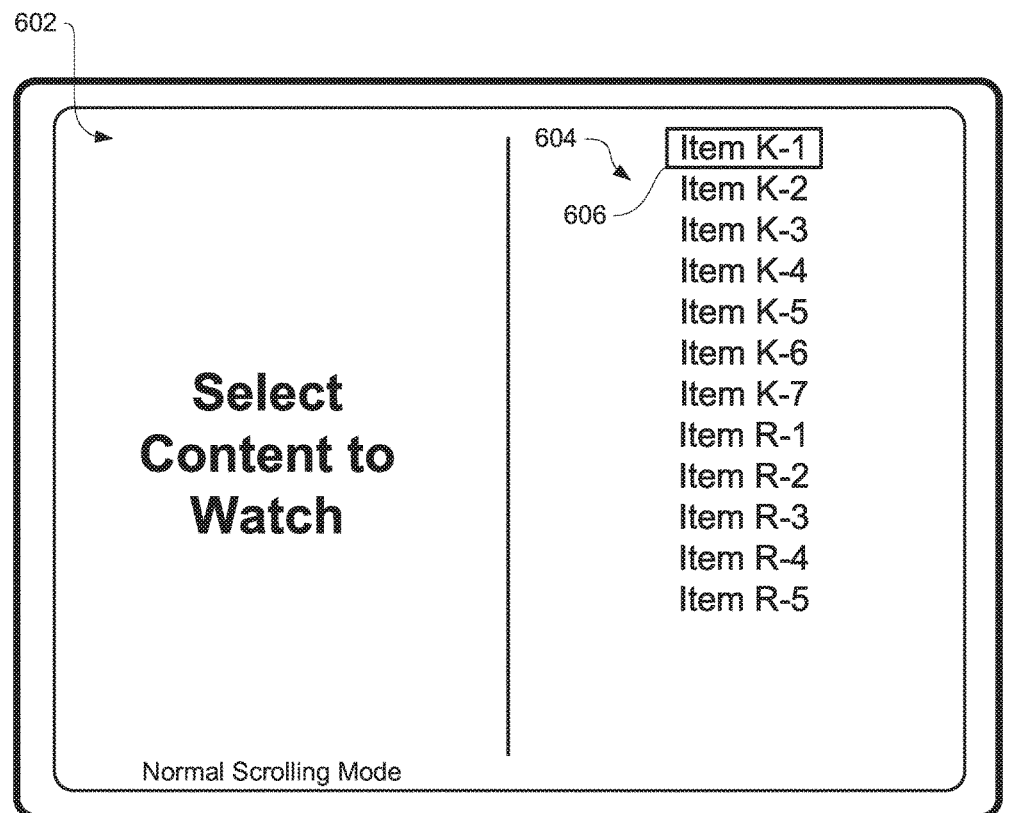
Figure 6D:
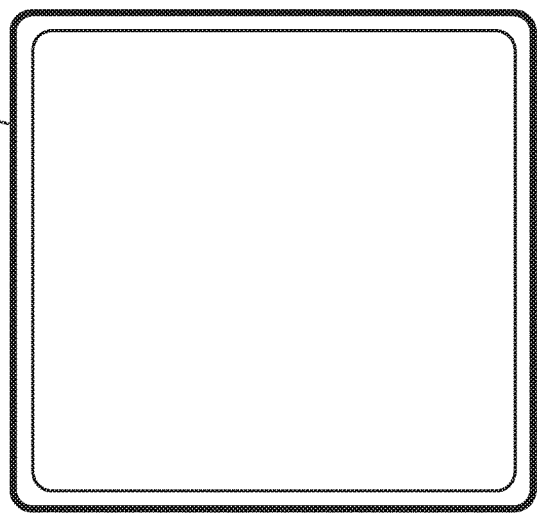
Figure 6E:
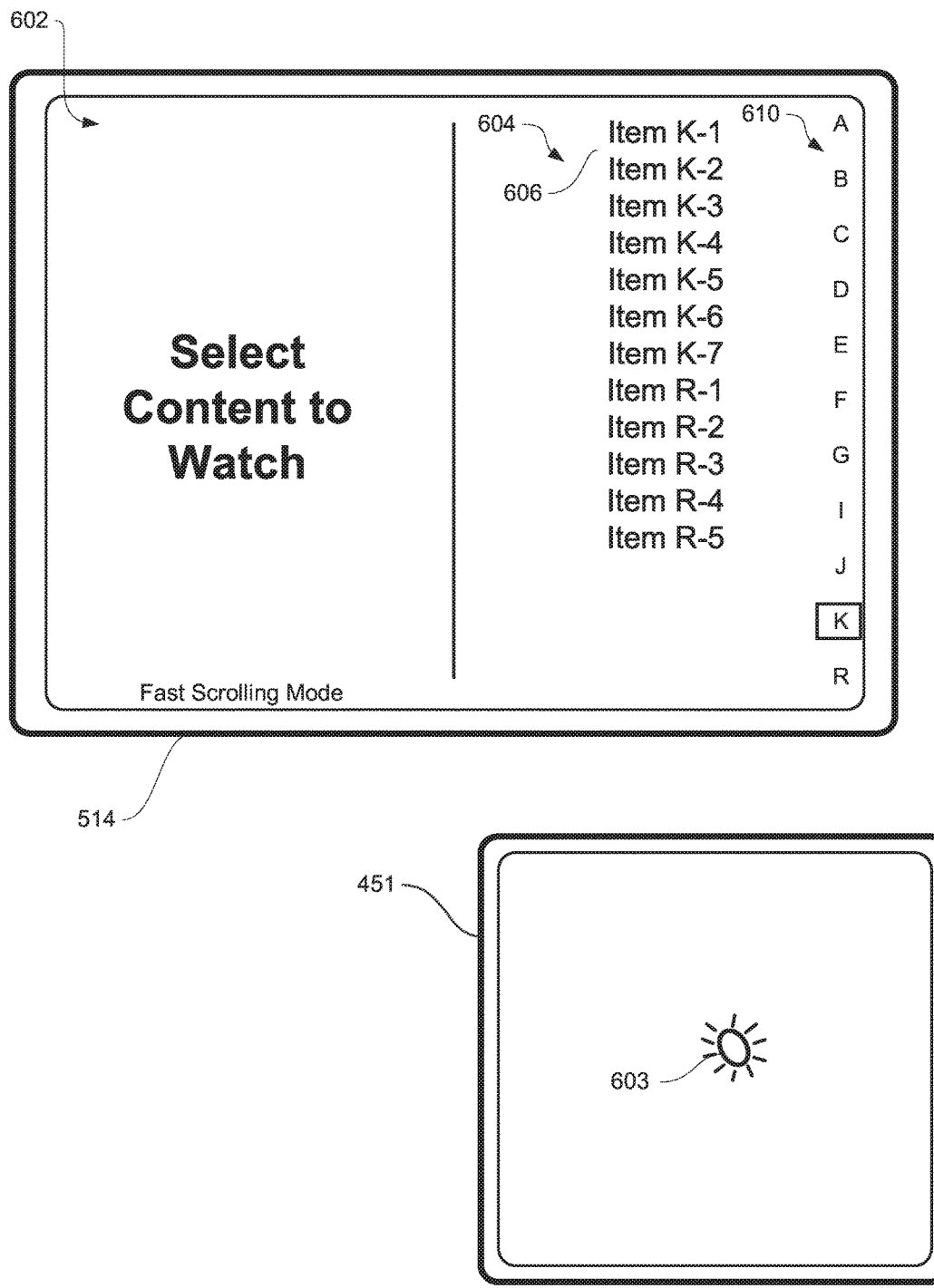
Figure 6F:
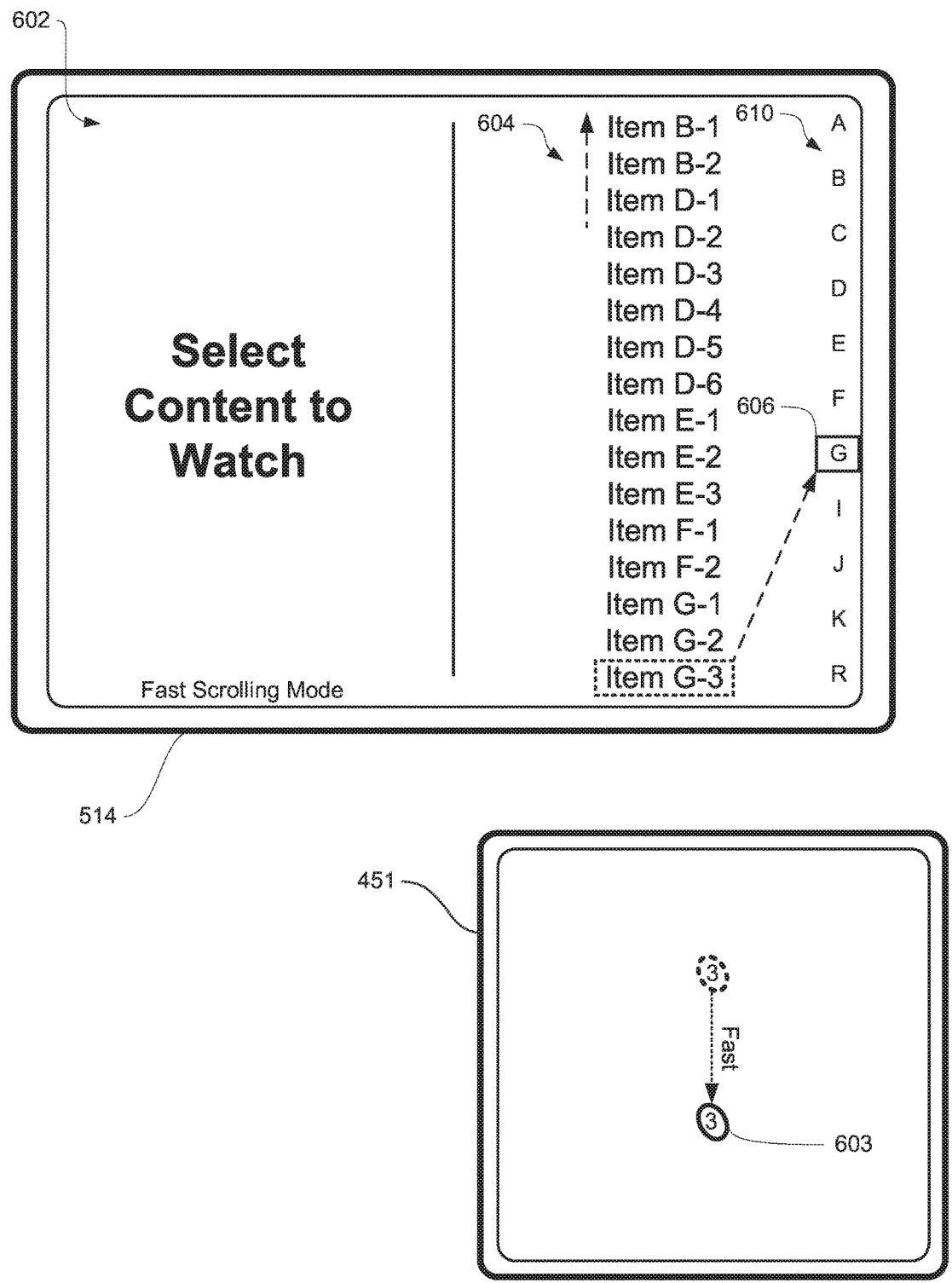
Figure 6G:
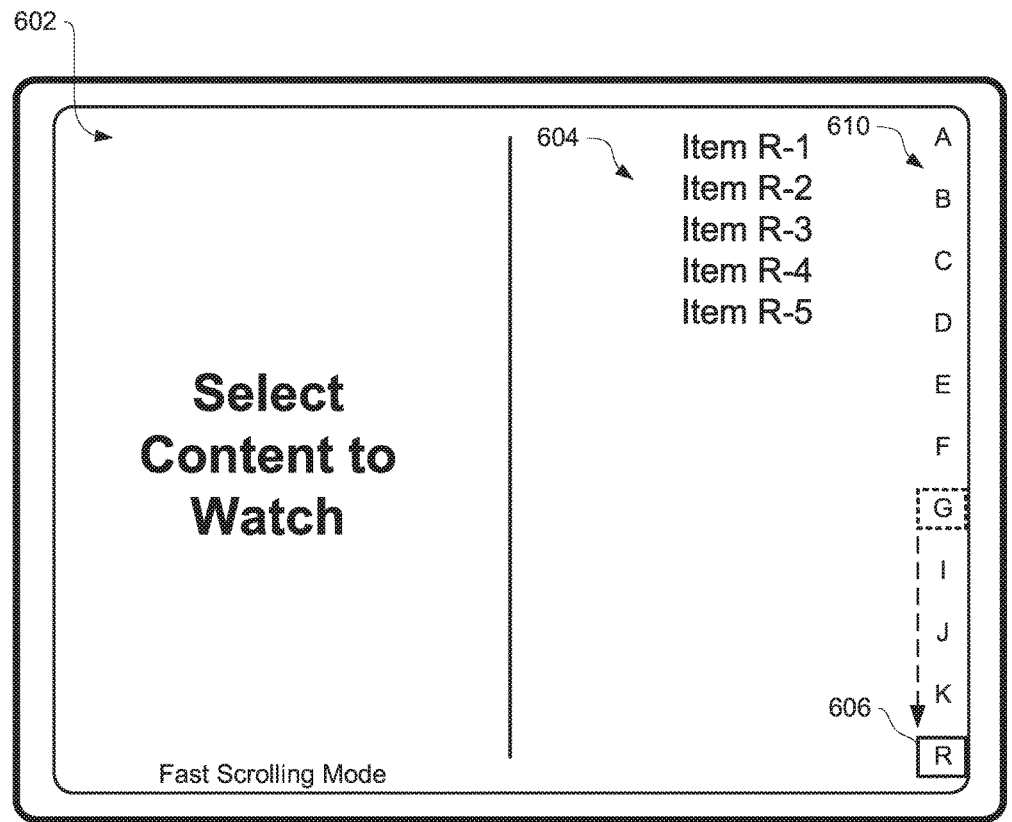
Figure 6H:
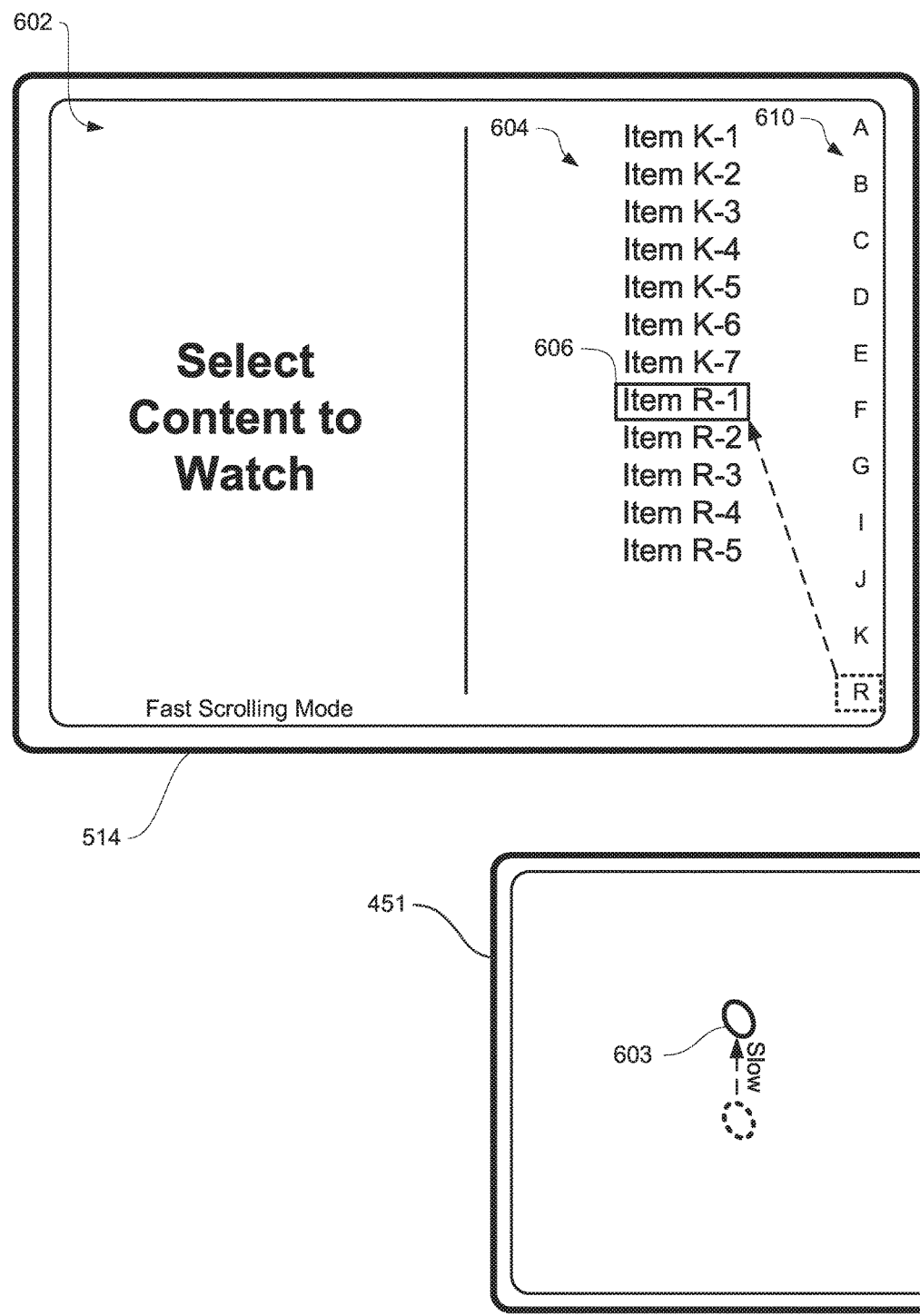
Figure 6I:
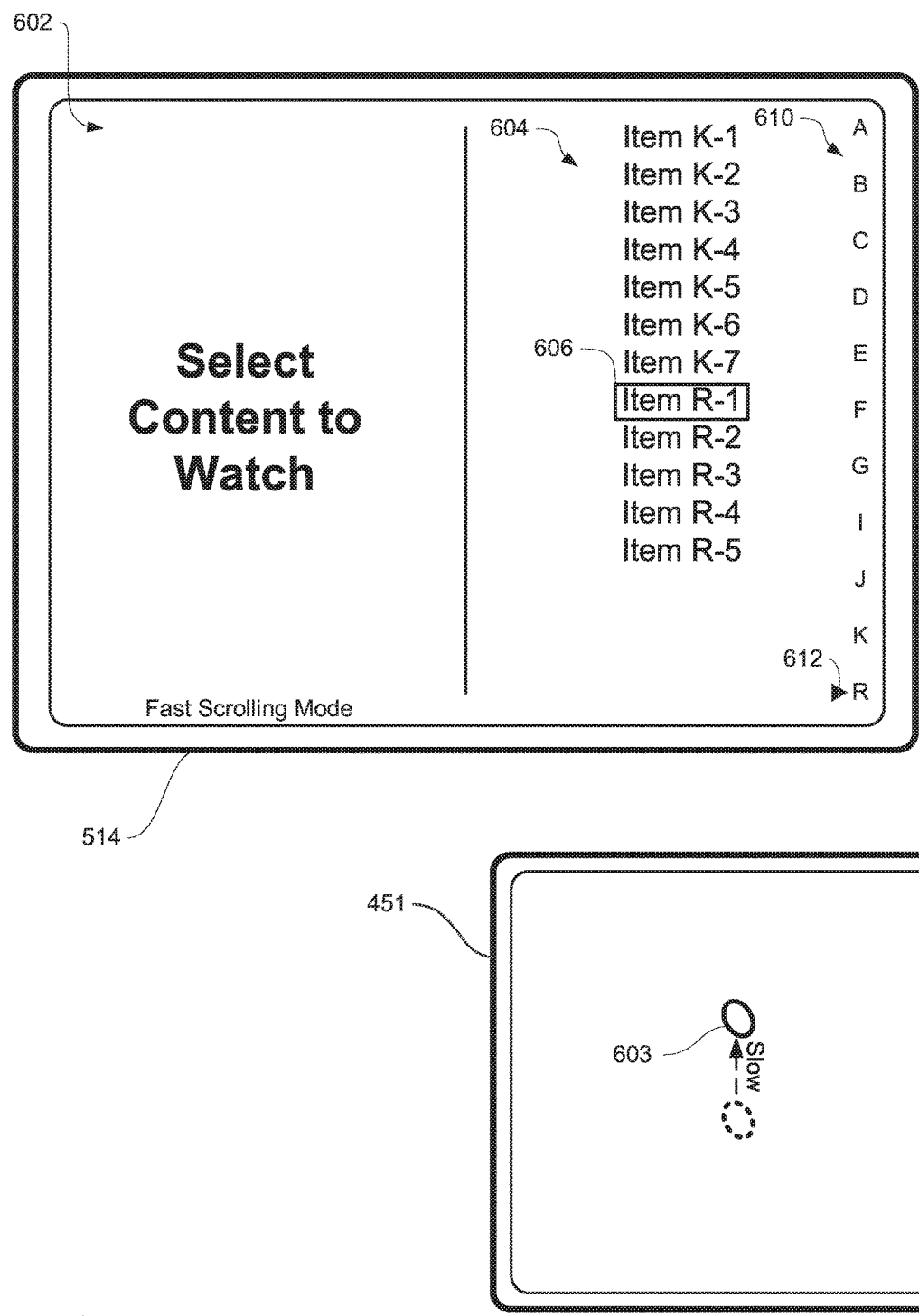
Figure 6J:
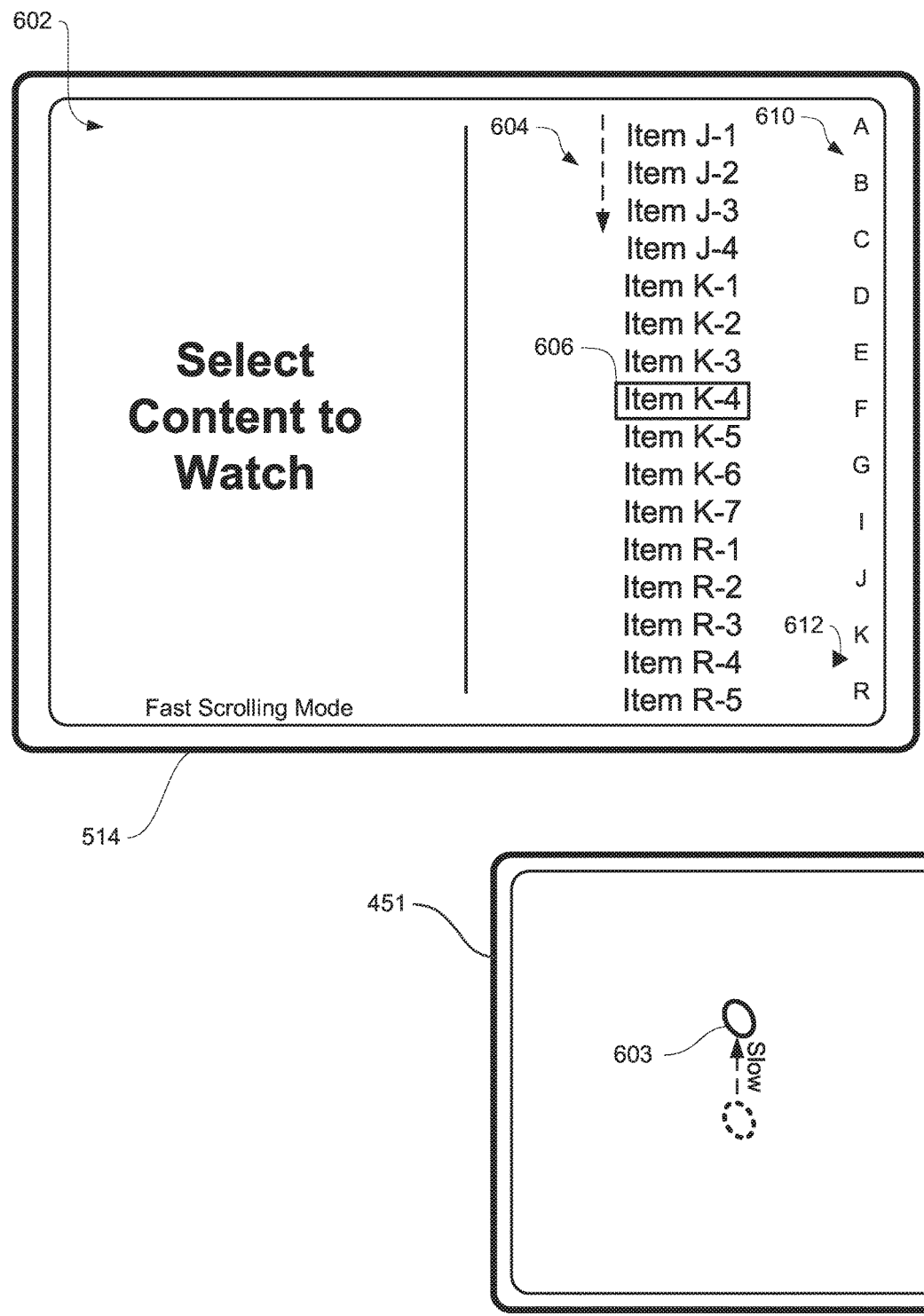
Figure 6K:
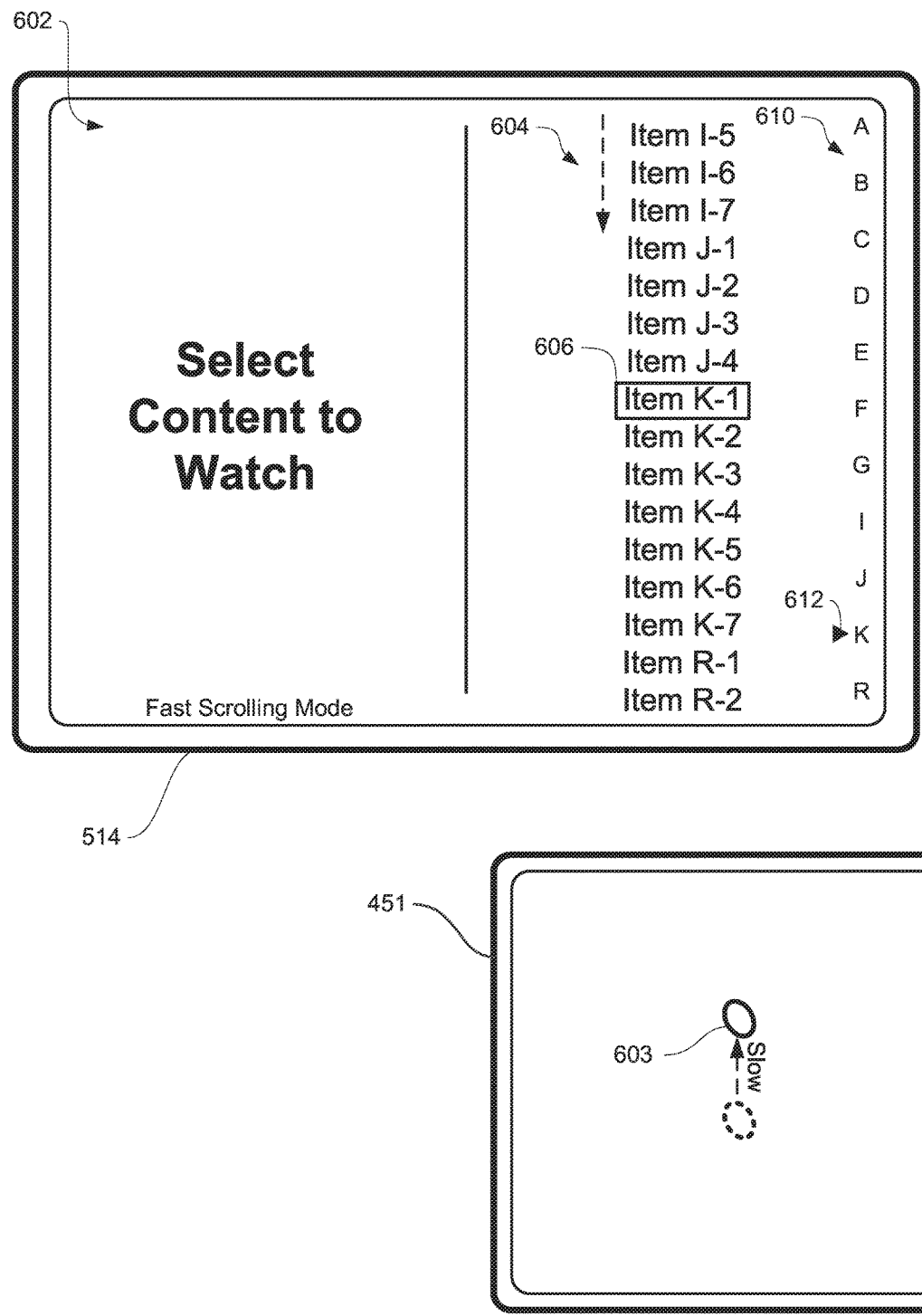
Figure 6L:
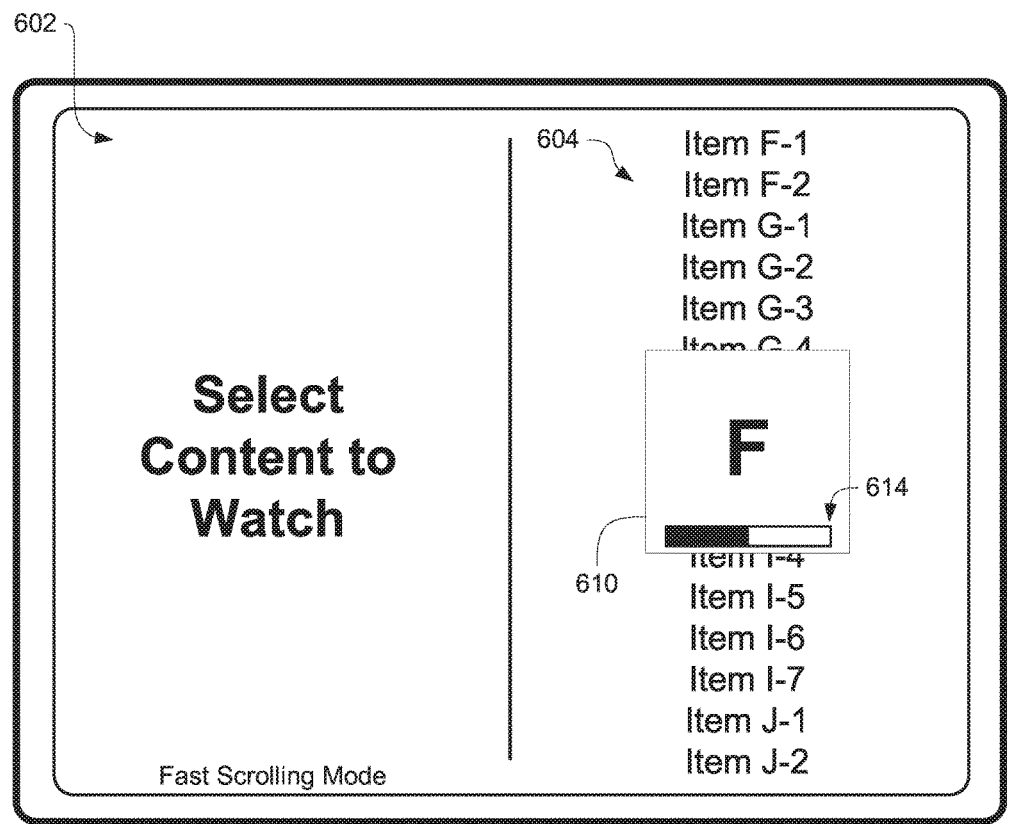
Figure 6L:
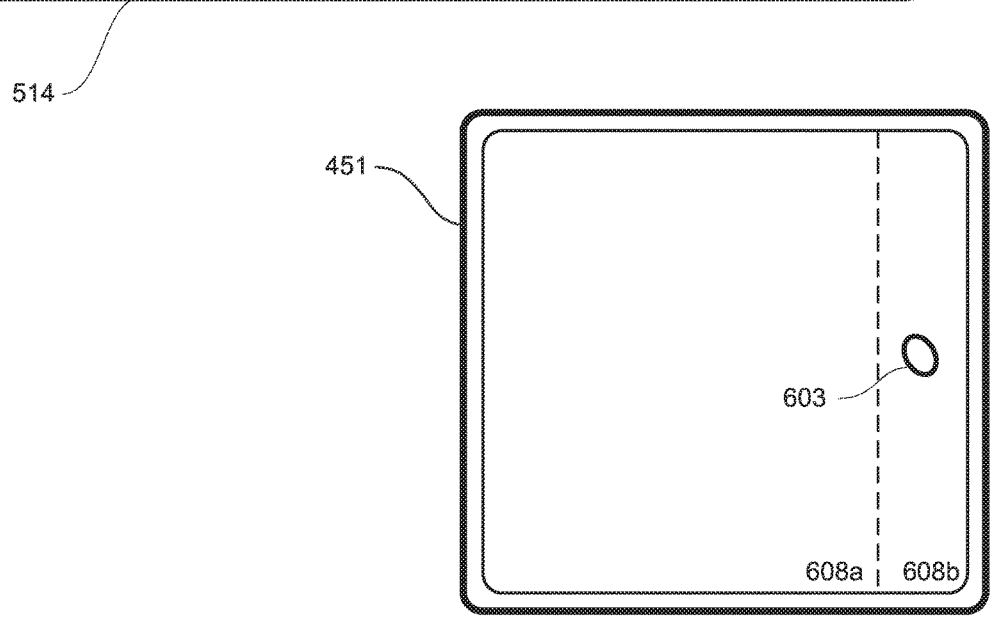
Figure 6M:
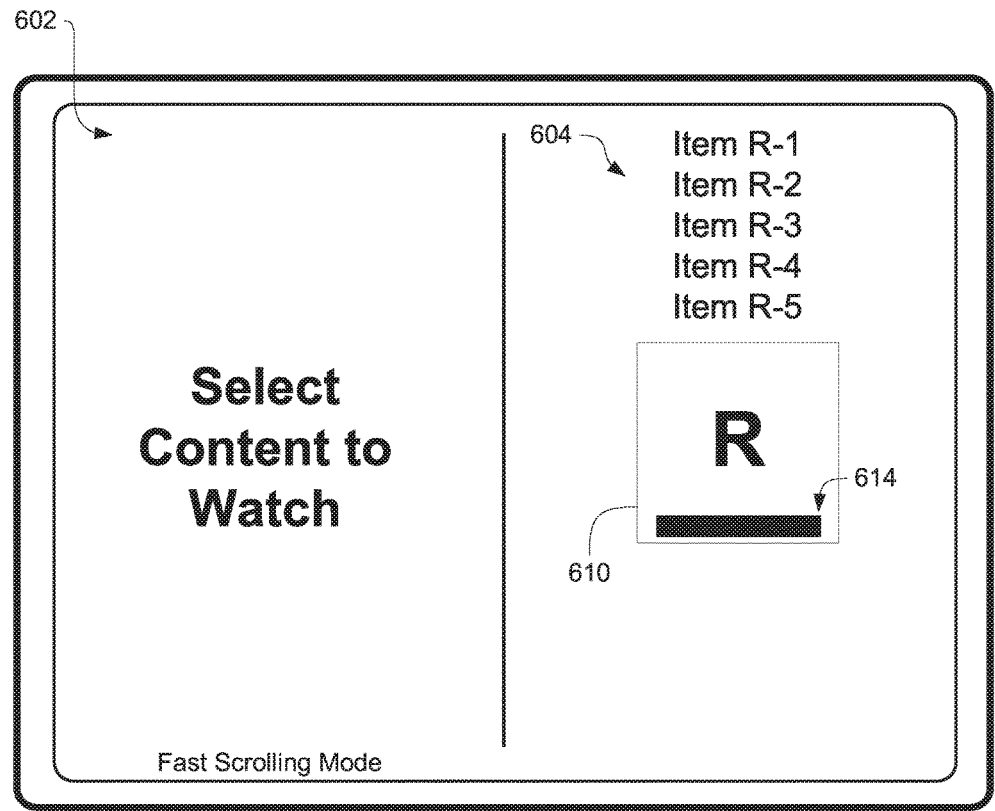
Figure 6M:
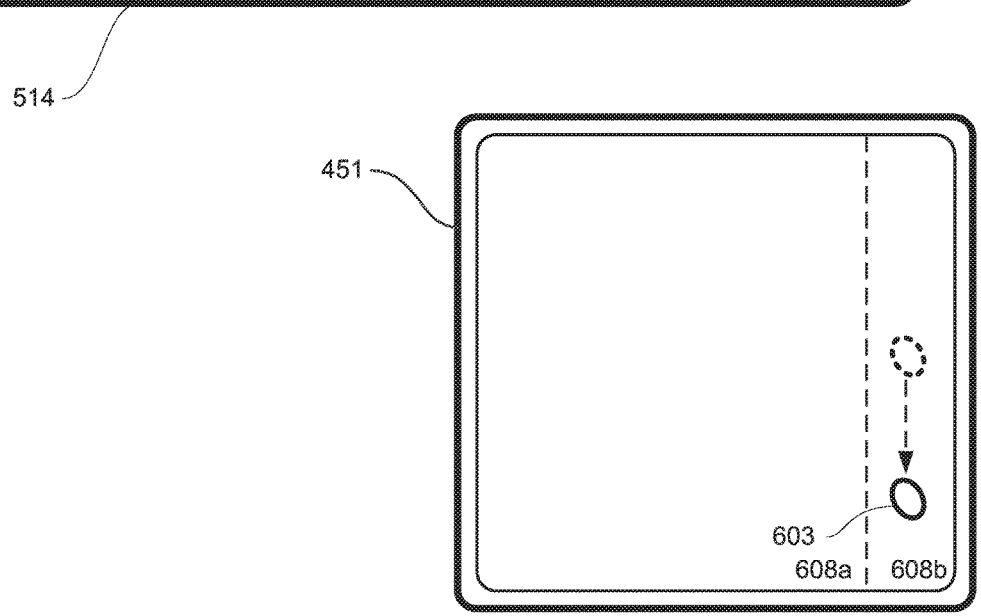
Figure 6N:
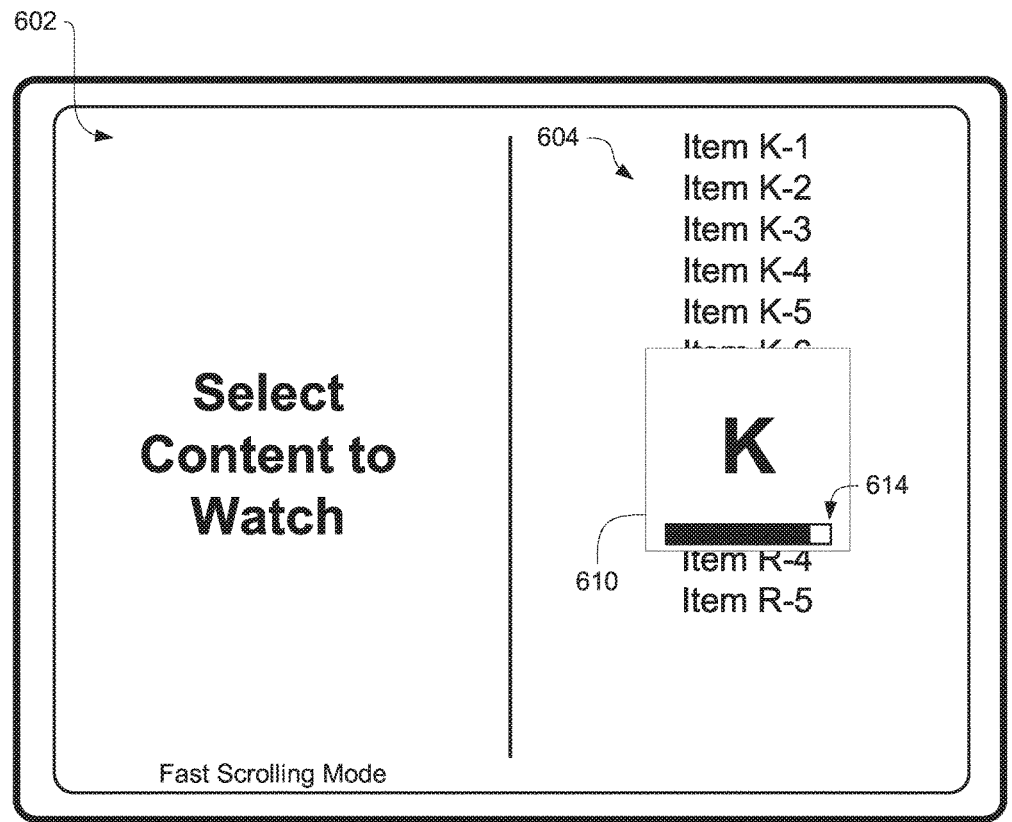
Figure 6N:
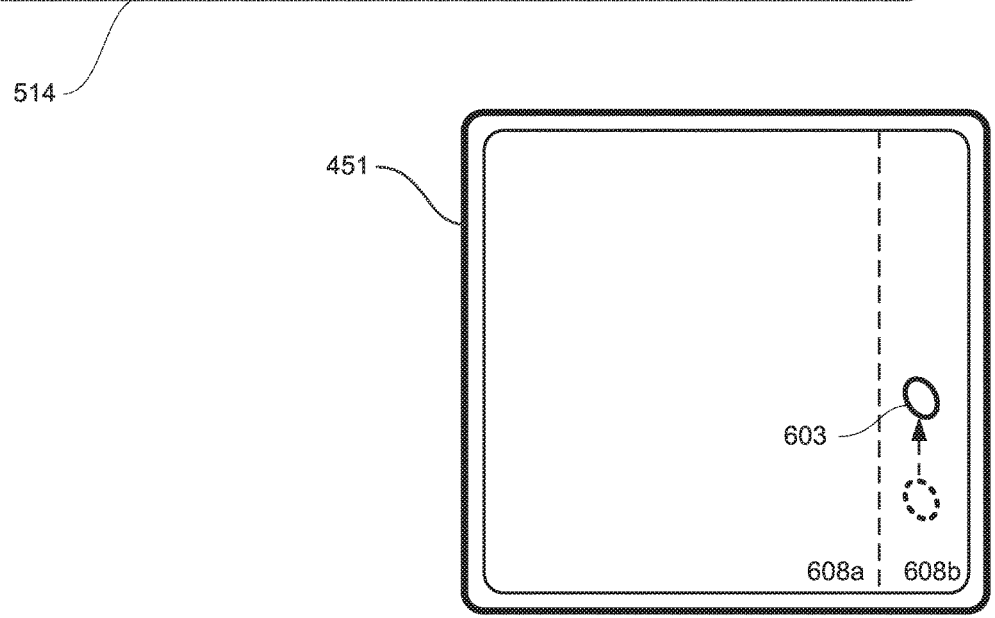

FIG. 6Z illustrates further scrolling through index 610 in accordance with input detected on touch-sensitive surface 451. Specifically, an upward swipe of contact 603 has been detected on touch-sensitive surface 451 after the downward swipe of contact 603 detected in FIG. 6Y. The upward swipe of FIG. 6Z is optionally detected after the downward swipe of FIG. 6Y, without liftoff of contact 603 between the downward swipe and the upward swipe. In response to the upward swipe of contact 603, current selection indicator 606 has moved from the "R" index object to the "K" index object in index 610. Additionally, the portion of list 604 included in user interface 602 has been updated such that item K-1 (the first item in list 604 that corresponds to the "K" index object) is displayed at the top of user interface 602.

In some embodiments, the electronic device exits from the fast scrolling mode in response to not detecting a contact on touch-sensitive surface 451 (in some embodiments, in response to not detecting a contact on touch-sensitive surface 451 for longer than a predetermined time, such as 0.5, 1 or 2 seconds). In FIG. 6AA, no contact is detected on touch-sensitive surface 451. In response, the electronic device transitions away from the fast scrolling mode, and into the normal scrolling mode. Additionally, current selection indicator 606 optionally moves from index 610 to list 604. Specifically, current selection indicator 606 optionally moves to an item in list 604 (e.g., the first item in the list) that corresponds to the index object that had current selection indicator 606 when the electronic device transitioned from the fast scrolling mode to the normal scrolling mode. In the example of FIG. 6AA, current selection indicator 606 moves from the "K" index object (e.g., the index object that had current selection indicator 606 when the transition back to the normal scrolling mode was initiated) to item K-1 in list 604 (e.g., the first item in list 604 that corresponds to the "K" index object). Further, in some embodiments, when the electronic device transitions back to the normal scrolling mode, the electronic device ceases to display index 610 in user interface 602, as illustrated in FIG. 6BB. From here, normal scrolling and/or selection of items in list 604 is optionally performed (e.g., as described with reference to FIGS. A-F).

In some embodiments, the electronic device is able to transition to the fast scrolling mode both in response to detecting the multiple quick swipes in quick succession (e.g., as described with reference to FIGS. 6S-6U), or in response to detecting input in a specified region on touch-sensitive surface (e.g., as described with reference to FIGS. 6G-6K). In other words, quick swipe-based fast scrolling initiation optionally works in cooperation with region-based fast scrolling initiation. In such embodiments, the touch-sensitive surface 451 is optionally partitioned (e.g., as described with reference to FIGS. 6G-6K), such that quick swipes (e.g., as described with reference to FIGS. 6S-6U) detected in region 608a of touch-sensitive surface 451 cause the electronic device to transition to the fast scrolling mode, and other inputs (e.g., as described with reference to FIGS. 6G-6K) detected in region 608b of touch-sensitive surface 451 additionally cause the electronic device to transition to the fast scrolling mode. As such, in such embodiments, after the electronic device transitions from the quick swipe-triggered fast scrolling mode back to the normal scrolling mode (e.g., as described with reference to FIG. 6BB), scrolling input detected in region 608a of touch-sensitive surface 451 optionally causes the electronic device to scroll through list 604 in the normal scrolling mode (e.g., as described with reference to FIG. 6G), and scrolling input detected in region 608b of touch-sensitive surface optionally causes the electronic device to scroll through index 610 in the fast scrolling mode (e.g., as described with reference to FIGS. 6L-6M).

In some embodiments, the electronic device transitions back to the normal scrolling mode in response to a selection of an index object in index 610, as illustrated in FIG. 6CC. Specifically, a selection input (e.g., a click or a tap) has been detected on touch-sensitive surface 451, as illustrated by contact 603 in FIG. 6CC, while the "K" index object has current selection indicator 606. In response, the electronic device has transitioned to the normal scrolling mode, and current selection indicator 606 has moved to item K-1 in list 604 (e.g., as described with reference to FIG. 6AA). Further, in some embodiments, when the electronic device transitions back to the normal scrolling mode, the electronic device ceases to display index 610 in user interface 602, as illustrated in FIG. 6DD. From here, normal scrolling and/or selection of items in list 604 is optionally performed (e.g., as described with reference to FIGS. A-F).

In some embodiments, index objects are not selectable—for example, selection of an index object optionally does not cause any action to be performed at the electronic device (in contrast to selection of an item in list 604, as described with reference to FIGS. 6E-6F, for example), as illustrated in FIG. 6EE. Specifically, in FIG. 6EE, the electronic device is in the fast scrolling mode, and the "K" index object in index 610 has current selection indicator 606. While the "K" index object has current selection indicator 606, a selection input (e.g., a click or a tap) has been detected on touch-sensitive surface 451, as illustrated by contact 603 in FIG. 6EE. In response, no action has been performed by the electronic device. Current selection indicator 606 is still over the "K" index object in index 610, and the electronic device is still in the fast scrolling mode. Rather, in the embodiment of FIG. 6EE, the electronic device optionally transitions from the fast scrolling mode to the normal scrolling mode when no contact is detected on touch-sensitive surface 451 (e.g., as described with reference to FIGS. 6AA-6BB).

In some embodiments, while the electronic device is in the fast scrolling mode initiated based on quick swipes detected on touch-sensitive surface 451 (e.g., as described with reference to FIGS. 6S-6U), the electronic device optionally reacts differently to swipe inputs detected on touch-sensitive surface 451 depending on the speeds of those swipe inputs. Specifically, the electronic device optionally reacts differently to swipe inputs with speeds less than a threshold speed (e.g., different or the same as the threshold speed for initiating the fast scrolling mode in the first instance, as described with references to FIGS. 6S-6U) than it does to swipe inputs with speeds greater than the threshold speed. Such behavior will be described with reference to FIGS. 6FF-6KK.

FIG. 6FF illustrates the electronic device transitioning to the fast scrolling mode in response to detection of a third quick swipe on touch-sensitive surface, as described with reference to FIG. 6U. In FIG. 6GG, while the electronic device is in the fast scrolling mode, a fast (e.g., faster than a threshold speed, different or the same as the threshold speed for initiating the fast scrolling mode in the first instance) downward swipe of contact 603 is detected on touch-sensitive surface 451. In response to such a fast swipe, index 610 is scrolled in accordance with the fast swipe, as described with reference to FIGS. 6Y-6Z.

FIG. 6HH illustrates a slow (e.g., slower than the threshold speed from FIG. 6FF) upward swipe of contact 603 detected on touch-sensitive surface 451 after the downward swipe of FIG. 6GG was detected on touch-sensitive surface 451. In response to the slow swipe detected on touch-sensitive surface 451, rather than scrolling through index 610 in accordance with the slow swipe, the electronic device optionally moves current selection indicator 606 from the "R" index object (e.g., the index object with the current selection indicator when the slow swipe is detected) to item R-1 in list 604 (e.g., the first item in list 604 that corresponds to the "R" index object). Additionally, the electronic device optionally positions current selection indicator 606 in a fixed location in user interface 602 (e.g., in the vertical center of user interface 602), and moves list 604 as necessary to make current selection indicator 606 coincide with item R-1 in list 604. The electronic device optionally remains in the fast scrolling mode, thus index 610 remains in user interface 602. Further, the electronic device optionally adds current scroll location indicator 612 to index 610, which indicates the current location of current selection indicator 606 in list 604 to the user, as illustrated in FIG. 6II. In FIG. 6II, current scroll location indicator 612 is optionally located at the "R" index object, because the current scroll location of current selection indicator 606 is at item R-1 (e.g., the first item in list 604 corresponding to the "R" index object) in list 604.

Finally, based on the slow swipe detected on touch-sensitive surface 451, the electronic device optionally scrolls through list 604, while updating the location of current scroll location indicator 612 in index 610. Specifically, as shown in FIG. 6JJ, current selection indicator 606 has moved from item R-1 to item K-4. Because the location of current selection indicator 606 in user interface 602 is optionally fixed, moving current selection indicator 606 from item R-1 to item K-4 is optionally accomplished by moving list 604 down in user interface 602. Additionally, the location of current scroll location indicator 612 is optionally updated to be in between the "K" index object and the "R" index object in index 610, because item K-4 is in between the first item in list 604 corresponding to the "K" index object (e.g., item K-1) and the first item in list 604 corresponding to the "R" index object (e.g., item R-1). In FIG. 6KK, the electronic device has further scrolled through list 604 in response to a slow upward swipe of contact 603 detected on touch-sensitive surface 451. In response, current selection indicator 606 has moved from item K-4 to item K-1 in list 604 by further moving list 604 down in user interface 602. Additionally, the location of current scroll location indicator 612 is optionally updated to be at the "K" index object, because item K-1 is the first item in list 604 corresponding to the "K" index object. Thus, FIGS. 6II-6KK illustrate another manner of scrolling through list 604 while in the fast scrolling mode. After FIG. 6KK, a fast swipe detected on touch-sensitive surface 451 optionally causes current selection indicator 606 to move back to the corresponding index object in index 610, and scrolling of current selection indicator 606 through index 610 (e.g., as described with reference to FIG. 6GG).

In some embodiments, index 610 (whether in the region-based or the quick swipe-based fast scrolling mode) is overlaid over list 604, and displays only the index object that has the current focus (e.g., analogous to the index object that has current selection indicator 606), as will be described with reference to FIGS. 6LL-6NN. In FIG. 6LL, the electronic device is in the fast scrolling mode in response to contact 603 detected in region 608b of touch-sensitive surface 451. While FIGS. 6LL-6NN will be described in the context of the fast scrolling mode having been initiated based on inputs in specified regions on touch-sensitive surface 451, the examples of FIGS. 6LL-6NN are optionally implemented in embodiments where the fast scrolling mode is initiated based on quick swipes detected on touch-sensitive surface 451.

Index 610 is displayed over list 604, as shown in FIG. 6LL. Index 610 displays the "F" index object, and no other index objects, because an item in list 604 corresponding to the "F" index object optionally had the focus when the fast scrolling mode was initiated (e.g., as described with reference to FIG. 6H). Index 610 optionally includes current scroll location indicator 614, which indicates the current scroll location in list 604. In FIG. 6LL, current scroll location indicator 614 optionally indicates that the current scroll location in list 604 is approximately midway in list 604 (e.g., illustrated as a halfway filled progress bar).

FIG. 6MM illustrates scrolling through index 610 in accordance with input detected in region 608b of touch-sensitive surface 451. Specifically, a downward swipe of contact 603 has been detected in region 608b. In response, index 610 has scrolled to the "R" index object in accordance with the downward swipe, and thus index 610 displays the "R" index object, and no other index objects. Additionally, the portion of list 604 included in user interface 602 has been updated such that item R-1 (the first item in list 604 that corresponds to the "R" index object) is displayed at the top of user interface 602. Finally, current scroll location indicator 614 optionally indicates that the current scroll location in list 604 is at the end of list 604, because the "R" index object is optionally the last index object in index 610.

FIG. 6NN illustrates further scrolling through index 610 in accordance with input detected in region 608b of touch-sensitive surface 451. Specifically, an upward swipe of contact 603 has been detected in region 608b after the downward swipe of contact 603 detected in FIG. 6MM. The upward swipe of FIG. 6NN is optionally detected after the downward swipe of FIG. 6MM, without liftoff of contact 603 between the downward swipe and the upward swipe. In response to the upward swipe of contact 603, index 610 has scrolled to the "K" index object, and thus index 610 displays the "K" index object, and no other index objects. Additionally, the portion of list 604 included in user interface 602 has been updated such that item K-1 (the first item in list 604 that corresponds to the "K" index object) is displayed at the top of user interface 602. Finally, current scroll location indicator 614 optionally indicates that the current scroll location in list 604 is near the end of list 604, but not at the end of the list, because the "K" index object is optionally near the last index object in index 610 (e.g., the "R" index object). Exiting from the fast scrolling mode is optionally accomplished in any of the manners described with reference to FIGS. 6N-6Q.

Figure 7A:
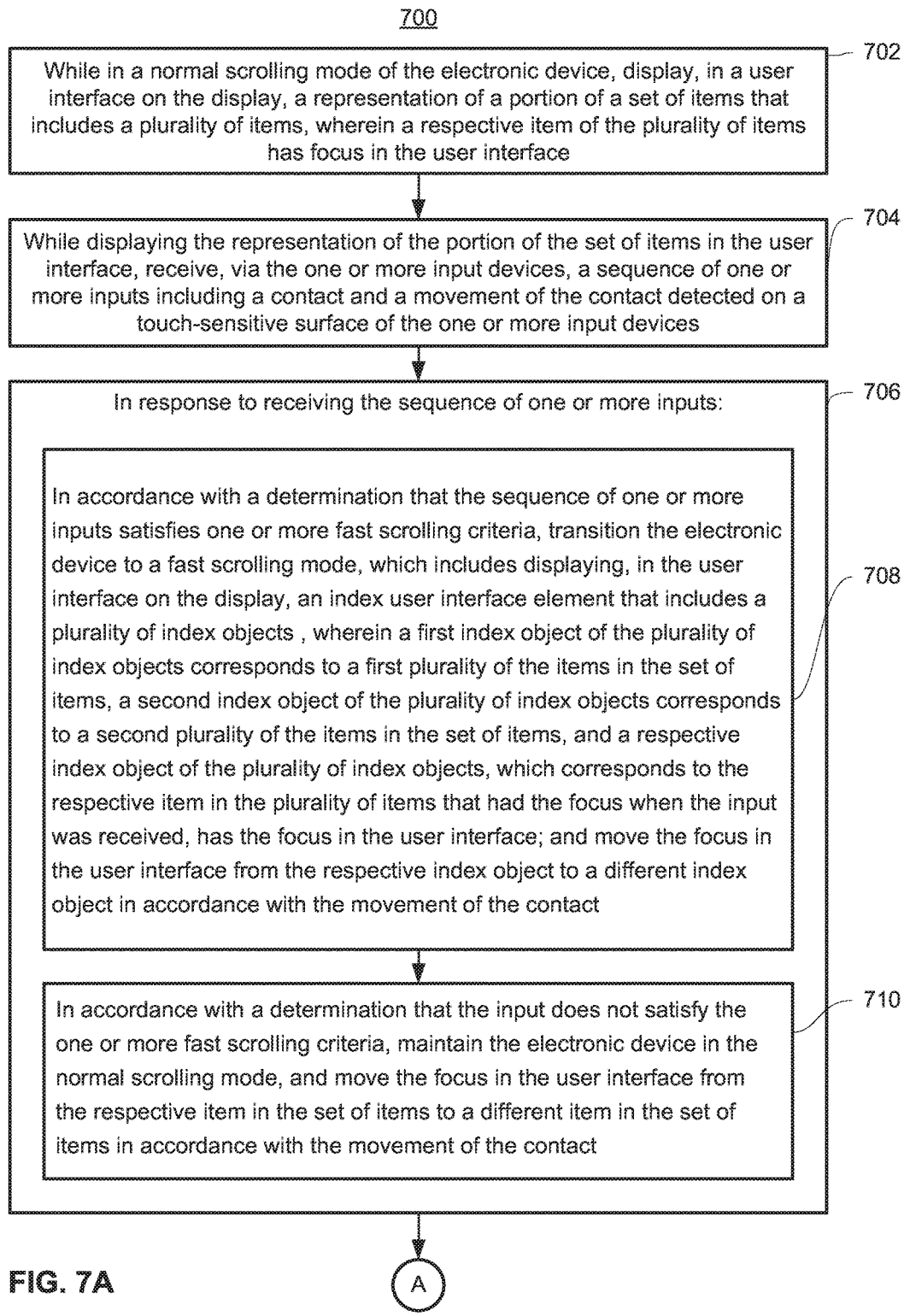
FIGS. 7A-7N are flow diagrams illustrating a method of providing accelerated scrolling through collections of items in accordance with some embodiments of the disclosure.
Figure 7B:
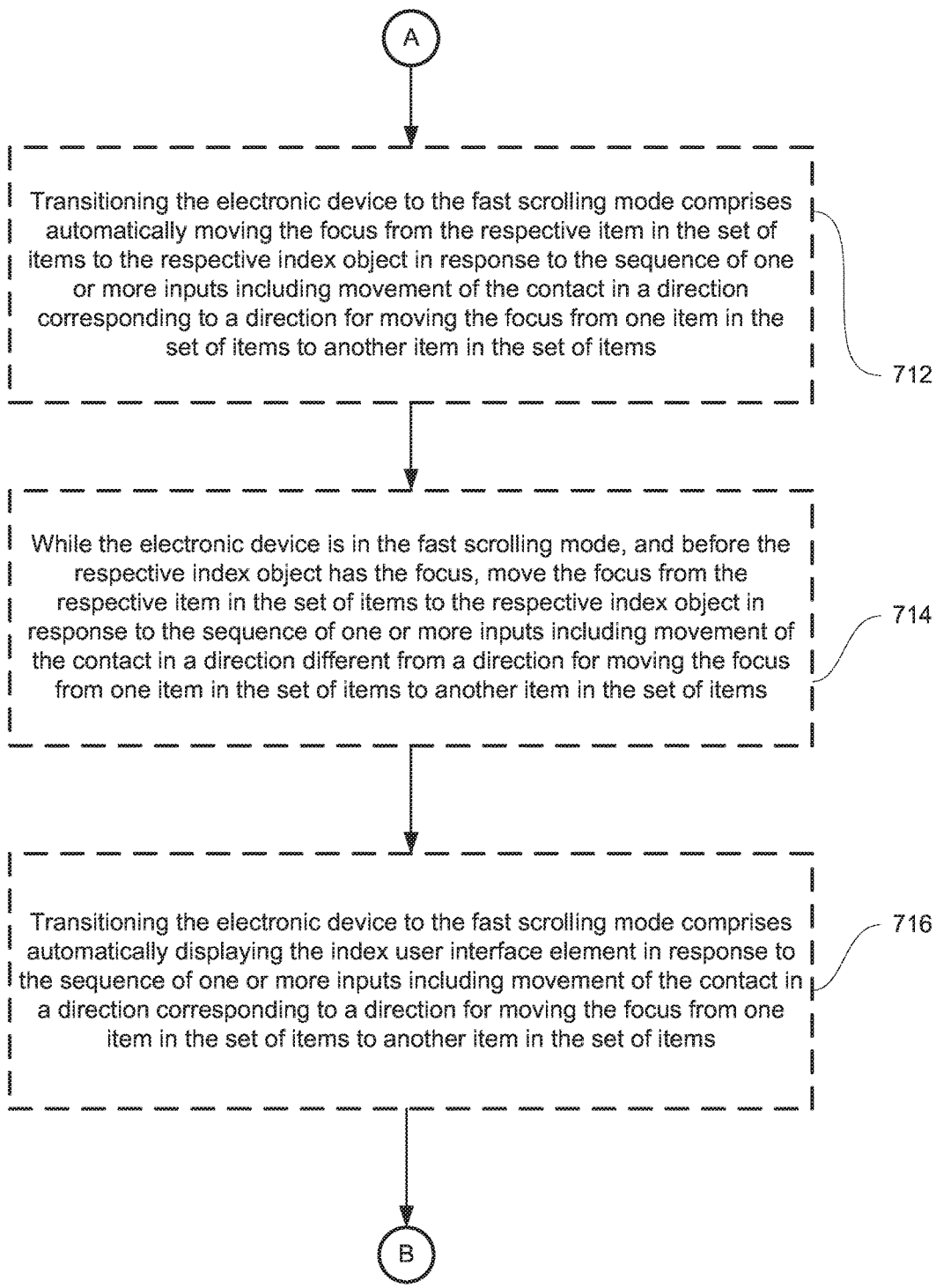
Figure 7C:
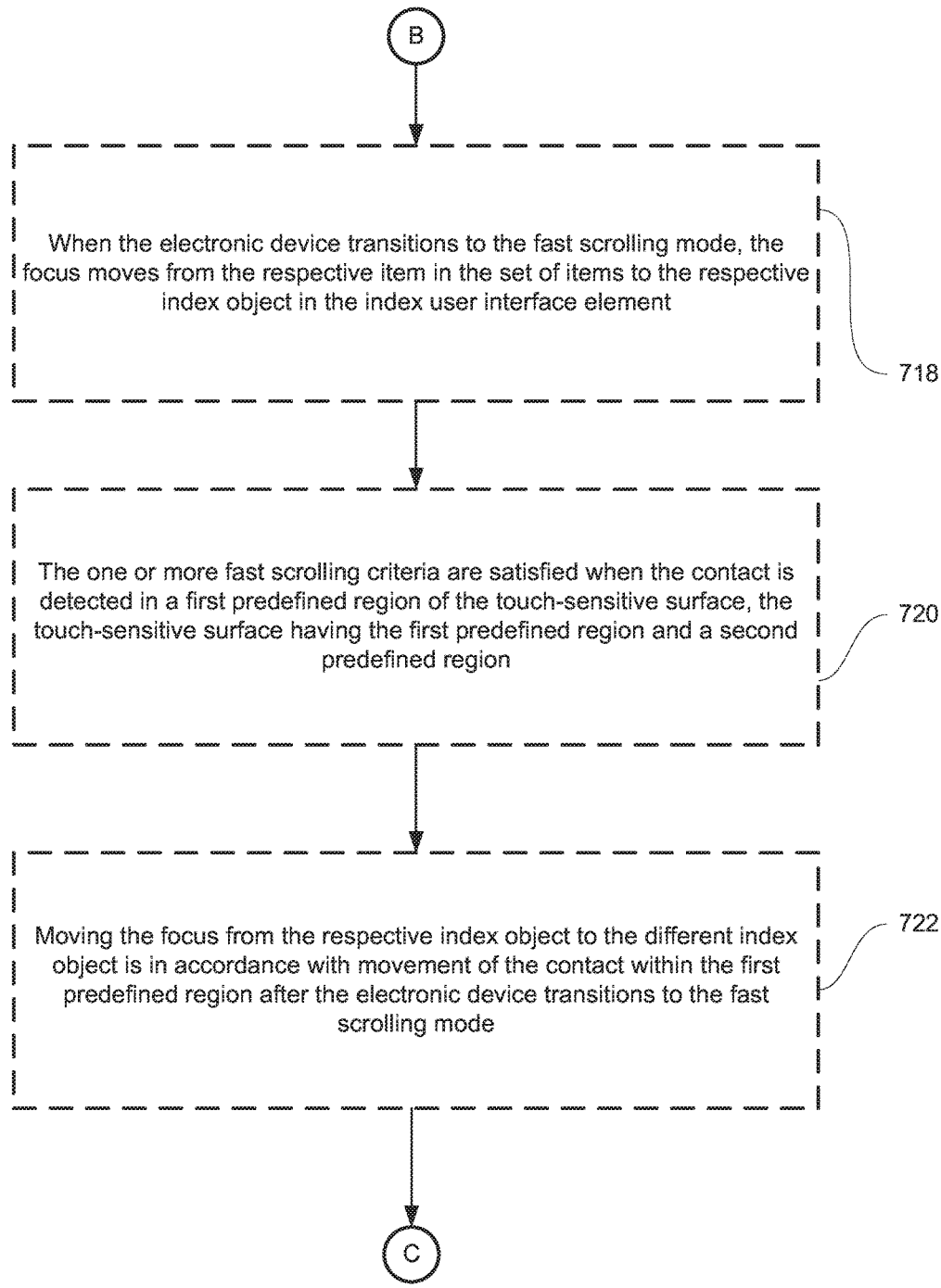
Figure 7D:
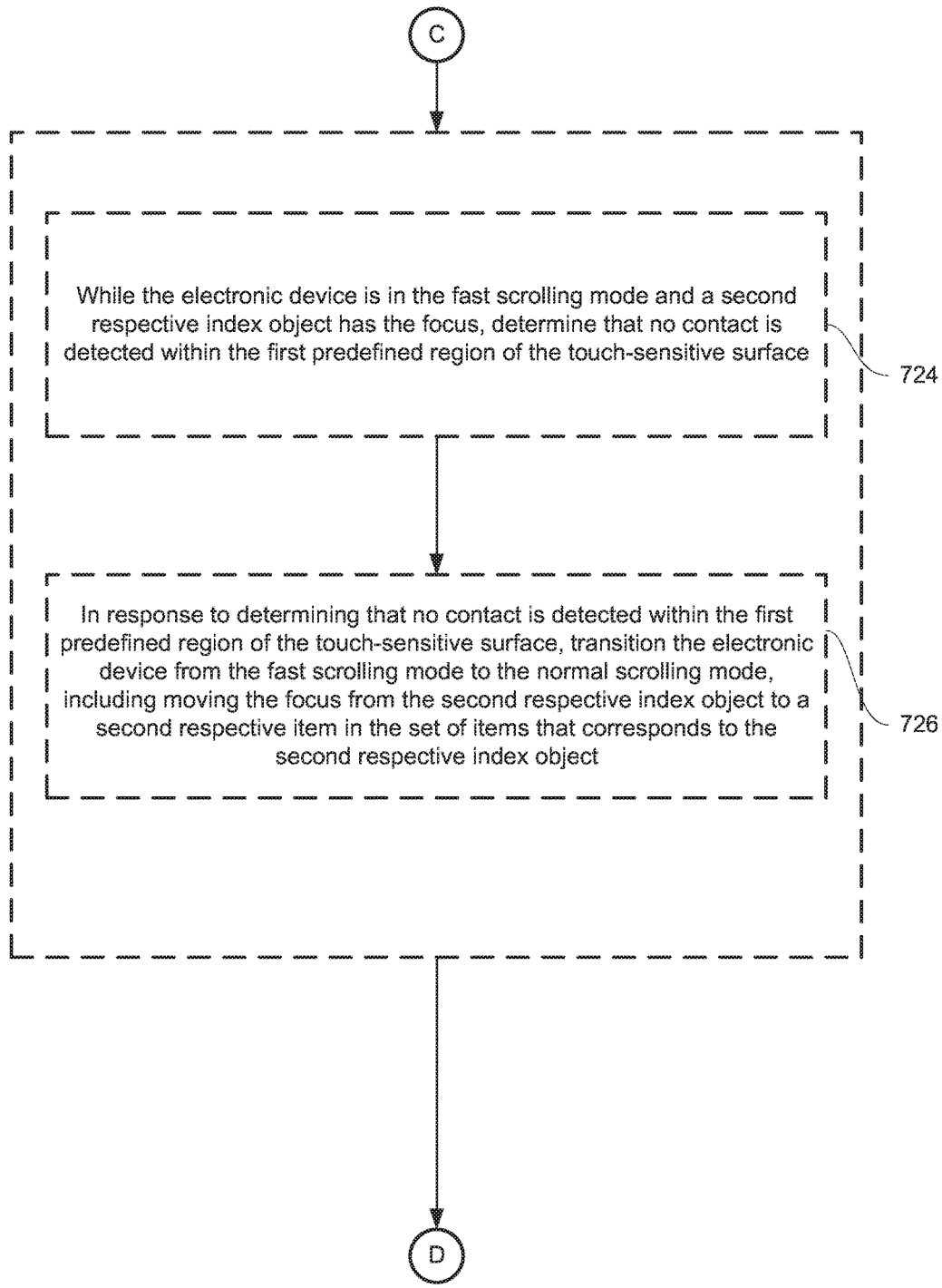
Figure 7E:
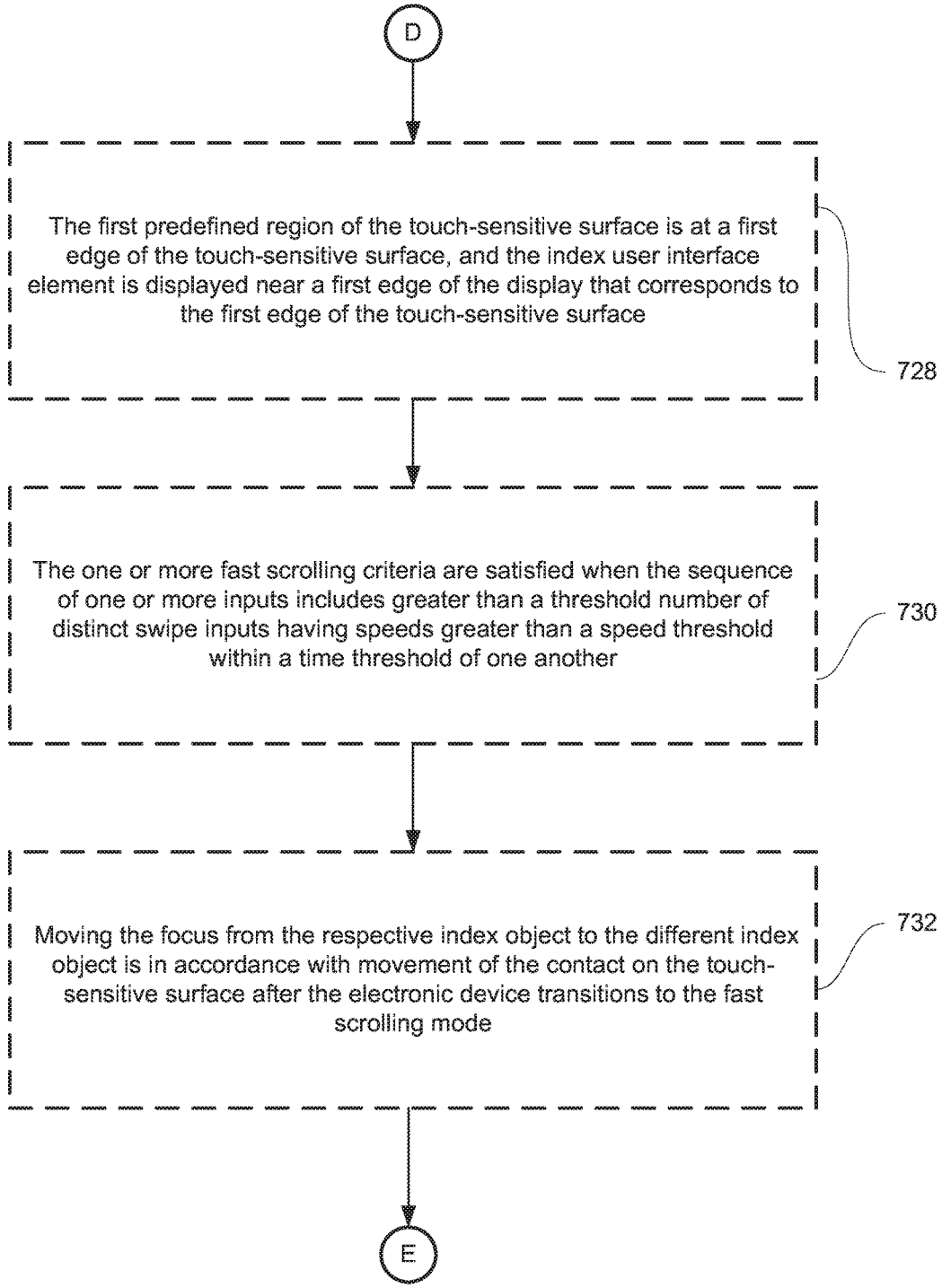
Figure 7F:
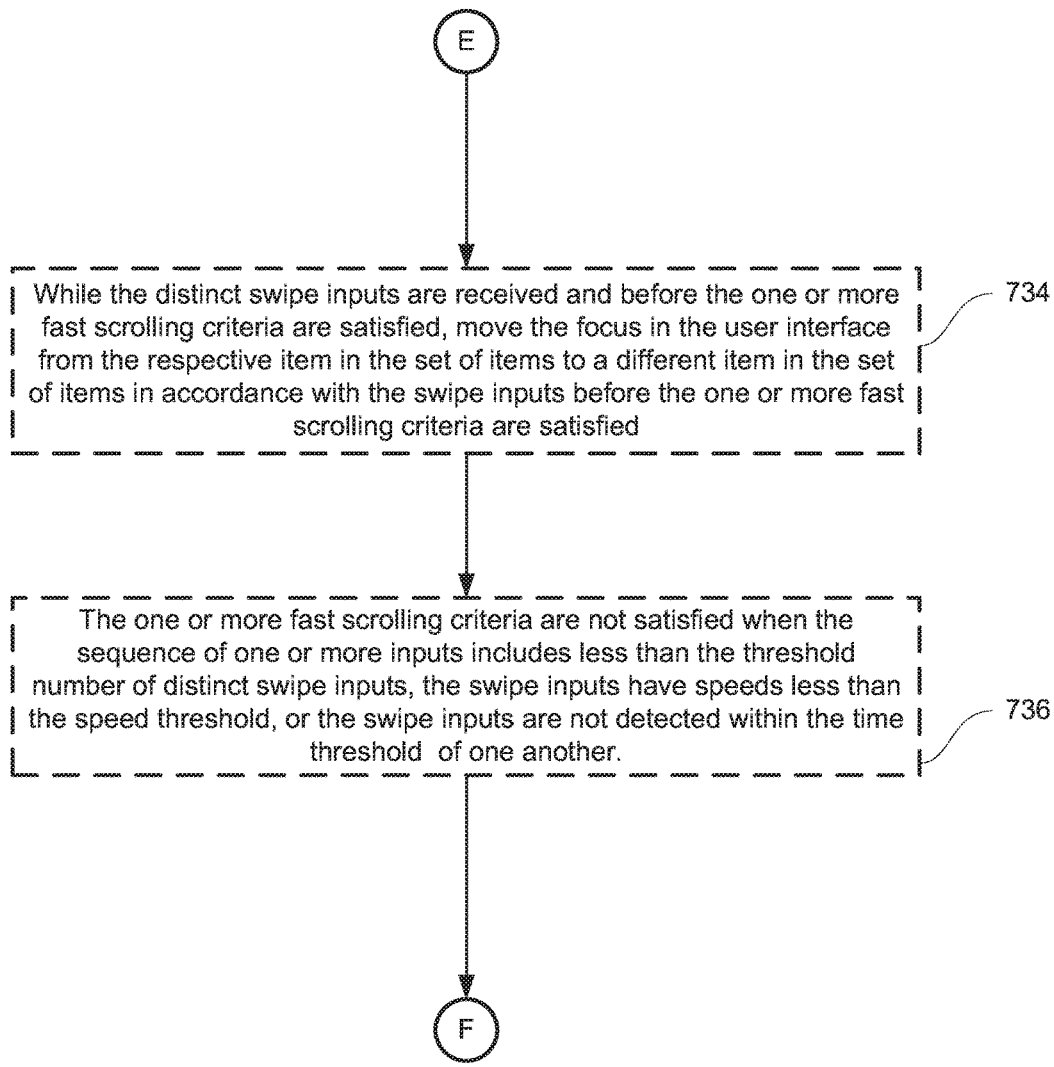
Figure 7G:
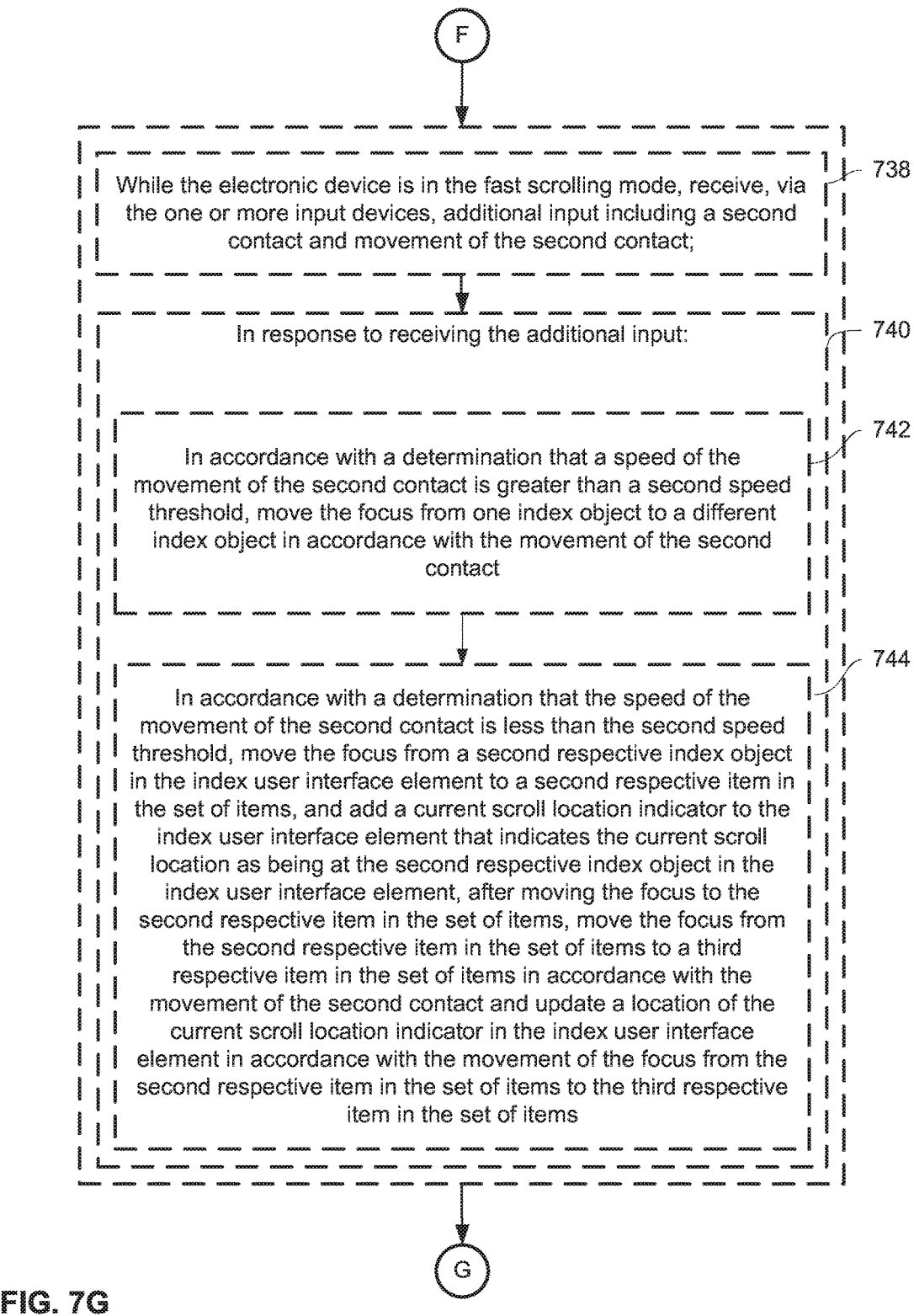
Figure 7H:
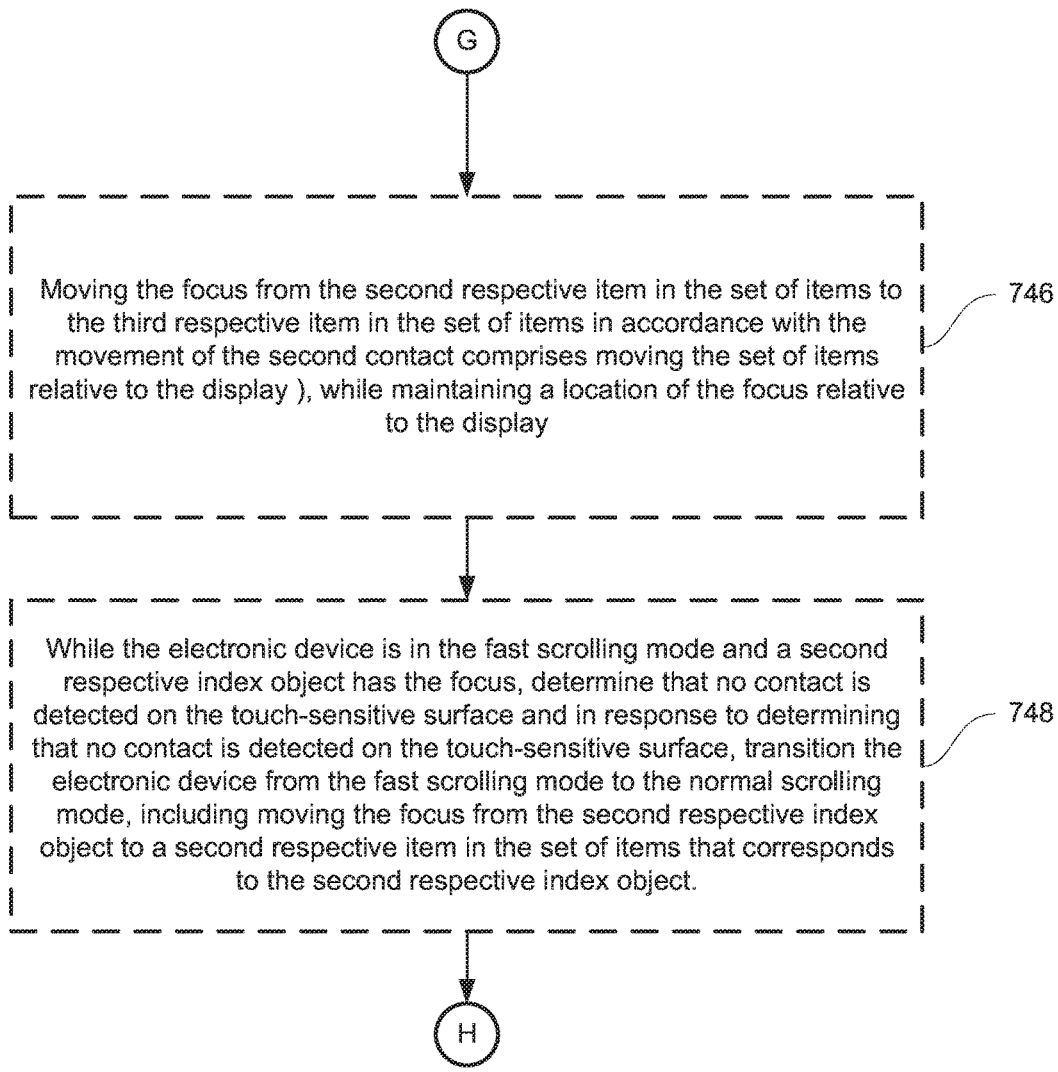
Figure 7I:
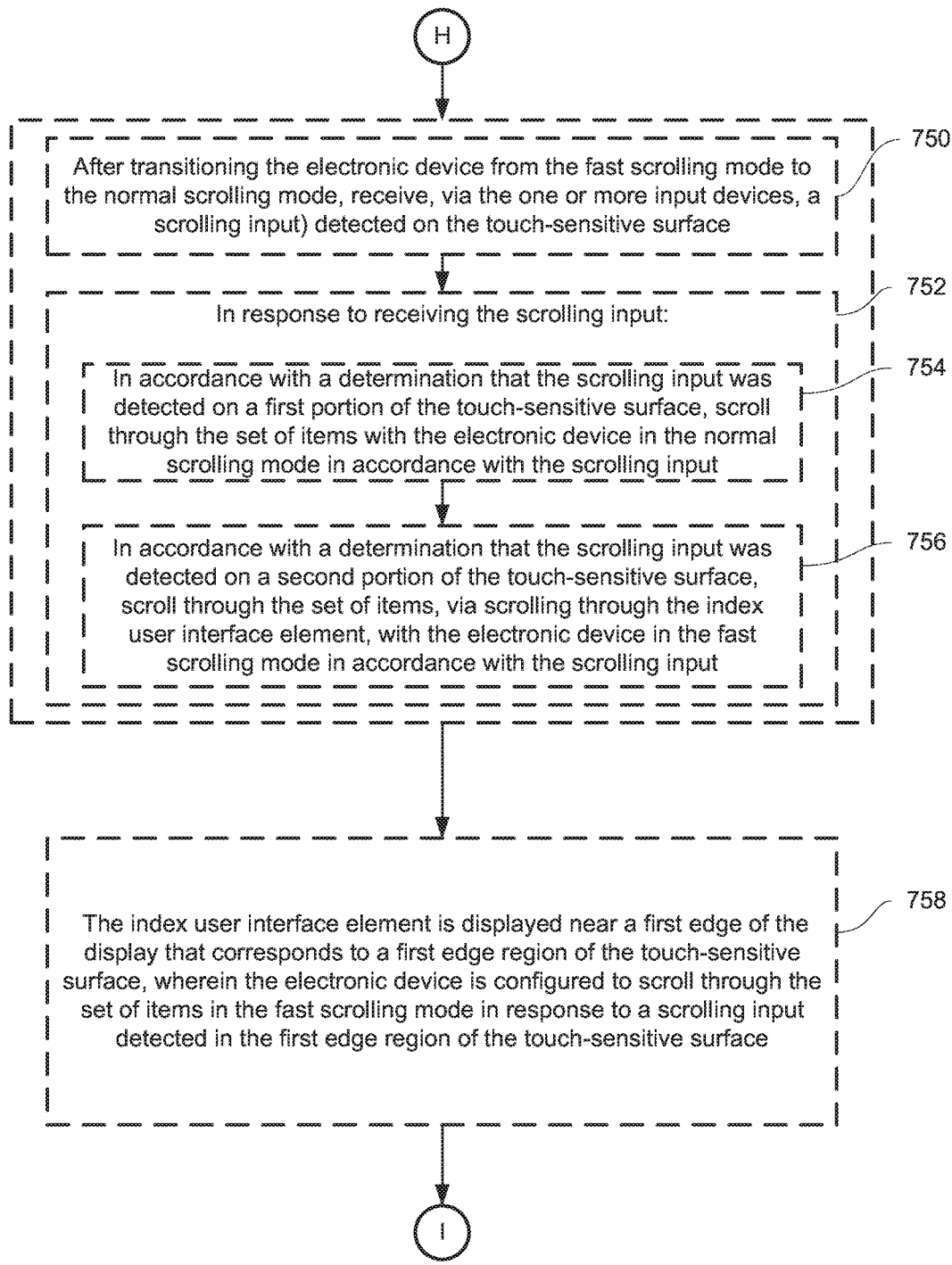
Figure 7J:
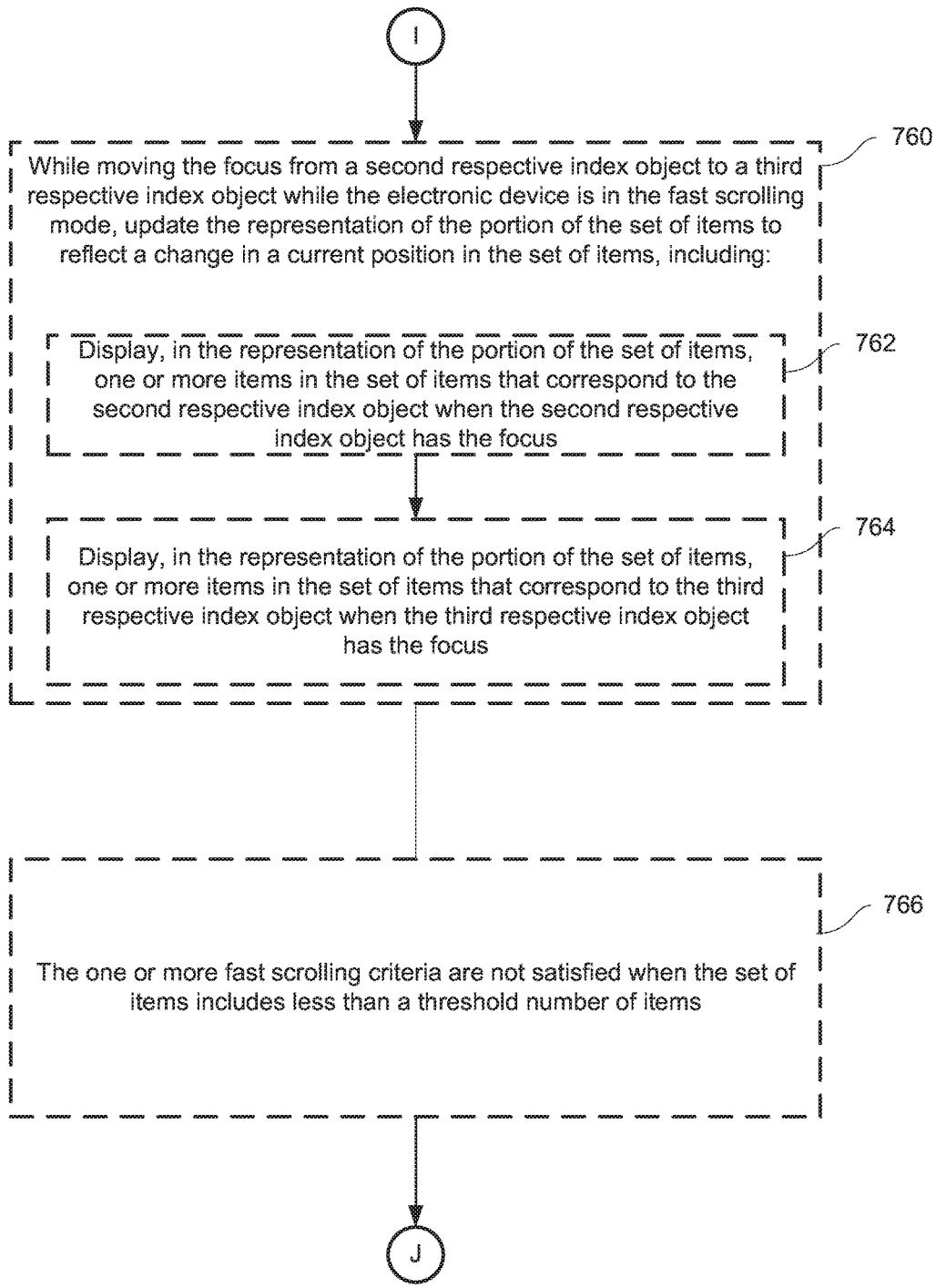
Figure 7K:
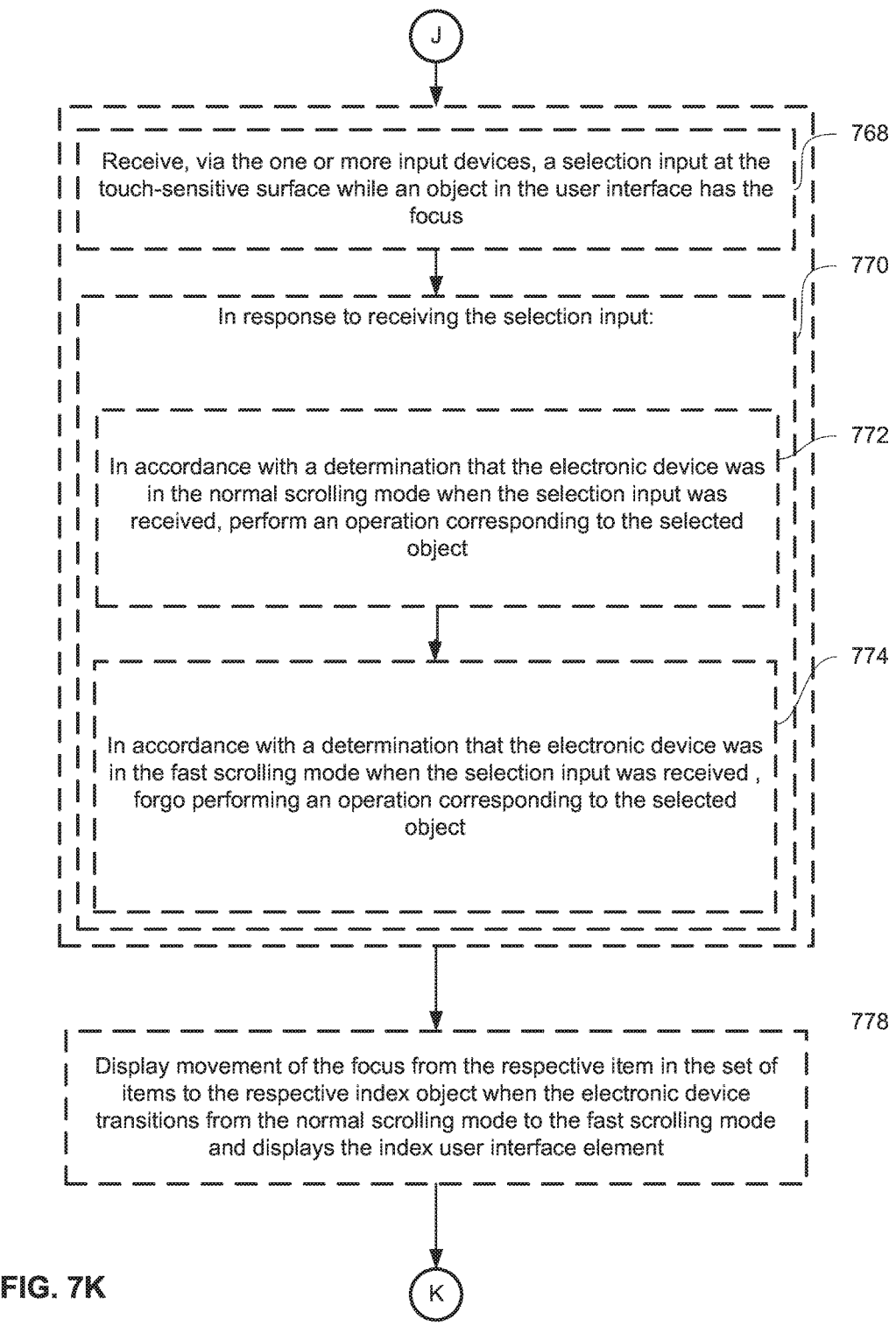
Figure 7L:
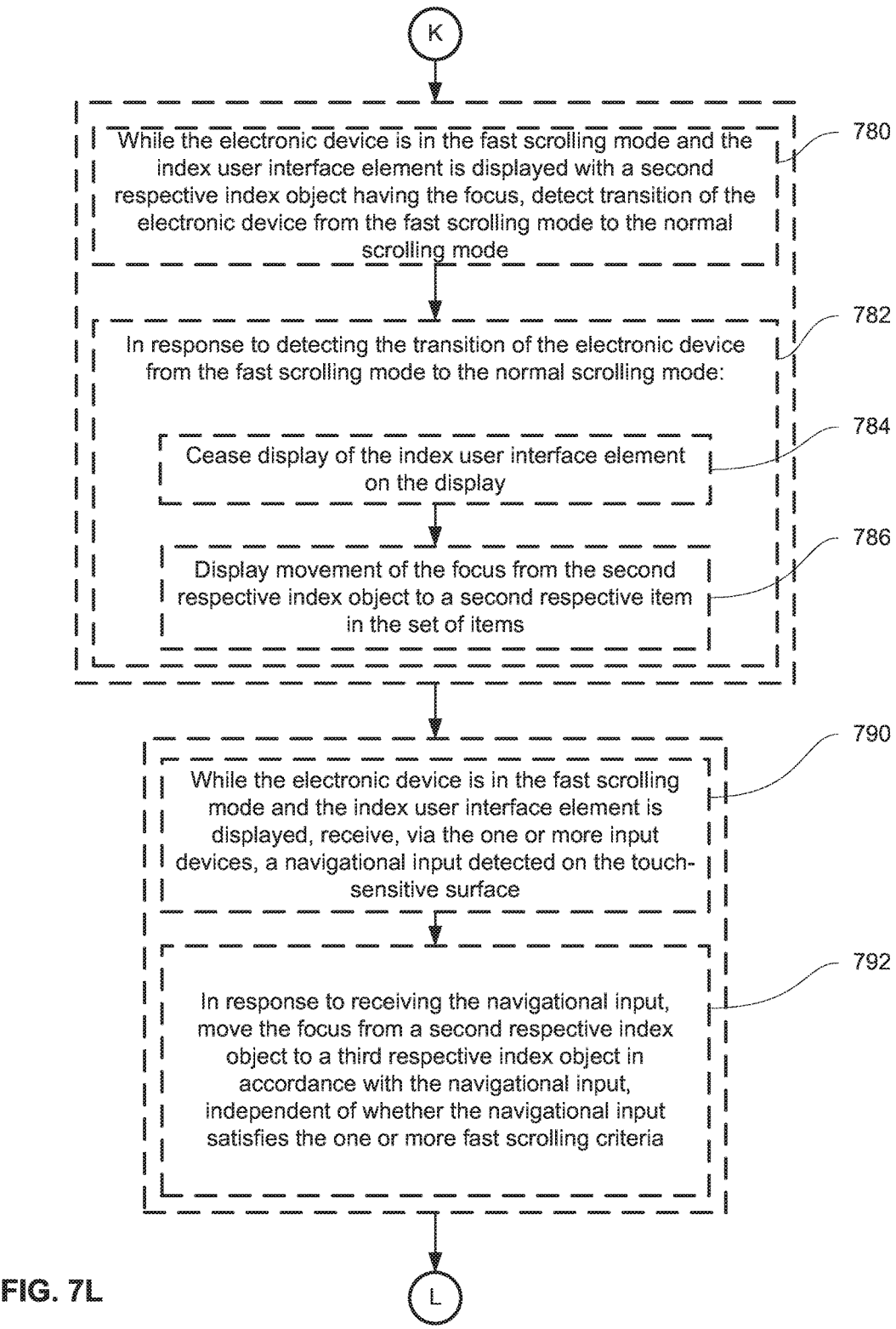
Figure 7M:
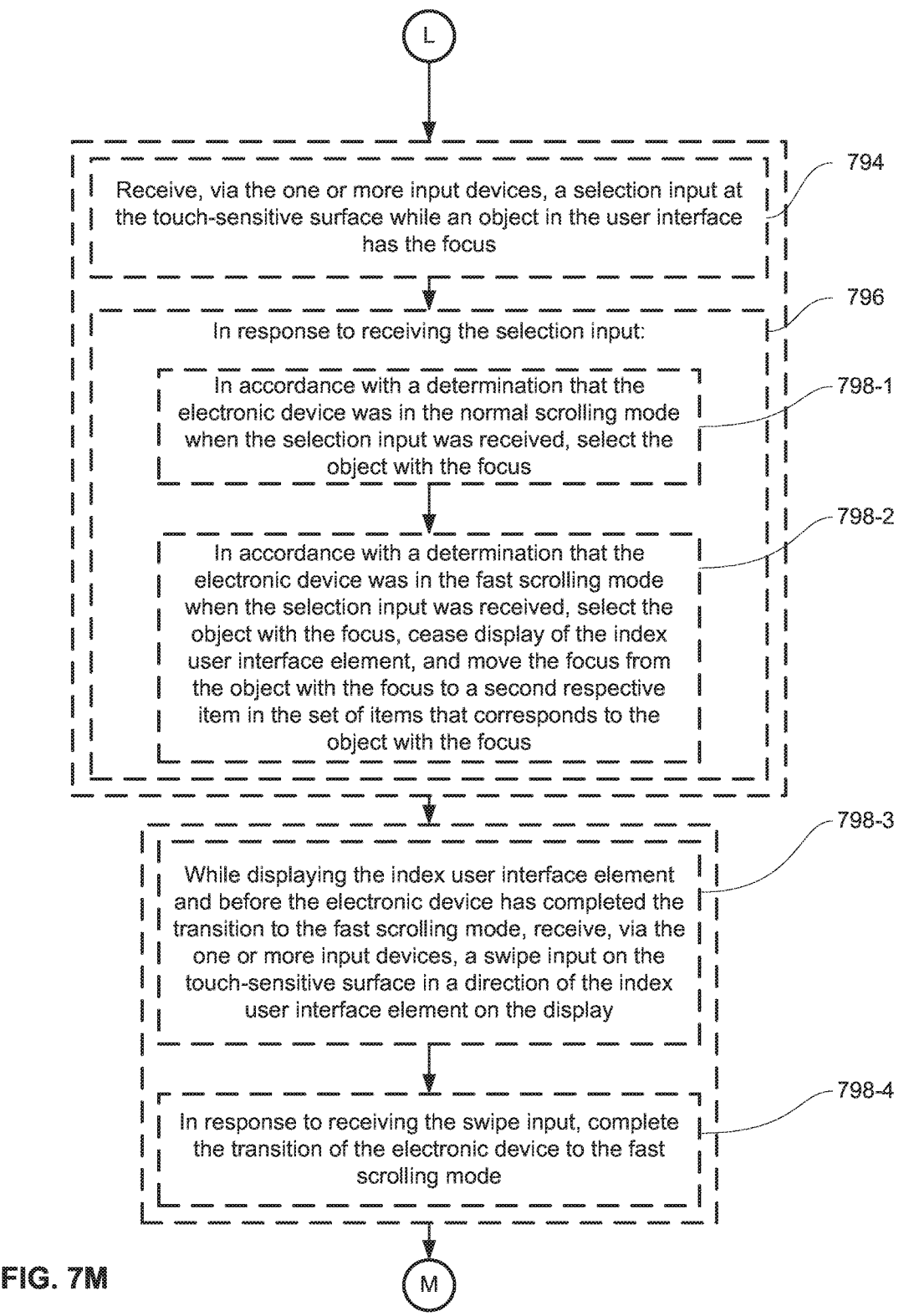
Figure 7N:
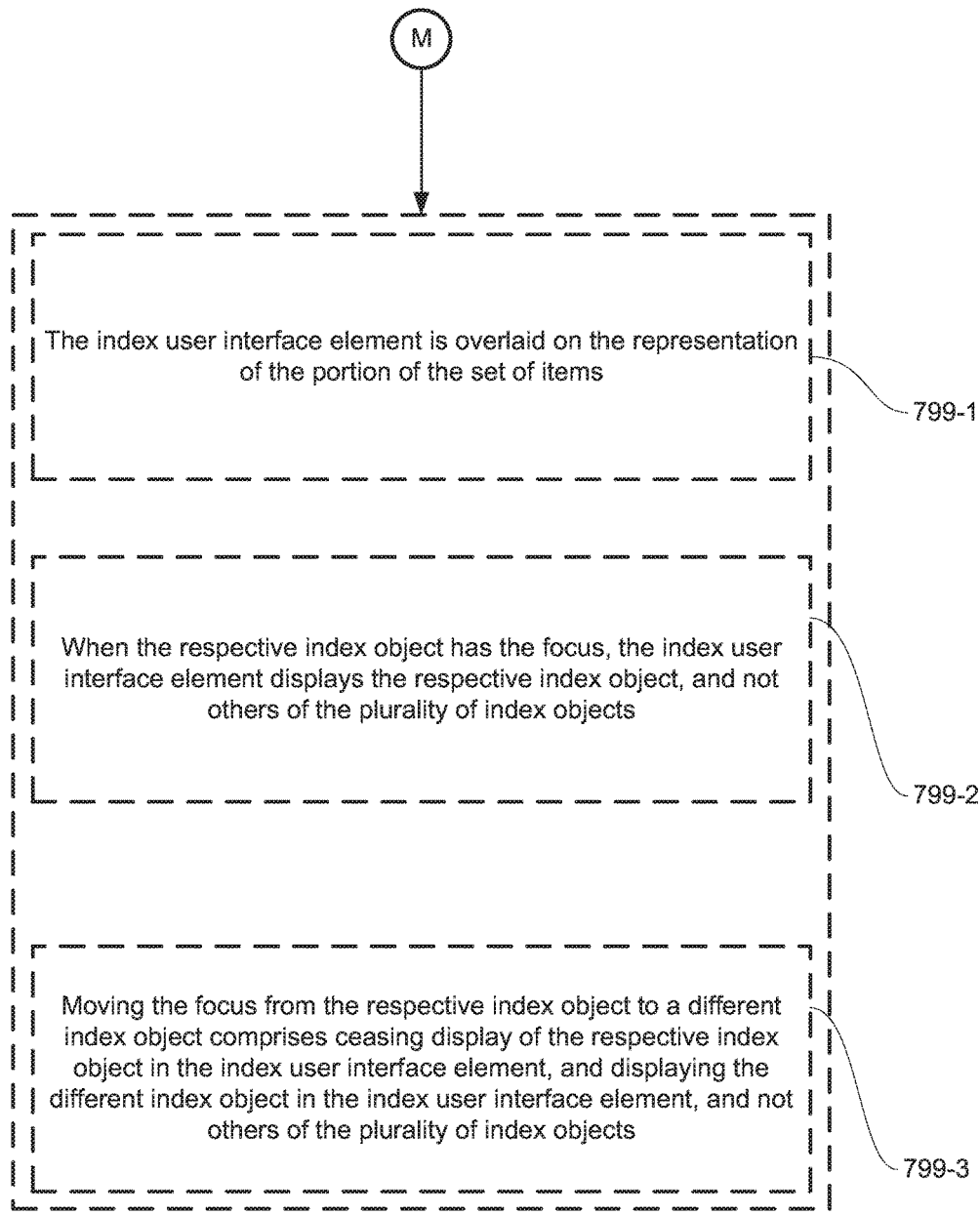

FIGS. 7A-7N are flow diagrams illustrating a method 700 of providing accelerated scrolling through collections of items in accordance with some embodiments of the disclosure. The method 700 is optionally performed at an electronic device such as device 100, device 300 or device 500 as described above with reference to FIGS. 1A-1B, 2-3 and 5A-5B. Some operations in method 700 are, optionally, combined and/or the order of some operations is, optionally, changed.

As described below, the method 700 provides ways of providing accelerated scrolling through collections of items. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, such as device 100, device 300 or device 500) in communication with a display (e.g., a television, such as display 514) and one or more input devices (e.g., a remote control, such as remote 510, or a smartphone, such as device 511), while in a normal scrolling mode of the electronic device, displays (702), in a user interface on the display (e.g., a content navigation user interface for exploring content available on the electronic device), a representation of a portion of a set of items that includes a plurality of items, such as in FIG. 6A (e.g., a list of content items available on the electronic device). In some embodiments, a respective item of the plurality of items has focus in the user interface, such as in FIG. 6A (e.g., the respective item is displayed with a current selection indicator that indicates that the respective item will be selected if a selection input is received). In some embodiments, an item with focus is indicated by a 3D effect where the item is lifted away from adjacent elements in a simulated z direction. In some embodiments, as the device detects movement of the contact on the one or more input devices, the representation of the respective item tilts with respect to the movement of the contact (e.g., tilting away from or towards the next item in the list). Optionally, while displaying the representation of the portion of the set of items in the user interface, the electronic device receives (704), via the one or more input devices, a sequence of one or more inputs including a contact and a movement of the contact detected on a touch-sensitive surface of the one or more input devices, such as in FIG. 6B (e.g., detecting touchdown of a contact and movement of the contact on a touch-sensitive surface of a remote control). In some embodiments, in response to receiving the sequence of one or more inputs and in accordance with a determination that the sequence of one or more inputs satisfies one or more fast scrolling criteria (e.g., criteria for transitioning to a mode for quickly scrolling through the set of items, such as criteria that are satisfied when the input includes multiple quick swipes in quick succession, or when the input includes a contact detected in a specified region (e.g., a right edge) of the touch-sensitive surface), the electronic device transitions to a fast scrolling mode (706), such as in FIGS. 6K-6L, which includes: displaying, in the user interface on the display, an index user interface element that includes a plurality of index objects (708), such as in FIG. 6K (e.g., an index of A-Z, 1-9, dates and/or times, television channels, artist names, etc.). This index user interface element allows for the user to quickly scroll through a list of items, thus increasing the efficiency of the human-machine interface. In some embodiments, a first index object of the plurality of index objects corresponds to a first plurality of the items in the set of items (e.g., "A" in the index corresponds to multiple items in the set starting with "A"), a second index object of the plurality of index objects corresponds to a second plurality of the items in the set of items (e.g., "B" in the index corresponds to multiple items in the set starting with "B"), and a respective index object of the plurality of index objects, which corresponds to the respective item in the plurality of items that had the focus when the input was received, has the focus in the user interface, such as in FIG. 6K (e.g., if a set item starting with "B" had the focus when the electronic device transitions to the fast scrolling mode, the "B" index object will have the focus). In some embodiments, the electronic device moves the focus in the user interface from the respective index object to a different index object in accordance with the movement of the contact, such as in FIG. 6L (e.g., after the focus moves from the list to the index, scroll through the index based on the movement of the contact). In some embodiments, in accordance with a determination that the input does not satisfy the one or more fast scrolling criteria, the electronic device maintains (710) the electronic device in the normal scrolling mode and moves the focus in the user interface from the respective item in the set of items to a different item in the set of items in accordance with the movement of the contact, such as in FIGS. 6B-6D (e.g., scroll through the set based on the movement of the contact).

In some embodiments transitioning the electronic device to the fast scrolling mode includes automatically moving the focus (712) (e.g., a current selection indicator or cursor) from the respective item in the set of items to the respective index object in response to the sequence of one or more inputs including movement of the contact in a direction corresponding to a direction for moving the focus from one item in the set of items to another item in the set of items, such as in FIG. 6U (e.g., when the fast scrolling criteria are met, the current selection indicator automatically moves from the list to the index in response to receiving scrolling inputs, such as up and down swipe inputs, for scrolling through the list—no separate input, such as a right/left swipe, for moving the focus from the list to the index is required). Thus, the electronic device automatically indicates to the user that the fast scrolling mode has been initiated, which improves the efficiency of the human-machine interface. In some embodiments while the electronic device is in the fast scrolling mode, and before the respective index object has the focus, the electronic device moves (714) the focus from the respective item in the set of items to the respective index object in response to the sequence of one or more inputs that includes movement of the contact in a direction different from (e.g., perpendicular to) a direction (e.g., up/down) for moving the focus from one item in the set of items to another item in the set of items, such as in FIG. 6W (e.g., when the fast scrolling criteria are met, the current selection indicator does not automatically move from the list to the index in response to receiving scrolling inputs, such as up and down swipe inputs, for scrolling through the list. Rather, an additional input, such as a right/left swipe in the direction of the index user interface element, is optionally required to move the focus from the list to the index). In some embodiments, transitioning the electronic device to the fast scrolling mode includes automatically displaying (716) the index user interface element in response to the sequence of one or more inputs including movement of the contact in a direction corresponding to a direction for moving the focus from one item in the set of items to another item in the set of items, such as in FIG. 6U (e.g., when the fast scrolling criteria are met, the index user interface element is automatically displayed in response to receiving scrolling inputs, such as up and down swipe inputs, for scrolling through the list—no separate input for displaying the index user interface element is required).

In some embodiments, when the electronic device transitions to the fast scrolling mode, the focus moves (718) from the respective item in the set of items to the respective index object in the index user interface element, such as in FIG. 6H (e.g., the current selection indicator leaves the list, and moves to the index, and in particular, the object in the index with the current focus, when the electronic device transitions to the fast scrolling mode). Thus, the electronic device indicates to the user that the fast scrolling mode has been initiated, which improves the efficiency of the human-machine interface. In some embodiments, the one or more fast scrolling criteria are satisfied when the contact is detected in a first predefined region (e.g., right edge, left edge regions) of the touch-sensitive surface (720), the touch-sensitive surface having the first predefined region and a second predefined region, such as in FIG. 6H (e.g., the touch-sensitive surface has two or more predefined regions, such as a right edge region for initiating the fast scrolling mode and scrolling through the index, and the remaining area on the touch-sensitive surface for remaining in the normal scrolling mode and scrolling through the list). In some embodiments, moving the focus from the respective index object to the different index object is in accordance with movement of the contact within the first predefined region after the electronic device transitions to the fast scrolling mode (722), such as in FIGS. 6L-6M (e.g., scrolling through the index is accomplished via swipes detected in the right edge region of the touch-sensitive surface).

In some embodiments, while the electronic device is in the fast scrolling mode and a second respective index object has the focus (e.g., any index object in the index), the electronic device determines (724) that no contact is detected within the first predefined region of the touch-sensitive surface, such as in FIG. 6N (e.g., the user is not touching the right edge of the touch-sensitive surface, in some embodiments, for longer than a time threshold, such as 1, 2 or 3 seconds). In some embodiments, in response to determining that no contact is detected within the first predefined region of the touch-sensitive surface, the device transitions (726) the electronic device from the fast scrolling mode to the normal scrolling mode, including moving the focus from the second respective index object to a second respective item in the set of items that corresponds to the second respective index object, such as in FIG. 6N (e.g., when the electronic device transitions from the fast scrolling mode to the normal scrolling mode, the item in the set of items that ends up with the focus is an item that corresponds to the index object that had the focus when the electronic device transitions away from the fast scrolling mode). Thus, the electronic device indicates to the user that the electronic device has transitioned back from the fast scrolling mode to the normal scrolling mode, which improves the efficiency of the human-machine interface. For example, if the "B" index object had the focus in the index, a list item that starts with a "B" will have the focus when the electronic device transitions back to the normal scrolling mode. In some embodiments, the first item in the list that starts with "B" will have the focus. In some embodiments, the electronic device transitions from the fast scrolling mode to the normal scrolling mode in response a horizontal swipe moving focus from the index back to the list.

In some embodiments, the first predefined region of the touch-sensitive surface is at a first edge of the touch-sensitive surface (728) (e.g., a right edge), and the index user interface element is displayed near a first edge of the display (e.g., a right edge) that corresponds to the first edge of the touch-sensitive surface, such as in FIG. 6H (e.g., the index is displayed near an edge of the display that corresponds to an edge of the touch-sensitive surface on which a drag input will cause fast scrolling). In some embodiments, the one or more fast scrolling criteria are satisfied (730) when the sequence of one or more inputs includes greater than a threshold number (e.g., two, three or five) of distinct swipe inputs (e.g., touchdown, movement and liftoff of a contact optionally define a distinct swipe input) having speeds greater than a speed threshold within a time threshold (e.g., 0.3, 0.5 or 1 seconds) of one another, such as in FIG. 6U (e.g., multiple quick swipes in succession detected on the touch-sensitive surface optionally satisfy the one or more fast scrolling criteria). In some embodiments, moving the focus from the respective index object to the different index object is in accordance with movement of the contact on the touch-sensitive surface after the electronic device transitions (732) to the fast scrolling mode, such as in FIGS. 6Y-6Z (e.g., the multiple quick swipes are used for initiating the fast scrolling mode, and actually scrolling through the index in the fast scrolling mode is performed in accordance with additional input detected after the multiple quick swipes).

In some embodiments, while the distinct swipe inputs are received and before the one or more fast scrolling criteria are satisfied (e.g., while the swipes in the multiple quick swipes are being detected, and thus, before there are sufficient quick swipes detected), the device moves the focus (734) in the user interface from the respective item in the set of items to a different item in the set of items in accordance with the swipe inputs before the one or more fast scrolling criteria are satisfied, such as in FIGS. 6S-6U (e.g., the multiple quick swipes used for initiating the fast scrolling mode cause scrolling through the list before the fast scrolling mode is initiated). Optionally, the one or more fast scrolling criteria are not satisfied when the sequence of one or more inputs includes less than the threshold number (e.g., two, three or five) of distinct swipe inputs, the swipe inputs have speeds less than the speed threshold, or the swipe inputs are not detected within the time threshold (e.g., 0.3, 0.5 or 1 seconds) of one another (736).

In some embodiments, while the electronic device is in the fast scrolling mode, the device receives, via the one or more input devices, additional input including a second contact and movement of the second contact (738) (e.g., after the multiple quick swipes for initiating the fast scrolling mode, receiving another swipe input). In response to receiving the additional input (740), the device in accordance with a determination that a speed of the movement of the second contact is greater than a second speed threshold, moves the focus (742) from one index object to a different index object in accordance with the movement of the second contact, such as in FIG. 6GG (e.g., a relatively quick swipe while in the fast scrolling mode optionally moves the current selection indicator from one index object to another), and in accordance with a determination that the speed of the movement of the second contact is less than the second speed threshold (e.g., a relatively slow swipe while in the fast scrolling mode): the device moves the focus from a second respective index object (e.g., any index object with the current focus) in the index user interface element to a second respective item in the set of items, such as in FIG. 6HH (e.g., the focus moves from the index back to the list, while the electronic device remains in the fast scrolling mode. For example, the focus optionally moves back to an item in the list that corresponds to the second respective index object in the index that had the current focus). In some embodiments, the electronic device adds a current scroll location indicator (e.g., an arrow or a line) to the index user interface element that indicates the current scroll location as being at the second respective index object in the index user interface element after moving the focus to the second respective item in the set of items, such as in FIG. 6II, and the device moves the focus from the second respective item in the set of items to a third respective item in the set of items in accordance with the movement of the second contact (e.g., scrolling through the list items in accordance with the relatively slow swipe) and updates a location of the current scroll location indicator in the index user interface element in accordance with the movement of the focus from the second respective item in the set of items to the third respective item in the set of items (744), such as in FIGS. 6II-6KK (e.g., moving the arrow or the line within the index user interface element as the current scroll location in the list/index changes as a result of the focus scrolling through the list in accordance with the relatively slow swipe while the electronic device remains in the fast scrolling mode).

In some embodiments, moving the focus from the second respective item in the set of items to the third respective item in the set of items in accordance with the movement of the second contact comprises moving (746) the set of items relative to the display (e.g., moving the list up/down with respect to the display), while maintaining a location of the focus relative to the display, such as in FIGS. 6II-6KK (e.g., the current selection indicator optionally remains at the center of the display, and the list of items moving up/down changes the item in the list that has the current focus). Optionally, while the electronic device is in the fast scrolling mode and a second respective index object (e.g., any index object in the index) has the focus, the device determines (748) that no contact is detected on the touch-sensitive surface (e.g., the user is not touching the touch-sensitive surface, in some embodiments, for longer than a time threshold, such as 1, 2 or 3 seconds), and in response to determining that no contact is detected on the touch-sensitive surface, transitions from the fast scrolling mode to the normal scrolling mode, including moving the focus from the second respective index object to a second respective item in the set of items that corresponds to the second respective index object, such as in FIG. 6AA (e.g., when the electronic device transitions from the fast scrolling mode to the normal scrolling mode, the item in the set of items that ends up with the focus is an item that corresponds to the index object that had the focus when the electronic device transitions away from the fast scrolling mode). For example, if the "B" index object had the focus in the index, a list item that starts with a "B" will have the focus when the electronic device transitions back to the normal scrolling mode. In some embodiments, the first item in the list that starts with "B" will have the focus. In some embodiments, the electronic device transitions from the fast scrolling mode to the normal scrolling mode in response a horizontal swipe moving focus from the index back to the list.

In some embodiments, after transitioning the electronic device from the fast scrolling mode to the normal scrolling mode, the device receives (750), via the one or more input devices, a scrolling input (e.g., an up/down swipe) detected on the touch-sensitive surface, and in response to receiving (752) the scrolling input: in accordance with a determination that the scrolling input was detected on a first portion of the touch-sensitive surface (e.g., a center region of the touch-sensitive surface), the device scrolls (754) through the set of items with the electronic device in the normal scrolling mode in accordance with the scrolling input, such as in FIG. 6G, and in accordance with a determination that the scrolling input was detected on a second portion of the touch-sensitive surface (e.g., an edge region, such as a right edge region of the touch-sensitive surface), the device scrolls through the set of items, via scrolling through the index user interface element, with the electronic device in the fast scrolling mode in accordance with the scrolling input (756), such as in FIG. 6L (e.g., a swipe in the second portion of the touch-sensitive surface optionally causes the electronic device to scroll through the list of items in the fast scrolling mode). In some embodiments, the index user interface element is displayed near a first edge (e.g., a right edge) of the display that corresponds to a first edge region (e.g., right edge) of the touch-sensitive surface, wherein the electronic device is configured to scroll through the set of items in the fast scrolling mode in response to a scrolling input detected in the first edge region of the touch-sensitive surface (758), such as in FIGS. 6K-6M (e.g., the display of the index during the multi-swipe fast scrolling provides a hint to the user that an input along an edge of the touch-sensitive surface will also cause fast scrolling).

In some embodiments, while moving the focus from a second respective index object to a third respective index object while the electronic device is in the fast scrolling mode (e.g., while scrolling through the index user interface element), the device updates (760) the representation of the portion of the set of items to reflect a change in a current position in the set of items, including: displaying (e.g., with the display enabling unit 806), in the representation of the portion of the set of items, one or more items in the set of items that correspond to the second respective index object when the second respective index object has the focus (762), and displaying (764), in the representation of the portion of the set of items, one or more items in the set of items that correspond to the third respective index object when the third respective index object has the focus, such as in FIGS. 6K-6M (e.g., as the user scrolls through the index from one index object to another index object, the portion of the set of items that is displayed is changed to correspond to the index object that has the focus). For example, the displayed portion of the set of items shows items that correspond to index object "A" when index object "A" has the focus, and shows items that correspond to index object "B" when index object "B" has the focus. Optionally, the one or more fast scrolling criteria are not satisfied when the set of items includes less than a threshold number of items (e.g., 50, 100 or 200 entries) (766).

In some embodiments, the electronic device receives (768), via the one or more input devices, a selection input at the touch-sensitive surface (e.g., a click or a tap of the touch-sensitive surface) while an object in the user interface has the focus (e.g., while an index object or an item in the set of items has the focus), in response to receiving the selection input (770): in accordance with a determination that the electronic device was in the normal scrolling mode when the selection input was received (e.g., an item in the set of items had the focus when the selection input was received), the device performs (772) an operation corresponding to the selected object, such as in FIG. 6E (e.g., playing media corresponding to the selected object), and in accordance with a determination that the electronic device was in the fast scrolling mode when the selection input was received (e.g., an index object in the index had the focus when the selection input was received), the device forgoes performing an operation corresponding to the selected object (774), such as in FIG. 6R (e.g., selection of an index object optionally causes no operation to be performed at the electronic device, while selection of a list item optionally does case a corresponding operation to be performed at the electronic device). In other words, in some embodiments, the fast scrolling mode only allows for scrolling, while the normal scrolling mode allows for scrolling and selection. In some embodiments, the device displays movement of the focus (778) from the respective item in the set of items to the respective index object when the electronic device transitions from the normal scrolling mode to the fast scrolling mode and displays the index user interface element (e.g., showing a current selection indicator moving from the currently-selected list item to the currently-selected index object when the fast scrolling mode is initiated).

In some embodiments, while the electronic device is in the fast scrolling mode and the index user interface element is displayed with a second respective index object having the focus, the device detects transition of the electronic device from the fast scrolling mode to the normal scrolling mode (780) (e.g., detecting a pause in user input, or any of the other conditions described above for transitioning away from the fast scrolling mode), and in response to detecting the transition of the electronic device from the fast scrolling mode to the normal scrolling mode (782): the device ceases display of the index user interface element on the display (784), and displays movement of the focus from the second respective index object to a second respective item in the set of items, such as in FIGS. 6N-6O (e.g., showing a current selection indicator moving from the currently-selected index object to the currently-selected list item when the fast scrolling mode is initiated) (786). Optionally, while the electronic device is in the fast scrolling mode and the index user interface element is displayed, the device receives (790), via the one or more input devices, a navigational input (e.g., any kind of swipe input, such as slow up/down swipe inputs) detected on the touch-sensitive surface, and in response to receiving the navigational input, moves the focus from a second respective index object to a third respective index object in accordance with the navigational input, independent of whether the navigational input satisfies the one or more fast scrolling criteria, such as in FIGS. 6L-6M (e.g., once the fast scrolling mode is initiated, the index is scrollable using standard navigational inputs. For example, a slow drag anywhere on the touch-sensitive surface will optionally slowly switch between the index objects) (792).

In some embodiments, the device receives, via the one or more input devices, a selection input at the touch-sensitive surface (e.g., a click or tap of the touch-sensitive surface) while an object in the user interface has the focus (794) (e.g., while an index object or an item in the set of items has the focus), and in response to receiving the selection input (796): in accordance with a determination that the electronic device was in the normal scrolling mode when the selection input was received (e.g., an item in the set of items had the focus when the selection input was received), selects the object with the focus (798-1), such as in FIG. 6E (e.g., playing media corresponding to the selected object), and in accordance with a determination that the electronic device was in the fast scrolling mode when the selection input was received (e.g., an index object in the index had the focus when the selection input was received): selects the object with the focus, ceases display of the index user interface element, and moves the focus (798-2) from the object with the focus to a second respective item in the set of items that corresponds to the object with the focus, such as in FIGS. 6P-6Q (e.g., the selection input while in the fast scrolling mode will select the highlighted letter in the index, cause the index user interface element to be dismissed, and transfer the focus to an item in the set of items that corresponds to that letter, such as the first item alphabetically in the list that starts with that letter). In this way, the electronic device gives feedback to the user of the device's exit from the fast scrolling mode, its transition to the normal scrolling mode, and indicates which item is currently-selected, increasing the efficiency of the human-machine interface.

In some embodiments, while displaying (e.g., with the display enabling unit 806) the index user interface element and before the electronic device has completed the transition to the fast scrolling mode, the device receives (798-3), via the one or more input devices, a swipe input on the touch-sensitive surface in a direction of the index user interface element on the display, such as in FIG. 6J (e.g., in some embodiments, satisfaction of the fast scrolling criteria causes the index user interface element to be displayed, but completing the transition to the fast scrolling mode optionally requires selection of the index user interface element once it is displayed; thus, when the index is displayed, a swipe in the direction of the index optionally selects it). In some embodiments, in response to receiving the swipe input, the device completes the transition of the electronic device to the fast scrolling mode, such as in FIG. 6J (e.g., once the index is selected, the user is able to scroll through the index in the fast scrolling mode) (798-4).

In some embodiments, the index user interface element is overlaid (799-1) on the representation of the portion of the set of items (e.g., the index user interface element is displayed over the list of items on the display, in some embodiments, with translucency), and when the respective index object has the focus, the index user interface element displays the respective index object, and not others of the plurality of index objects (799-2), such as in FIG. 6LL (e.g., if the "A" index object has the current focus, the index user interface element displays "A", and none of the other index objects). In some embodiments, the device moves the focus from the respective index object to a different index object comprises ceasing display of the respective index object in the index user interface element, and displaying (799-3) the different index object in the index user interface element, and not others of the plurality of index objects, such as in FIGS. 6LL-6MM (e.g., when the focus changes from the "A" index object to the "B" index object, the index user interface element stops displaying (e.g., with the display enabling unit 806) "A", and starts displaying (e.g., with the display enabling unit 806) "B", and none of the other index objects).

It should be understood that the particular order in which the operations in FIGS. 7A-7N have been described is merely exemplary and is not intended to indicate that the described order is the only order in which the operations could be performed. One of ordinary skill in the art would recognize various ways to reorder the operations described herein. The operations in the information processing methods described above are, optionally, implemented by running one or more functional modules in an information processing apparatus such as general purpose processors (e.g., as described with respect to FIGS. 1A, 3, 5A and 12) or application specific chips. Further, the operations described above with reference to FIGS. 7A-7N are, optionally, implemented by components depicted in FIGS. 1A-1B. For example, displaying operation 702, receiving operation 704 and transitioning operation 708 are, optionally, implemented by event sorter 170, event recognizer 180, and event handler 190. Event monitor 171 in event sorter 170 detects a contact on touch-sensitive surface 451, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 8:
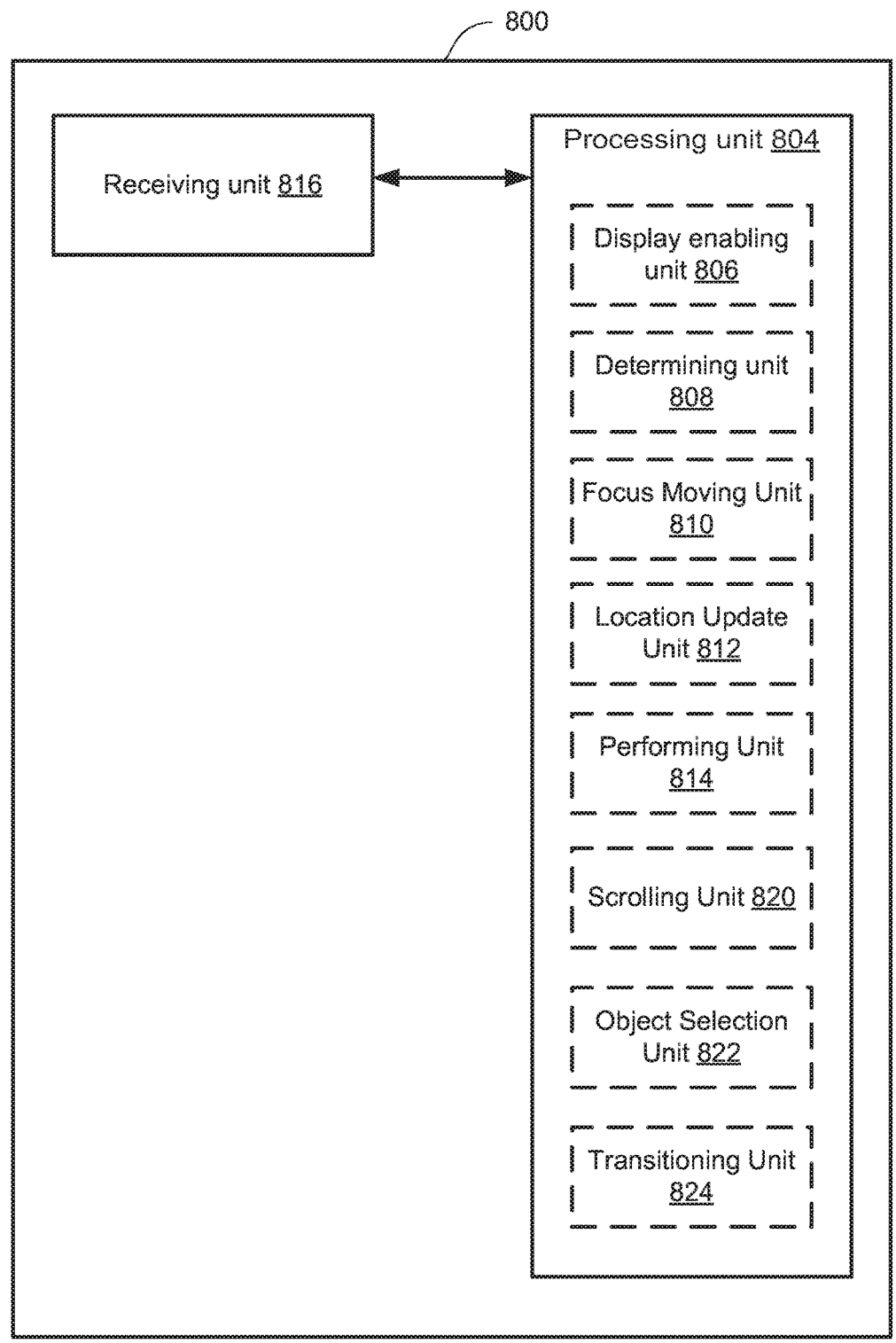
FIG. 8 is a functional block diagram of an electronic device in accordance with some embodiments of the disclosure.

In accordance with some embodiments, FIG. 8 shows a functional block diagram of an electronic device 800 (e.g., device 100 in FIG. 1A, 300 in FIG. 3 and/or 500 in FIG. 5A) configured in accordance with the principles of the various described embodiments. The functional blocks of the device are, optionally, implemented by hardware, software, or a combination of hardware and software, to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 optionally includes a receiving unit 816 configured to receive inputs, and a processing unit 804 coupled to the receiving unit 816. In some embodiments, the processing unit 804 includes a display enabling unit 806, a determining unit 808, a focus moving unit 810, a location update unit 812, a performing unit 814, a scrolling unit 820, an object selection unit 822 and a transitioning unit 824.

In some embodiments, the processing unit 804 is configured to: while in a normal scrolling mode of the electronic device 800, display (e.g., with the display enabling unit 806), in a user interface on a display, a representation of a portion of a set of items that includes a plurality of items, wherein a respective item of the plurality of items has focus in the user interface. In some embodiments, the receiving unit 816 is configured to: while displaying (e.g., with the display enabling unit 806) the representation of the portion of the set of items in the user interface, receive, via one or more input devices, a sequence of one or more inputs including a contact and a movement of the contact detected on a touch-sensitive surface of the one or more input devices. In some embodiments, the processing unit 804 is configured to, in response to receiving the sequence of one or more inputs: in accordance with a determination (e.g., with the determining unit 808) that the sequence of one or more inputs satisfies one or more fast scrolling criteria, transition (e.g., with the transitioning unit 824) the electronic device 800 to a fast scrolling mode, which includes: displaying (e.g., with the display enabling unit 806), in the user interface on the display, an index user interface element that includes a plurality of index objects, wherein: a first index object of the plurality of index objects corresponds to a first plurality of the items in the set of items, a second index object of the plurality of index objects corresponds to a second plurality of the items in the set of items, and a respective index object of the plurality of index objects, which corresponds to the respective item in the plurality of items that had the focus when the input was received, has the focus in the user interface, and moving (e.g., with the focus moving unit 810) the focus in the user interface from the respective index object to a different index object in accordance with the movement of the contact. In some embodiments, the processing unit 804 is configured to, in accordance with a determination (e.g., with the determining unit 808) that the input does not satisfy the one or more fast scrolling criteria: maintain (e.g., with the transitioning unit 824) the electronic device 800 in the normal scrolling mode, and move the focus (e.g., with the focus moving unit 810) in the user interface from the respective item in the set of items to a different item in the set of items in accordance with the movement of the contact.

In some embodiments, the processing unit 804 is further configured to transition (e.g., with the transitioning unit 824) the electronic device 800 to the fast scrolling mode by automatically moving (e.g., with the focus moving unit 810) the focus from the respective item in the set of items to the respective index object in response to the sequence of one or more inputs including movement of the contact in a direction corresponding to a direction for moving the focus from one item in the set of items to another item in the set of items. Optionally, the processing unit 804 is further configured to: while the electronic device 800 is in the fast scrolling mode, and before the respective index object has the focus, move the focus (e.g., with the focus moving unit 810) from the respective item in the set of items to the respective index object in response to the sequence of one or more inputs including movement of the contact in a direction different from a direction for moving the focus from one item in the set of items to another item in the set of items.

In some embodiments, the processing unit 804 is configured to transition (e.g., with the transitioning unit 824) the electronic device 800 to the fast scrolling mode by automatically displaying (e.g., with the display enabling unit 806) the index user interface element in response to the sequence of one or more inputs including movement of the contact in a direction corresponding to a direction for moving the focus from one item in the set of items to another item in the set of items. In some embodiments, when the electronic device 800 transitions to the fast scrolling mode, the focus moves (e.g., with the focus moving unit 810) from the respective item in the set of items to the respective index object in the index user interface element. Optionally, when the electronic device 800 transitions to the fast scrolling mode, the focus moves (e.g., with the focus moving unit 810) from the respective item in the set of items to the respective index object in the index user interface element. In some embodiments, moving the focus from the respective index object to the different index object is in accordance with movement of the contact within the first predefined region after the electronic device transitions to the fast scrolling mode.

In some embodiments, the processing unit 804 is further configured to: while the electronic device 800 is in the fast scrolling mode and a second respective index object has the focus, determine (e.g., with the determining unit 808) that no contact is detected within the first predefined region of the touch-sensitive surface, and in response to determining that no contact is detected within the first predefined region of the touch-sensitive surface, transition (e.g., with the transitioning unit 824) the electronic device from the fast scrolling mode to the normal scrolling mode, including moving (e.g., with the focus moving unit 810) the focus from the second respective index object to a second respective item in the set of items that corresponds to the second respective index object. In some embodiments, the first predefined region of the touch-sensitive surface is at a first edge of the touch-sensitive surface, and the index user interface element is displayed near a first edge of the display that corresponds to the first edge of the touch-sensitive surface.

In some embodiments, the one or more fast scrolling criteria are satisfied when the sequence of one or more inputs includes greater than a threshold number of distinct swipe inputs having speeds greater than a speed threshold within a time threshold of one another. Optionally, moving the focus from the respective index object to the different index object is in accordance with movement of the contact on the touch-sensitive surface after the electronic device transitions to the fast scrolling mode. In some embodiments, the processing unit 804 is further configured to: while the distinct swipe inputs are received and before the one or more fast scrolling criteria are satisfied, move the focus (e.g., with the focus moving unit 810) in the user interface from the respective item in the set of items to a different item in the set of items in accordance with the swipe inputs before the one or more fast scrolling criteria are satisfied. In some embodiments, the one or more fast scrolling criteria are not satisfied when the sequence of one or more inputs includes less than the threshold number of distinct swipe inputs, the swipe inputs have speeds less than the speed threshold, or the swipe inputs are not detected within the time threshold of one another. Optionally, the one or more fast scrolling criteria are not satisfied when the set of items includes less than a threshold number of items.

In some embodiments, the receiving unit 816 is further configured to, while the electronic device is in the fast scrolling mode, receive, via the one or more input devices, additional input including a second contact and movement of the second contact, and the processing unit 804 is further configured to, in response to receiving the additional input: in accordance with a determination (e.g., with the determining unit 808) that a speed of the movement of the second contact is greater than a second speed threshold, move the focus (e.g., with the focus moving unit 810) from one index object to a different index object in accordance with the movement of the second contact, and in accordance with a determination (e.g., with the determining unit 808) that the speed of the movement of the second contact is less than the second speed threshold: move the focus (e.g., with the focus moving unit 810) from a second respective index object in the index user interface element to a second respective item in the set of items, and add (e.g., with the scrolling unit 820) a current scroll location indicator to the index user interface element that indicates the current scroll location as being at the second respective index object in the index user interface element. In some embodiments, the processing unit 804 is further configured to, after moving the focus to the second respective item in the set of items, move the focus (e.g., with the focus moving unit 810) from the second respective item in the set of items to a third respective item in the set of items in accordance with the movement of the second contact and update a location (e.g., with the location update unit 812) of the current scroll location indicator in the index user interface element in accordance with the movement of the focus from the second respective item in the set of items to the third respective item in the set of items.

In some embodiments, the processing unit 804 is configured to move (e.g., with the focus moving unit 810) the focus from the second respective item in the set of items to the third respective item in the set of items in accordance with the movement of the second contact by moving (e.g., with the display enabling unit 806) the set of items relative to the display, while maintaining a location (e.g., with the focus moving unit 810) of the focus relative to the display. Optionally, the processing unit 804 is further configured to: while the electronic device is in the fast scrolling mode and a second respective index object has the focus, determine (e.g., with the determining unit 808) that no contact is detected on the touch-sensitive surface, and in response to determining that no contact is detected on the touch-sensitive surface, transition (e.g., with the transitioning unit 824) the electronic device from the fast scrolling mode to the normal scrolling mode, including moving (e.g., with the focus moving unit 810) the focus from the second respective index object to a second respective item in the set of items that corresponds to the second respective index object. Optionally, the receiving unit 816 is further configured to, after transitioning the electronic device from the fast scrolling mode to the normal scrolling mode, receive, via the one or more input devices, a scrolling input detected on the touch-sensitive surface, and the processing unit 804 is further configured to, in response to receiving the scrolling input: in accordance with a determination (e.g., with the determining unit 808) that the scrolling input was detected on a first portion of the touch-sensitive surface, scroll (e.g., with the scrolling unit 820) through the set of items with the electronic device in the normal scrolling mode in accordance with the scrolling input, and in accordance with a determination (e.g., with the determining unit 808) that the scrolling input was detected on a second portion of the touch-sensitive surface, scroll (e.g., with the scrolling unit 820) through the set of items, via scrolling through the index user interface element, with the electronic device in the fast scrolling mode in accordance with the scrolling input.

In some embodiments, the index user interface element is displayed near a first edge of the display that corresponds to a first edge region of the touch-sensitive surface, wherein the electronic device is configured to scroll (e.g., with the scrolling unit 820) through the set of items in the fast scrolling mode in response to a scrolling input detected in the first edge region of the touch-sensitive surface. In some embodiments, the processing unit 804 is further configured to: while moving (e.g., with the focus moving unit 810) the focus from a second respective index object to a third respective index object while the electronic device is in the fast scrolling mode, update (e.g., with the display enabling unit 806) the representation of the portion of the set of items to reflect a change in a current position in the set of items, including: displaying (e.g., with the display enabling unit 806), in the representation of the portion of the set of items, one or more items in the set of items that correspond to the second respective index object when the second respective index object has the focus, and displaying (e.g., with the display enabling unit 806), in the representation of the portion of the set of items, one or more items in the set of items that correspond to the third respective index object when the third respective index object has the focus.

In some embodiments, the receiving unit 816 is further configured to receive, via the one or more input devices, a selection input at the touch-sensitive surface while an object in the user interface has the focus, and the processing unit 804 is further configured to, in response to receiving the selection input: in accordance with a determination (e.g., with the determining unit 808) that the electronic device was in the normal scrolling mode when the selection input was received, perform (e.g., with the performing unit 814) an operation corresponding to the selected object, and in accordance with a determination (e.g., with the determining unit 808) that the electronic device was in the fast scrolling mode when the selection input was received, forgo performing (e.g., with the performing unit 814) an operation corresponding to the selected object.

In some embodiments, the processing unit 804 is further configured to: display movement (e.g., with the focus moving unit 810) of the focus from the respective item in the set of items to the respective index object when the electronic device transitions from the normal scrolling mode to the fast scrolling mode and displays the index user interface element. Optionally, the processing unit 804 is further configured to: while the electronic device is in the fast scrolling mode and the index user interface element is displayed with a second respective index object having the focus, detect (e.g., with the transitioning unit 824) transition of the electronic device from the fast scrolling mode to the normal scrolling mode, and in response to detecting the transition of the electronic device from the fast scrolling mode to the normal scrolling mode: cease display (e.g., with the display enabling unit 806) of the index user interface element on the display, and display movement of the focus (e.g., with the focus moving unit 810) from the second respective index object to a second respective item in the set of items.

In some embodiments, the receiving unit 816 is further configured to, while the electronic device is in the fast scrolling mode and the index user interface element is displayed, receive, via the one or more input devices, a navigational input detected on the touch-sensitive surface, and the processing unit 804 is further configured to, in response to receiving the navigational input, move the focus (e.g., with the focus moving unit 810) from a second respective index object to a third respective index object in accordance with the navigational input, independent of whether the navigational input satisfies the one or more fast scrolling criteria. Optionally, the receiving unit 816 is further configured to receive, via the one or more input devices, a selection input at the touch-sensitive surface while an object in the user interface has the focus, and the processing unit 804 is further configured to, in response to receiving the selection input: in accordance with a determination (e.g., with the determining unit 808) that the electronic device was in the normal scrolling mode when the selection input was received, select (e.g., with the object selection unit 822) the object with the focus, and in accordance with a determination (e.g., with the determining unit 808) that the electronic device was in the fast scrolling mode when the selection input was received: select (e.g., with the object selection unit 822) the object with the focus, cease display (e.g., with the display enabling unit 806) of the index user interface element, and move the focus (e.g., with the focus moving unit 810) from the object with the focus to a second respective item in the set of items that corresponds to the object with the focus.

In some embodiments, the receiving unit 816 is further configured to, while displaying (e.g., with the display enabling unit 806) the index user interface element and before the electronic device has completed the transition to the fast scrolling mode, receive, via the one or more input devices, a swipe input on the touch-sensitive surface in a direction of the index user interface element on the display, and the processing unit 804 is further configured to, in response to receiving the swipe input, complete the transition (e.g., with the transitioning unit 824) of the electronic device to the fast scrolling mode. In some embodiments, the index user interface element is overlaid on the representation of the portion of the set of items, and when the respective index object has the focus, the index user interface element displays the respective index object, and not others of the plurality of index objects. In some embodiments, moving the focus (e.g., with the focus moving unit 810) from the respective index object to a different index object comprises ceasing display (e.g., with the display enabling unit 806) of the respective index object in the index user interface element, and displaying (e.g., with the display enabling unit 806) the different index object in the index user interface element, and not others of the plurality of index objects.

The operations described above with reference to FIGS. 7A-7N are, optionally, implemented by components depicted in FIGS. 1A-1B and FIG. 8. For example, displaying operation 702, receiving operation 704 and transitioning operation 708 are, optionally implemented by event sorter 170, event recognizer 180, and event handler 190. Event monitor 171 in event sorter 170 detects a contact on a touch-sensitive surface or touch screen, and event dispatcher module 174 delivers the event information to application 136-1. A respective event recognizer 180 of application 136-1 compares the event information to respective event definitions 186, and determines whether a first contact at a first location on the touch-sensitive surface or touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or FIG. 8.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display and one or more input devices:
  while in a normal scrolling mode of the electronic device, displaying, in a user interface on the display, a representation of a portion of a set of items that includes a plurality of items, wherein a respective item of the plurality of items has focus in the user interface;
  while displaying the representation of the portion of the set of items in the user interface, receiving, via the one or more input devices, a sequence of one or more inputs including a contact and a movement of the contact detected on a touch-sensitive surface of the one or more input devices;
  in response to receiving the sequence of one or more inputs:
    in accordance with a determination that the sequence of one or more inputs satisfies one or more fast scrolling criteria, wherein the one or more fast scrolling criteria includes a requirement that the one or more inputs include a plurality of distinct swipes of the contact in a first direction on the touch-sensitive surface in order for the one or more fast scrolling criteria to be met, transitioning the electronic device to a fast scrolling mode, wherein transitioning the electronic device to the fast scrolling mode includes:
      displaying, in the user interface on the display, an index user interface element that includes a plurality of index objects, wherein:
        a first index object of the plurality of index objects corresponds to a first plurality of the items in the set of items,
        a second index object of the plurality of index objects corresponds to a second plurality of the items in the set of items, and
        a respective index object of the plurality of index objects, which corresponds to a second respective item in the plurality of items that had the focus when the electronic device transitioned to the fast scrolling mode, has the focus in the user interface; and
      moving the focus in the user interface, in a respective direction corresponding to the first direction, from the respective index object to a different index object in accordance with the movement of the contact in the first direction, wherein while the electronic device is in the fast scrolling mode, no items of the set of items have the focus; and
    in accordance with a determination that the sequence of one or more inputs does not satisfy the one or more fast scrolling criteria:
      maintaining the electronic device in the normal scrolling mode; and
      moving the focus in the user interface in the respective direction from the respective item in the set of items to a different item in the set of items in accordance with the movement of the contact in the first direction;
  while displaying, in the user interface on the display, the index user interface element that includes the plurality of index objects, receiving, via the one or more input devices, an input including a second contact and a movement of the second contact in the first direction detected on the touch-sensitive surface of the one or more input devices;

in response to receiving the input including the second contact and the movement of the second contact in the first direction, moving the focus in the user interface in the respective direction from the different index object to a second different index object in accordance with the movement of the contact in the first direction;

while the second different index object has the focus, receiving, via the one or more input devices, a second input corresponding to a selection input; and in response to receiving the second input corresponding to the selection input, moving the focus in the user interface from the second different index object to a third respective item in the plurality of items associated with the second different index object.

2. The method of claim 1, wherein transitioning the electronic device to the fast scrolling mode comprises before moving the focus in the user interface from the respective index object to the different index object, automatically moving the focus from the second respective item in the plurality of items to the respective index object in response to the sequence of one or more inputs including movement of the contact in the first direction corresponding to a direction for moving the focus from one item in the set of items to another item in the set of items.

3. The method of claim 2, wherein automatically moving the focus from the second respective item in the plurality of items to the respective index object includes removing the focus from the second respective item.

4. The method of claim 1, further comprising:
while the electronic device is in the fast scrolling mode, and before the respective index object has the focus, moving the focus from the second respective item in the plurality of items to the respective index object in response to the sequence of one or more inputs including movement of the contact in a direction different from a direction for moving the focus from one item in the set of items to another item in the set of items.

5. The method of claim 1, wherein the one or more fast scrolling criteria includes a requirement that the contact is detected in a first predefined region of the touch-sensitive surface, the touch-sensitive surface having the first predefined region and a second predefined region.

6. The method of claim 1, wherein the one or more fast scrolling criteria includes a requirement that the sequence of one or more inputs includes greater than a threshold number of distinct swipe inputs having speeds greater than a speed threshold within a time threshold of one another.

7. The method of claim 6, further comprising:
while the electronic device is in the fast scrolling mode and a second respective index object has the focus, determining that no contact is detected on the touch-sensitive surface; and in response to determining that no contact is detected on the touch-sensitive surface, transitioning the electronic device from the fast scrolling mode to the normal scrolling mode, including moving the focus from the second respective index object to a fourth respective item in the set of items that corresponds to the second respective index object.

8. The method of claim 1, further comprising:
while moving the focus from a second respective index object to a third respective index object while the electronic device is in the fast scrolling mode, updating the representation of the portion of the set of items to reflect a change in a current position in the set of items, including:

displaying, in the representation of the portion of the set of items, one or more items in the set of items that correspond to the second respective index object when the second respective index object has the focus; and displaying, in the representation of the portion of the set of items, one or more items in the set of items that correspond to the third respective index object when the third respective index object has the focus.

9. The method of claim 1, wherein the one or more fast scrolling criteria are not satisfied when the set of items includes less than a threshold number of items.

10. The method of claim 1, further comprising:
receiving, via the one or more input devices, a selection input at the touch-sensitive surface while an object in the user interface has the focus;

in response to receiving the selection input:
in accordance with a determination that the electronic device was in the normal scrolling mode when the selection input was received, performing an operation corresponding to an object that had the focus when the selection input was received; and in accordance with a determination that the electronic device was in the fast scrolling mode when the selection input was received, forgoing performing an operation corresponding to the object that had the focus when the selection input was received.

11. The method of claim 10, further comprising:
in response to receiving the selection input:
in accordance with the determination that the electronic device was in the fast scrolling mode when the selection input was received:
transitioning the electronic device from the fast scrolling mode to the normal scrolling mode, including moving the focus away from a second respective index object to a fourth respective item in the set of items that corresponds to the second respective index object, wherein the second respective index object is the object that had the focus when the selection input was received.

12. The method of claim 11, wherein transitioning the electronic device from the fast scrolling mode to the normal scrolling mode includes ceasing display of the index user interface element.

13. The method of claim 1, further comprising:
wherein while the electronic device is in the fast scrolling mode and the index user interface element is displayed, receiving, via the one or more input devices, a navigational input detected on the touch-sensitive surface; and in response to receiving the navigational input, moving the focus from a second respective index object to a third respective index object in accordance with the navigational input, independent of whether the navigational input satisfies the one or more fast scrolling criteria.

14. The method of claim 1, further comprising:
receiving, via the one or more input devices, a selection input at the touch-sensitive surface while an object in the user interface has the focus; and in response to receiving the selection input:

in accordance with a determination that the electronic device was in the normal scrolling mode when the selection input was received, selecting the object with the focus; and in accordance with a determination that the electronic device was in the fast scrolling mode when the selection input was received:
  selecting the object with the focus;
  ceasing display of the index user interface element; and
  moving the focus from the object with the focus to a fourth respective item in the set of items that corresponds to the object with the focus.

15. The method of claim 1, wherein:
while in the normal scrolling mode:
  one item of the set of items has a focus,
  no item, other than the one item, of the set of items has the focus; and
  no index object of the plurality of index objects has the focus; and
while in the fast scrolling mode:
  one index object of the plurality of index objects has the focus;
  no index object, other than the one index object, of the plurality of index objects has the focus; and
  no item of the set of items has the focus.

16. The method of claim 1, further comprising:
while the electronic device is in the fast scrolling mode, receiving, via the one or more input devices, a third input including a third contact and movement of the third contact;
in response to receiving the third input:
  in accordance with a determination that a speed of the movement of the third contact is greater than a second speed threshold, moving the focus from one index object to a different index object in accordance with the movement of the second contact while remaining in the fast scrolling mode; and
  in accordance with a determination that the speed of the movement of the third contact is less than the second speed threshold:
    moving the focus from the one index object to a fifth respective item in the set of items while remaining in the fast scrolling mode; and
    after moving the focus to the fifth respective item in the set of items, moving the focus from the fifth respective item in the set of items to a sixth respective item in the set of items in accordance with the movement of the third contact while remaining in the fast scrolling mode.

17. An electronic device, comprising:
one or more processors in communication with a display and one or more input devices;
memory; and
one or more programs, wherein the one or more programs are stored in the memory and configured to be executed by the one or more processors, the one or more programs including instructions for:
while in a normal scrolling mode of the electronic device, displaying, in a user interface on the display, a representation of a portion of a set of items that includes a plurality of items, wherein a respective item of the plurality of items has focus in the user interface;
while displaying the representation of the portion of the set of items in the user interface, receiving, via the one or more input devices, a sequence of one or more inputs including a contact and a movement of the contact detected on a touch-sensitive surface of the one or more input devices;
in response to receiving the sequence of one or more inputs:
  in accordance with a determination that the sequence of one or more inputs satisfies one or more fast scrolling criteria, wherein the one or more fast scrolling criteria includes a requirement that the one or more inputs include a plurality of distinct swipes of the contact in a first direction on the touch-sensitive surface in order for the one or more fast scrolling criteria to be met, transitioning the electronic device to a fast scrolling mode, wherein transitioning the electronic device to the fast scrolling mode includes:
    displaying, in the user interface on the display, an index user interface element that includes a plurality of index objects, wherein:
      a first index object of the plurality of index objects corresponds to a first plurality of the items in the set of items,
      a second index object of the plurality of index objects corresponds to a second plurality of the items in the set of items, and
      a respective index object of the plurality of index objects, which corresponds to a second respective item in the plurality of items that had the focus when electronic device transitioned to the fast scrolling mode, has the focus in the user interface; and
    moving the focus in the user interface, in a respective direction corresponding to the first direction, from the respective index object to a different index object in accordance with the movement of the contact in the first direction, wherein while the electronic device is in the fast scrolling mode, no items of the set of items has the focus; and
  in accordance with a determination that the sequence of one or more inputs does not satisfy the one or more fast scrolling criteria:
    maintaining the electronic device in the normal scrolling mode; and
    moving the focus in the user interface in the respective direction from the respective item in the set of items to a different item in the set of items in accordance with the movement of the contact in the first direction;
while displaying, in the user interface on the display, the index user interface element that includes the plurality of index objects, receiving, via the one or more input devices, an input including a second contact and a movement of the second contact in the first direction detected on the touch-sensitive surface of the one or more input devices;
in response to receiving the input including the second contact and the movement of the second contact in the first direction, moving the focus in the user interface in the respective direction from the different index object to a second different index object in accordance with the movement of the contact in the first direction;
while the second different index object has the focus, receiving, via the one or more input devices, a second input corresponding to a selection input; and
in response to receiving the second input corresponding to the selection input, moving the focus in the user interface from the second different index object to a third respective item in the plurality of items associated with the second different index object.

18. The electronic device of claim 17, wherein transitioning the electronic device to the fast scrolling mode comprises before moving the focus in the user interface from the respective index object to the different index object, automatically moving the focus from the second respective item in the plurality of items to the respective index object in response to the sequence of one or more inputs including movement of the contact in the first direction corresponding to a direction for moving the focus from one item in the set of items to another item in the set of items.

19. The electronic device of claim 17, the one or more programs further including instructions for:
   while the electronic device is in the fast scrolling mode, and before the respective index object has the focus, moving the focus from the second respective item in the plurality of items to the respective index object in response to the sequence of one or more inputs including movement of the contact in a direction different from a direction for moving the focus from one item in the set of items to another item in the set of items.

20. The electronic device of claim 19, wherein automatically moving the focus from the second respective item in the plurality of items to the respective index object includes removing the focus from the second respective item.

21. The electronic device of claim 17, wherein the one or more fast scrolling criteria includes a requirement that the contact is detected in a first predefined region of the touch-sensitive surface, the touch-sensitive surface having the first predefined region and a second predefined region.

22. The electronic device of claim 17, wherein the one or more fast scrolling criteria includes a requirement that the sequence of one or more inputs includes greater than a threshold number of distinct swipe inputs having speeds greater than a speed threshold within a time threshold of one another.

23. The electronic device of claim 22, the one or more programs further including instructions for:
   while the electronic device is in the fast scrolling mode and a second respective index object has the focus, determining that no contact is detected on the touch-sensitive surface; and
   in response to determining that no contact is detected on the touch-sensitive surface, transitioning the electronic device from the fast scrolling mode to the normal scrolling mode, including moving the focus from the second respective index object to a thjfd fourth respective item in the set of items that corresponds to the second respective index object.

24. The electronic device of claim 17, the one or more programs further including instructions for:
   while moving the focus from a second respective index object to a third respective index object while the electronic device is in the fast scrolling mode, updating the representation of the portion of the set of items to reflect a change in a current position in the set of items, including:
      displaying, in the representation of the portion of the set of items, one or more items in the set of items that correspond to the second respective index object when the second respective index object has the focus; and
      displaying, in the representation of the portion of the set of items, one or more items in the set of items that correspond to the third respective index object when the third respective index object has the focus.

25. The electronic device of claim 17, wherein the one or more fast scrolling criteria are not satisfied when the set of items includes less than a threshold number of items.

26. The electronic device of claim 17, the one or more programs further including instructions for:
   receiving, via the one or more input devices, a selection input at the touch-sensitive surface while an object in the user interface has the focus;
   in response to receiving the selection input:
      in accordance with a determination that the electronic device was in the normal scrolling mode when the selection input was received, performing an operation corresponding to an object that had the focus when the selection input was received; and
      in accordance with a determination that the electronic device was in the fast scrolling mode when the selection input was received, forgoing performing an operation corresponding to the object that had the focus when the selection input was received.

27. The electronic device of claim 26, the one or more programs further including instructions for:
   in response to receiving the selection input:
      in accordance with the determination that the electronic device was in the fast scrolling mode when the selection input was received:
         transitioning the electronic device from the fast scrolling mode to the normal scrolling mode, including moving the focus away from a second respective index object to a fourth respective item in the set of items that corresponds to the second respective index object, wherein the second respective index object is the object that had the focus when the selection input was received.

28. The electronic device of claim 27, wherein transitioning the electronic device from the fast scrolling mode to the normal scrolling mode includes ceasing display of the index user interface element.

29. The electronic device of claim 17, the one or more programs further including instructions for:
   wherein while the electronic device is in the fast scrolling mode and the index user interface element is displayed, receiving, via the one or more input devices, a navigational input detected on the touch-sensitive surface; and
   in response to receiving the navigational input, moving the focus from a second respective index object to a third respective index object in accordance with the navigational input, independent of whether the navigational input satisfies the one or more fast scrolling criteria.

30. The electronic device of claim 17, the one or more programs further including instructions for:
   receiving, via the one or more input devices, a selection input at the touch-sensitive surface while an object in the user interface has the focus; and
   in response to receiving the selection input:
      in accordance with a determination that the electronic device was in the normal scrolling mode when the selection input was received, selecting the object with the focus; and
      in accordance with a determination that the electronic device was in the fast scrolling mode when the selection input was received:
         selecting the object with the focus;
         ceasing display of the index user interface element; and moving the focus from the object with the focus to a fourth respective item in the set of items that corresponds to the object with the focus.

31. The electronic device of claim 17, wherein:
while in the normal scrolling mode:
one item of the set of items has a focus,
no item, other than the one item, of the set of items has the focus; and
no index object of the plurality of index objects has the focus; and
while in the fast scrolling mode:
one index object of the plurality of index objects has the focus;
no index object, other than the one index object, of the plurality of index objects has the focus; and
no item of the set of items has the focus.

32. A non-transitory computer readable storage medium storing one or more programs, the one or more programs comprising instructions, which when executed by one or more processors of an electronic device in communication with a display device and one or more input devices, cause the electronic device to:
while in a normal scrolling mode of the electronic device, display, in a user interface on the display, a representation of a portion of a set of items that includes a plurality of items, wherein a respective item of the plurality of items has focus in the user interface;
while displaying the representation of the portion of the set of items in the user interface, receive, via the one or more input devices, a sequence of one or more inputs including a contact and a movement of the contact detected on a touch-sensitive surface of the one or more input devices;
in response to receiving the sequence of one or more inputs:
in accordance with a determination that the sequence of one or more inputs satisfies one or more fast scrolling criteria, wherein the one or more fast scrolling criteria includes a requirement that the one or more inputs include a plurality of distinct swipes of the contact in a first direction on the touch-sensitive surface in order for the one or more fast scrolling criteria to be met, transition the electronic device to a fast scrolling mode, wherein transitioning the electronic device to the fast scrolling mode includes:
displaying, in the user interface on the display, an index user interface element that includes a plurality of index objects, wherein:
a first index object of the plurality of index objects corresponds to a first plurality of the items in the set of items,
a second index object of the plurality of index objects corresponds to a second plurality of the items in the set of items, and
a respective index object of the plurality of index objects, which corresponds to a second respective item in the plurality of items that had the focus when electronic device transitioned to the fast scrolling mode, has the focus in the user interface; and
moving the focus in the user interface, in a respective direction corresponding to the first direction, from the respective index object to a different index object in accordance with the movement of the contact in the first direction, wherein while the electronic device is in the fast scrolling mode, no items of the set of items has the focus; and
in accordance with a determination that the sequence of one or more inputs does not satisfy the one or more fast scrolling criteria:
maintain the electronic device in the normal scrolling mode; and
move the focus in the user interface in the respective direction from the respective item in the set of items to a different item in the set of items in accordance with the movement of the contact in the first direction;
while displaying, in the user interface on the display, the index user interface element that includes the plurality of index objects, receiving, via the one or more input devices, an input including a second contact and a movement of the second contact in the first direction detected on the touch-sensitive surface of the one or more input devices;
in response to receiving the input including the second contact and the movement of the second contact in the first direction, moving the focus in the user interface in the respective direction from the different index object to a second different index object in accordance with the movement of the contact in the first direction;
while the second different index object has the focus, receiving, via the one or more input devices, a second input corresponding to a selection input; and
in response to receiving the second input corresponding to the selection input, moving the focus in the user interface from the second different index object to a third respective item in the plurality of items associated with the second different index object.

33. The non-transitory computer readable storage medium of claim 32, wherein transitioning the electronic device to the fast scrolling mode comprises before moving the focus in the user interface from the respective index object to the different index object, automatically moving the focus from the second respective item in the plurality of items to the respective index object in response to the sequence of one or more inputs including movement of the contact in the first direction corresponding to a direction for moving the focus from one item in the set of items to another item in the set of items.

34. The non-transitory computer readable storage medium of claim 32, the one or more programs further including instructions which cause the electronic device to:
while the electronic device is in the fast scrolling mode, and before the respective index object has the focus, move the focus from the second respective item in the plurality of items to the respective index object in response to the sequence of one or more inputs including movement of the contact in a direction different from a direction for moving the focus from one item in the set of items to another item in the set of items.

35. The non-transitory computer readable storage medium of claim 34, wherein automatically moving the focus from the second respective item in the plurality of items to the respective index object includes removing the focus from the second respective item.

36. The non-transitory computer readable storage medium of claim 32, wherein the one or more fast scrolling criteria includes a requirement that the contact is detected in a first predefined region of the touch-sensitive surface, the touch-sensitive surface having the first predefined region and a second predefined region.

37. The non-transitory computer readable storage medium of claim 32, wherein the one or more fast scrolling criteria includes a requirement that the sequence of one or more inputs includes greater than a threshold number of distinct swipe inputs having speeds greater than a speed threshold within a time threshold of one another.

38. The non-transitory computer readable storage medium of claim 37, the one or more programs further including instructions which cause the electronic device to:
while the electronic device is in the fast scrolling mode and a second respective index object has the focus, determine that no contact is detected on the touch-sensitive surface; and
in response to determining that no contact is detected on the touch-sensitive surface, transition the electronic device from the fast scrolling mode to the normal scrolling mode, including moving the focus from the second respective index object to a thjfd fourth respective item in the set of items that corresponds to the second respective index object.

39. The non-transitory computer readable storage medium of claim 32, the one or more programs further including instructions which cause the electronic device to:
while moving the focus from a second respective index object to a third respective index object while the electronic device is in the fast scrolling mode, update the representation of the portion of the set of items to reflect a change in a current position in the set of items, including:
displaying, in the representation of the portion of the set of items, one or more items in the set of items that correspond to the second respective index object when the second respective index object has the focus; and
displaying, in the representation of the portion of the set of items, one or more items in the set of items that correspond to the third respective index object when the third respective index object has the focus.

40. The non-transitory computer readable storage medium of claim 32, wherein the one or more fast scrolling criteria are not satisfied when the set of items includes less than a threshold number of items.

41. The non-transitory computer readable storage medium of claim 32, the one or more programs further including instructions which cause the electronic device to:
receive, via the one or more input devices, a selection input at the touch-sensitive surface while an object in the user interface has the focus;
in response to receiving the selection input:
in accordance with a determination that the electronic device was in the normal scrolling mode when the selection input was received, perform an operation corresponding to an object that had the focus when the selection input was received; and
in accordance with a determination that the electronic device was in the fast scrolling mode when the selection input was received, forgo performing an operation corresponding to the object that had the focus when the selection input was received.

42. The non-transitory computer readable storage medium of claim 41, the one or more programs further including instructions which cause the electronic device to:
in response to receiving the selection input:
in accordance with the determination that the electronic device was in the fast scrolling mode when the selection input was received:
transition the electronic device from the fast scrolling mode to the normal scrolling mode, including moving the focus away from a second respective index object to a thifd fourth respective item in the set of items that corresponds to the second respective index object, wherein the second respective index object is the object that had the focus when the selection input was received.

43. The non-transitory computer readable storage medium of claim 42, wherein transitioning the electronic device from the fast scrolling mode to the normal scrolling mode includes ceasing display of the index user interface element.

44. The non-transitory computer readable storage medium of claim 32, the one or more programs further including instructions which cause the electronic device to:
wherein while the electronic device is in the fast scrolling mode and the index user interface element is displayed, receive, via the one or more input devices, a navigational input detected on the touch-sensitive surface; and
in response to receiving the navigational input, move the focus from a second respective index object to a third respective index object in accordance with the navigational input, independent of whether the navigational input satisfies the one or more fast scrolling criteria.

45. The non-transitory computer readable storage medium of claim 32, the one or more programs further including instructions which cause the electronic device to:
receive, via the one or more input devices, a selection input at the touch-sensitive surface while an object in the user interface has the focus; and
in response to receiving the selection input:
in accordance with a determination that the electronic device was in the normal scrolling mode when the selection input was received, select the object with the focus; and
in accordance with a determination that the electronic device was in the fast scrolling mode when the selection input was received:
select the object with the focus;
cease display of the index user interface element; and
move the focus from the object with the focus to a fourth respective item in the set of items that corresponds to the object with the focus.

46. The non-transitory computer readable storage medium of claim 32, wherein:
while in the normal scrolling mode:
one item of the set of items has a focus,
no item, other than the one item, of the set of items has the focus; and
no index object of the plurality of index objects has the focus; and
while in the fast scrolling mode:
one index object of the plurality of index objects has the focus;
no index object, other than the one index object, of the plurality of index objects has the focus; and
no item of the set of items has the focus.

* * * * *

UNITED STATES PATENT AND TRADEMARK OFFICE
CERTIFICATE OF CORRECTION

PATENT NO. : 10,942,639 B2  
APPLICATION NO. : 15/272388  
DATED : March 9, 2021  
INVENTOR(S) : Marcos Alonso Ruiz Page 1 of 1

It is certified that error appears in the above-identified patent and that said Letters Patent is hereby corrected as shown below:

In the Claims

In Column 55, Line 48, in Claim 23, delete "thjfd fourth" and insert --fourth--.

In Column 59, Line 15, in Claim 38, delete "thjfd fourth" and insert --fourth--.

In Column 60, Line 7, in Claim 42, delete "thjfd fourth" and insert --fourth--.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*